(12) United States Patent
Harrison et al.

(10) Patent No.: US 12,016,025 B2
(45) Date of Patent: *Jun. 18, 2024

(54) UPLINK CONTROL CHANNEL RESOURCE ALLOCATION FOR AN ENHANCED DOWNLINK CONTROL CHANNEL OF A MOBILE COMMUNICATION SYSTEM

(71) Applicant: BlackBerry Limited, Waterloo (CA)

(72) Inventors: Robert Mark Harrison, Grapevine, TX (US); Shiwei Gao, Nepean (CA); Yufei Wu Blankenship, Kildeer, IL (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,500

(22) Filed: May 19, 2023

(65) Prior Publication Data

US 2023/0345494 A1 Oct. 26, 2023

Related U.S. Application Data

(63) Continuation of application No. 17/495,470, filed on Oct. 6, 2021, now Pat. No. 11,706,769, which is a
(Continued)

(51) Int. Cl.
*H04W 72/21* (2023.01)
*H04L 5/00* (2006.01)
*H04W 72/23* (2023.01)

(52) U.S. Cl.
CPC ........... *H04W 72/21* (2023.01); *H04L 5/0053* (2013.01); *H04L 5/0055* (2013.01); *H04W 72/23* (2023.01)

(58) Field of Classification Search
CPC .... H04W 72/21; H04W 72/23; H04L 5/0053; H04L 5/0055; H04L 5/0094; H04L 5/0051

See application file for complete search history.

(56) References Cited

U.S. PATENT DOCUMENTS 9,380,568 B2  6/2016  Harrison et al.
9,801,166 B2  10/2017  Harrison et al.
(Continued)

OTHER PUBLICATIONS

Samsung, HARQ-ACK PUCCH Resource in Response to EPDCCH detection, 3GPP TSG RAN WG1 #69 Prague, Czech Republic, May 2012, R1-122259 (Year: 2012).*
(Continued)

*Primary Examiner* — Vinncelas Louis
(74) *Attorney, Agent, or Firm* — Fish & Richardson P.C.

(57) ABSTRACT

Uplink control channel resource allocation for an enhanced downlink control channel is disclosed. A first example method disclosed herein includes receiving, at a user equipment (UE), a downlink control channel carrying a physical uplink control channel (PUCCH) resource indicator, mapping the PUCCH resource indicator to a first offset, mapping a position of the downlink control channel to a second offset, and mapping a linear combination of the first and second offsets to an index identifying a first PUCCH resource. A second example method disclosed herein includes, in response to receiving, at a UE, an indication of a dynamic resource offset in an enhanced physical downlink control channel (ePDCCH) transmitted in a first ePDCCH set, determining a position of the ePDCCH and a subframe offset, and processing the indication of the dynamic resource offset, the position and the subframe offset to determine an allocated uplink control channel resource for the UE.

18 Claims, 21 Drawing Sheets

Related U.S. Application Data continuation of application No. 16/820,520, filed on Mar. 16, 2020, now Pat. No. 11,153,860, which is a continuation of application No. 16/153,013, filed on Oct. 5, 2018, now Pat. No. 10,595,307, which is a continuation of application No. 15/724,559, filed on Oct. 4, 2017, now Pat. No. 10,098,097, which is a continuation of application No. 15/175,995, filed on Jun. 7, 2016, now Pat. No. 9,801,166, which is a continuation of application No. 13/956,984, filed on Aug. 1, 2013, now Pat. No. 9,380,568.

(60) Provisional application No. 61/753,731, filed on Jan. 17, 2013, provisional application No. 61/679,037, filed on Aug. 2, 2012.

(56) References Cited

U.S. PATENT DOCUMENTS

| | | | |
|---|---|---|---|
| 10,595,307 | B2 | 3/2020 | Harrison et al. |
| 11,153,860 | B2 | 10/2021 | Harrison et al. |
| 11,706,769 | B2 | 7/2023 | Harrison et al. |
| 2012/0057562 | A1 | 3/2012 | Kim |
| 2013/0039290 | A1 | 2/2013 | Harrison et al. |
| 2014/0105191 | A1 | 4/2014 | Yang et al. |
| 2014/0219202 | A1* | 8/2014 | Kim ............... H04L 5/0055 370/329 |
| 2015/0003425 | A1* | 1/2015 | Kim ............... H04L 5/0055 370/336 |
| 2016/0315750 | A1* | 10/2016 | Kim ............... H04L 5/0035 |
| 2019/0045500 | A1 | 2/2019 | Harrison et al. |
| 2020/0221450 | A1 | 7/2020 | Harrison et al. |
| 2022/0030587 | A1 | 1/2022 | Harrison et al. |

OTHER PUBLICATIONS

[71-10] FFS aspects of PUCCH resource allocation for TDD (redacted), Nov. 28, 2012, 11 pages.
3rd Generation Partnership Project (3GPP), "3GPP TR 25.814—Technical Specification Group Radio Access Network; Physical layer aspects for evolved Universal Terrestrial Radio Access (UTRA) (Release 7)," V7.1.0, Jun. 2009, 132 pages.
3rd Generation Partnership Project (3GPP), "3GPP TS 36.211—Technical Specification Group Radio Access Network; Evolved Universal Terrestrial Radio Access (E-UTRA); Physical Channels and Modulation (Release 10)," V10.1.0, Mar. 2011, 103 pages.
3rd Generation Partnership Project (3GPP), "3GPP TS 36.211—Technical Specification Group Radio Access Network; Evolved Universal Terrestrial Radio Access (E-UTRA); Physical Channels and Modulation (Release 11)," V11.1.0, Dec. 2012, 108 pages.
3rd Generation Partnership Project (3GPP), "3GPP TS 36.213—Technical Specification Group Radio Access Network; Evolved Universal Terrestrial Radio Access (E-UTRA); Physical layer procedures (Release 10)," V10.1.0, Mar. 2011, 115 pages.
3rd Generation Partnership Project (3GPP), "3GPP TS 36.213—Technical Specification Group Radio Access Network; Evolved Universal Terrestrial Radio Access (E-UTRA); Physical layer procedures (Release 11)," V11.1.0, Dec. 2012, 160 pages.
3rd Generation Partnership Project (3GPP), "3GPP TS 36.331—Technical Specification Group Radio Access Network; Evolved Universal Terrestrial Radio Access (E-UTRA); Radio Resource Control (RRC); Protocol specification (Release 11)," V11.2.0, Dec. 2012, 340 pages.
Huawei, "PUCCH ACK/NACK resource allocation for ePDCCH," 3GPP TSG RAN WG1 Meeting #69, R1-121969, Prague, Czech Republic, May 21-25, 2012, 2 pages.
LG Electronics, "Discussion on PUCCH Resource for ePDCCH", 3GPP Draft; R1-122314 PUCCH for EPDCCH_LG, 3rd Generation Partnership Project (3GPP), Mobile Competence Centre ; 650, Route Des Lucioles ; F-06921 Sophia-Antipolis Cedex ; FRANCE, vol. RAN WG1, No. Prague, Czech Republic; May 12, 2012, 2 pages.
LG Electronics, "PDCCH capacity and overhead analysis for CoMP Scenarios 3 and 4," TSG-RAN WG1 Meeting #65, R1-111793, Barcelona, Spain, May 9-13, 2011, 5 pages.
LG Electronics, "PUCCH enhancement for uplink CoMP," 3GPP TSG RAN WG1 Meeting #69, R1-122303, Prague, Czech Republic, May 21-25, 2012, 4 pages.
Nokia Siemens Network, "HARQ-ACK resource allocation for data scheduled via ePDCCH," 3GPP TSG-RAN WG1 Meeting #69, R1-122428, Prague, Czech Republic, May 21-25, 2012, 2 pages.
Nokia Siemens Network, "Outcome of the Ad-Hoc session on PUCCH resource allocation for TDD," RAN1#71, R1-125382, New Orleans, US, Nov. 12-16, 2012, 3 pages.
Nokia Siemens Network, "Remaining issues on HARQ-ACK resource allocation for data scheduled via EPDCCH: TDD aspects," 3GPP TSGRAN WG1 Meeting #71, R1-125011, New Orleans, LA, US, Nov. 12-16, 2012, 5 pages.
Nokia, "HARQ-ACK resource allocation for data scheduled via ePDCCH,", 3GPP Draft, 3GPP TSG-RAN WG1 Meeting #69, R1-122428, Prague, Czech Republic, May 21-25, 2012, 2 pages.
Panasonic, "Discussion on PUCCH resource allocation for EPDCCH for TDD," 3GPP TSG-RAN WG1 Meeting #71, R1-124788, New Orleans, USA, Nov. 12-16, 2012, 6 pages.
Pantech, "PUCCH resource allocation in response to E-PDCCH", 3GPP Draft; R1-122456, 3rd Generation Partnership Project (3GPP), Mobile Competence Centre ; 650, Route Des Lucioles ; F-06921 Sophia-Antipolis Cedex ; FRANCE, vol. RAN WG1, No. Prague, Czech Republic; May 12, 2012, 3 pages.
Phillips, "Index for PDCCH signalling of UL resource allocation in conjunction with DRX", 3GPP Draft, 3GPP RAN WG1 Meeting #53, Mobile Competence Centre, R1-082526, Sophia-Antipolis, France, Jun. 25, 2008, 6 pages.
Research in Motion et al., "Discussion on PUCCH NN Resource Mapping for E-PDCCH", 3GPP Draft; R1-123181 (Rim-Disucssion on PUCCH Resrouce Mapping for E-PDCCH ), 3rd Generation Partnership Project (3GPP), Mobile Competence Centre ; 650, Route Des Lucioles ; F-06921 Sophia-Antipolis vol. RAN WG1, No. Qingdao; Aug. 5, 2012, 6 pages.
Research in Motion, "Further Discussion on PDCCH Enhancement in CA" 3GPP TSG RAN WG1 Meeting #66bis, R1-113240, Zhuhai, China, Oct. 10-14, 2011, 4 pages.
Samsung, "HARO-ACK PUCCH Resources in Response to ePDCCH Detections", 3GPP Draft; R1-122259 A_N for EPDCCH, 3rd Generation Partnership Project (3GPP), Mobile Competence Centre ; 650, Route Des Lucioles ; F-06921 Sophia-Antipolis Cedex; France, vol. RAN WG1, No. Prague, Czech Republic; May 12, 2012, 2 pages.
PCT International Preliminary Report on Patentability in International Application No. PCT/US2013/053268, dated Feb. 3, 2015, 14 pages.
PCT International Search Report and Written Opinion in International Application No. PCT/US2013/053268, dated Mar. 7, 2014, 19 pages.
Non-Final Office Action issued in U.S. Appl. No. 15/724,559 dated Feb. 7, 2018, 9 pages.
Notice of Allowance issued in U.S. Appl. No. 15/724,559 dated Jun. 6, 2018, 8 pages.
Corrected Notice of Allowance issued in U.S. Appl. No. 15/724,559 dated Jul. 11, 2018, 6 pages.
Communication pursuant to Article 94(3) issued in European Application No. 13750988.1 dated Jun. 14, 2018, 8 pages.
Extended European Search Report issued in European Application No. 20195923.6 dated Dec. 4, 2020, 5 pages.
Extended European Search Report issued in European Application No. 22161557.8 dated Jul. 13, 2022, 5 pages.
Extended European Search Report in European Appln. No. 23192809.4, dated Dec. 11, 2023, 12 pages.

* cited by examiner

US 12,016,025 B2

UPLINK CONTROL CHANNEL RESOURCE ALLOCATION FOR AN ENHANCED DOWNLINK CONTROL CHANNEL OF A MOBILE COMMUNICATION SYSTEM

CLAIM OF PRIORITY AND RELATED APPLICATIONS

This application claims the benefit of and priority under 35 USC § 120 to U.S. application Ser. No. 17/495,470 filed Oct. 6, 2021; which claims the benefit of and priority under 35 USC § 120 to U.S. application Ser. No. 16/820,520 filed Mar. 16, 2020, now U.S. Pat. No. 11,153,860 issued Oct. 19, 2021; which claims the benefit of and priority under 35 USC § 120 to U.S. application Ser. No. 16/153,013 filed Oct. 5, 2018, now U.S. Pat. No. 10,595,307 issued Mar. 17, 2020; which claims the benefit of and priority under 35 USC § 120 to U.S. application Ser. No. 15/724,559 filed Oct. 4, 2017, now U.S. Pat. No. 10,098,097 issued Oct. 9, 2018; which claims the benefit of and priority under 35 USC § 120 to U.S. application Ser. No. 15/175,995 filed Jun. 7, 2016, now U.S. Pat. No. 9,801,166 issued Oct. 24, 2017; which claims the benefit of and priority under 35 USC § 120 to U.S. application Ser. No. 13/956,984 filed Aug. 1, 2016, now U.S. Pat. No. 9,380,568 issued Jun. 28, 2016; which claims the benefit of and priority under 35 USC § 119(e) to U.S. Provisional Application No. 61/753,731 filed Jan. 17, 2013; and claims the benefit of and priority under 35 USC § 119(e) to U.S. Provisional Application No. 61/679,037 filed Aug. 2, 2012; all of which together and individually are hereby incorporated by reference in their respective entireties.

FIELD OF THE DISCLOSURE

This disclosure relates generally to mobile communication systems and, more particularly, to uplink control channel resource allocation for an enhanced downlink control channel of a mobile communication system.

BACKGROUND

In prior mobile communication systems that are compliant with the Third Generation Partnership Project (3GPP) long term evolution (LTE) standard, the detection status of a physical downlink shared channel (PDSCH) received at a user equipment (UE) device is reported back to an evolved Node B (eNB) of the network over a physical uplink control channel (PUCCH). Because multiple UE devices may each transmit a PUCCH, the network allocates a portion of the total resources available for PUCCH communications, referred to herein as a PUCCH resource, for use by the UE device to report its PDSCH detection status to the eNB. In such prior systems, the UE device determines the PUCCH resource(s) allocated to the UE device for reporting PDSCH detection status from information received in, or otherwise associated with, a physical downlink control channel (PDCCH) used to provide scheduling information for the PDSCH.

Future LTE mobile communication systems are being developed to support an enhanced PDCCH (ePDCCH) for providing control channel information to UE devices. In such systems, a UE device may monitor and receive PDSCH scheduling information via an ePDCCH instead of, or in addition to, the PDCCH.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
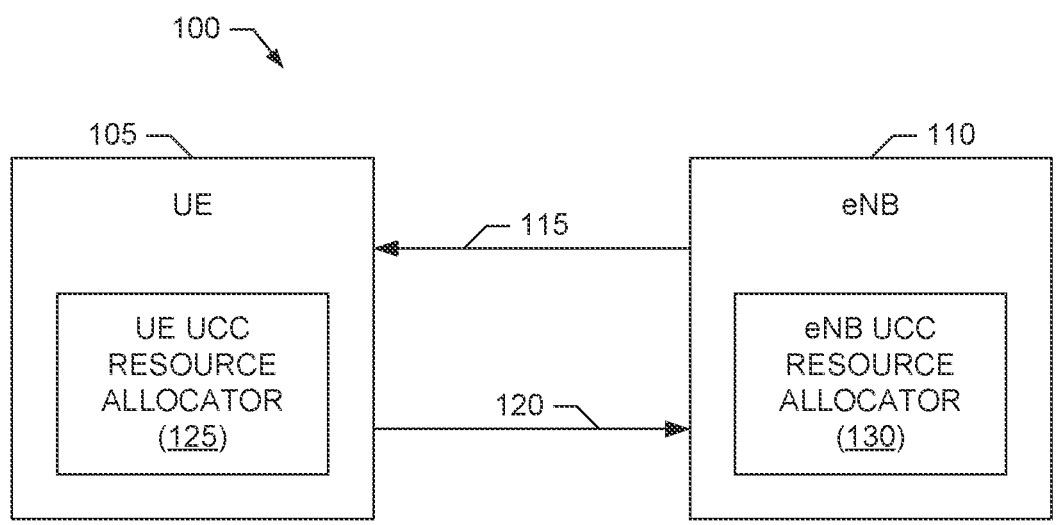
FIG. 1 is a block diagram of an example mobile communication system capable of supporting uplink control channel resource allocation for an enhanced downlink control channel as disclosed herein.

Methods, apparatus, systems and articles of manufacture (e.g., physical storage media) to enable uplink control channel resource allocation for an enhanced downlink control channel are disclosed herein. For example, some such disclosed methods are performed in/by a UE device, such as a mobile device, to determine an allocated uplink control channel resource using a position of a transmission. Some such example methods (e.g., which may correspond to example solutions #1 and #2 disclosed below) include receiving the transmission and determining its position. Such example methods can also include normalizing the position by a size of the transmission to form a normalized resource index. Such example methods can further include processing the normalized resource index (e.g., using a mapping function) to determine the allocated uplink control channel resource, and transmitting using the allocated uplink control channel resource.

For example, the allocated uplink control channel resource can correspond to an allocated PUCCH resource for positive/negative acknowledgement (e.g., ACK/NACK) reporting by the UE device in an LTE mobile communication system. In such examples, the transmission received by the UE device can correspond to an ePDCCH grant message, and the position of the transmission can correspond to a starting enhanced control channel element (eCCE) index of the ePDCCH grant message.

Additionally, some such example methods can further include receiving an indication (e.g., such as a table) of a set of possible uplink control channel resources. Such example methods also include determining a demodulation reference signal (DMRS) identifier that corresponds to a DMRS with which the UE device may decode the transmission. Such a DMRS identifier can include, for example, a multi-user multiple input and multiple output (MU-MIMO) layer identifier, an antenna port index, a DMRS scrambling index, etc., and/or any combination thereof. Also, in such example methods, the processing of the normalized resource index can include mapping the normalized resource index and the DMRS identifier to at least one uplink control channel resource in the set of possible uplink control channel resources.

Additionally or alternatively, some such example methods can further include receiving an indication of an uplink control channel offset (e.g., such as a PUCCH resource offset). In such examples, the processing of the normalized resource index can include processing the normalized resource index and the uplink control channel offset (e.g., using the mapping function) to determine the allocated uplink control channel resource.

Other disclosed example methods (e.g., which may correspond to example solution #3 disclosed below) performed in/by a UE device to determine an allocated uplink control channel resource include receiving information related to specification of a plurality of uplink control channel resource regions. Such example methods can also include receiving an indication specifying an allocated uplink control channel resource region from among the plurality of uplink control channel resource regions. Such example methods further include selecting a first uplink control channel resource within the allocated uplink control channel resource region as the allocated uplink control channel resource. For example, a position (e.g., a starting eCCE) of a received transmission (e.g., a received ePDCCH grant) can be mapped to index a particular uplink control channel resource within the allocated uplink control channel resource region. As another example, a hash function can be used to process input information, such as a UE identifier, a subframe index over which a transmission is received, etc., or any combination thereof, to index a particular uplink control channel resource within the allocated uplink control channel resource region.

Still other disclosed example methods (e.g., which may also correspond to example solution #3 disclosed below) performed in/by a UE device to determine an allocated uplink control channel resource can include receiving, at the UE, a downlink control channel carrying a PUCCH resource indicator. Such example methods can also include mapping the PUCCH resource indicator to a first offset, the first offset varying according to a subframe index. Such example methods can further include mapping a position of the received downlink control channel to a second offset. Additionally, such example methods can include mapping a linear combination of the first and the second offset to an index identifying the first allocated PUCCH resource, and transmitting a PUCCH on the first allocated PUCCH resource.

In some such examples, a majority of magnitudes of the second offset are smaller than a maximum magnitude of the first offset.

In some such examples, the downlink control channel is an enhanced physical downlink control channel (ePDCCH).

Some such example methods further include normalizing the position of the received downlink control channel to form a normalized resource index, mapping the normalized resource index to form the second offset and determining a third offset from an index of an antenna port used by the received downlink control channel. Such example methods can also include mapping a linear combination of the first, second, and third offsets to the index identifying the first allocated PUCCH resource.

Additionally or alternatively, in some such examples, the UE receives a plurality of physical downlink shared channel (PDSCHs), respective ones of the PDSCHs being received in respective different subframes. In such examples, the mapping of the linear combination can include adding a first subframe offset corresponding to a first subframe in which a first one of the PDSCHs was received. For example, the first subframe offset can increase monotonically with an index corresponding to a subframe in which a PDSCH was received.

Some such example methods can include determining a second allocated PUCCH resource, the second allocated PUCCH resource having a value equal to the first allocated PUCCH resource plus a constant. Such example methods can also include transmitting a PUCCH on one of the first or the second allocated PUCCH resources using a first antenna port.

Some such example methods can include determining a second allocated PUCCH resource, the second allocated PUCCH resource having a value equal to the first allocated PUCCH resource plus a constant. Such example methods can also include transmitting a PUCCH on the first allocated PUCCH resource using a first antenna port and on the second allocated PUCCH resource using the second antenna port, the PUCCH being transmitted simultaneously on the first and second antenna ports.

Yet other disclosed example methods (e.g., which may correspond to example solution #4 disclosed below) performed in/by a UE device to determine an allocated uplink control channel resource using a position of a transmission include receiving the transmission and determining its position. For example, the transmission may correspond to an ePDCCH grant message and the position may correspond to a starting eCCE index of the ePDCCH grant message. Such example methods also include determining a scaled index and a first group index from the position. Such example methods further include permuting the first group index to determine a second group index. Such example methods also include processing the scaled index and the second group index (e.g., using a mapping function) to determine the allocated uplink control channel resource, and transmitting using the allocated uplink control channel resource.

Further disclosed example methods (e.g., which may correspond to example solution #5 disclosed below) performed in/by a UE device to determine an allocated uplink control channel resource for an enhanced downlink control channel can include determining a position, such as a starting eCCE index, of the enhanced downlink control channel in a first enhanced downlink control channel set. Such example methods can also include determining a number of channel elements, such as a number of eCCEs, based on a second enhanced downlink control channel set, and determining a subframe offset based on the determined number of channel elements. For example, the second enhanced downlink control channel set may be the same as or different from the first enhanced downlink control channel set and, thus, may not correspond to the first enhanced downlink control channel set in which the enhanced downlink control channel is received. Such example methods can further include determining the allocated uplink control channel resource based on the determined position of the enhanced downlink control channel and the subframe offset, and transmitting using the allocated uplink control channel resource.

Additionally, some such example methods can further include determining the allocated uplink control channel resource based on the determined position of the enhanced downlink control channel, the subframe offset and a dynamic offset. For example, the dynamic offset may be obtained by the UE device from the received enhanced downlink control channel.

In some examples, such methods can determine the subframe offset based on a selected one of multiple enhanced downlink control channel sets, where the multiple downlink control channel sets are indexed, and the selected set is the set that has the smallest index. In some such example methods, the number of channel elements is determined from the selected set.

In other examples, such methods can determine the subframe offset based on a maximum number of channel elements that the UE device can expect in any subframe according to a configuration of the second enhanced downlink control channel set.

Still further disclosed example methods (e.g., which may also correspond to example solution #5 disclosed below) performed in/by a UE device (e.g., which may be operating in time division duplex (TDD) mode) to determine an allocated uplink control channel resource for an enhanced downlink control channel can include, in response to receiving, at the UE device, an indication of a dynamic resource offset in an enhanced (ePDCCH) transmitted in a first ePDCCH set, determining a position of the ePDCCH and determining a subframe offset. For example, the subframe offset can include a first term corresponding to a first subframe, wherein the first term is based on a number of eCCEs and depends on a condition associated with receiving a downlink control channel during the first subframe. Such example methods can also include processing, at the UE device, the indication of the dynamic resource offset, the position and the subframe offset to determine the allocated PUCCH resource, and transmitting a PUCCH on the allocated PUCCH resource.

In some examples, the subframe offset includes a sum of terms that includes the first term. In some examples, the number of eCCEs corresponds to a number of eCCEs included in the first ePDCCH set. In some examples, the number of eCCEs corresponds to a number of eCCEs included in a second ePDCCH set configured for the UE, the second ePDCCH set being different from the first ePDCCH set. For example, the number of eCCEs included in the second ePDCCH set can correspond to a largest number of eCCEs from among a plurality of ePDCCH sets configured for the UE. In some examples, the dynamic resource offset is an integer value in a range from negative two to positive two.

Some such example methods can also include calculating the first term based on the number of eCCEs and depending on the condition, wherein the calculating includes setting the first term equal to the number of eCCEs when the UE monitors the ePDCCH in the first subframe, and setting the first term equal to zero when the UE does not monitor the ePDCCH in the first subframe.

Some such example methods can also include, in response to not receiving ePDCCH in the first subframe, when the UE receives a PDCCH transmission, determining the allocated uplink control channel resource according to a procedure based on receiving the PDCCH transmission, wherein the procedure is not based on receiving the ePDCCH.

Corresponding example methods (e.g., which may correspond to example solutions #1 through #5 disclosed below) performed in/by an access node (e.g., an eNB) to enable a UE to determine an allocated uplink control channel resource for an enhanced downlink control channel are also disclosed herein. For example, such methods (e.g., which may correspond to example solution #3 disclosed below) can include transmitting, to the UE, an indication in a control channel specifying (or related to specification of) an allocated PUCCH resource region, which may include a plurality of PUCCH resources, from among a plurality of PUCCH resource regions. For example, the indication can be carried in an ePDCCH. Such example methods can also include receiving a PUCCH from the UE on an allocated PUCCH resource selected from among the plurality of PUCCH resources included in the allocated PUCCH resource region. Additionally, some such example methods can further include sending, to the UE, information related to specification of the plurality of PUCCH resource regions. For example, such information may be signaled to the UE through radio resource control signaling. Additionally or alternatively, such information may include a common parameter based on characteristics of the plurality of PUCCH resource regions. Additionally or alternatively, in some such example methods, two or more of the plurality of PUCCH resource regions can overlap.

Other disclosed example methods (e.g., which may also correspond to example solution #3 disclosed below) performed in/by an access node (e.g., an eNB) for allocating a PUCCH resource can include transmitting, to a UE, a downlink control channel (e.g., an ePDCCH) carrying a PUCCH resource indicator. Such example methods can also include mapping the PUCCH resource indicator to a first offset, the first offset varying according to a subframe index. Such example methods can further include mapping a position of the transmitted downlink control channel to a second offset. Additionally, such example methods can include mapping a linear combination of the first and the second offset to an index identifying the first allocated PUCCH resource. Some such example methods further include receiving a PUCCH from the UE in the allocated PUCCH resource.

Some such example methods can further include normalizing the position of the transmitted downlink control channel to form a normalized resource index and mapping the normalized resource index to form the second offset. Such example methods can also include determining a third offset from an index of an antenna port to be used at the UE to receive downlink control channel. Such example methods can further include mapping a linear combination of the first, second, and third offsets to the index identifying the allocated PUCCH resource.

In some such examples methods, a plurality of PDSCHs is to be transmitted to the UE, respective ones of the PDSCHs being transmitted in respective different subframes. In such examples, the mapping of the linear combination can include adding a first subframe offset corresponding to a first subframe in which a first one of the PDSCHs is to be transmitted. For example, the subframe offset can increase monotonically with an index corresponding to a subframe in which a PDSCH is to be transmitted.

Some such example methods include determining a second allocated PUCCH resource, the second allocated PUCCH resource having a value equal to the first allocated PUCCH resource plus a constant. Such example methods can also include receiving a PUCCH from the UE on at least one of the first or the second allocated PUCCH resources.

Still other disclosed example methods (e.g., which may correspond to example solution #5 disclosed below) performed in/by an access node (e.g., an eNB) for allocating a PUCCH resource can include determining an indication of a dynamic resource offset, determining a position of an ePDCCH, and determining a subframe offset for a UE. For example, the subframe offset can include a first term corresponding to a first subframe, wherein the first term is based on a number of eCCEs and depends on a condition determined in the access node and associated with the UE receiving a downlink control channel during the first subframe. Such example methods can also include transmitting the indication in the ePDCCH, the ePDCCH being located at the position.

Some such example methods further include determining the PUCCH resource to be allocated to the UE based on the indication, the position and the subframe offset. Such example methods can also include receiving a PUCCH from the UE in the PUCCH resource.

In some such examples, the number of eCCEs corresponds to a number of eCCEs included in the first ePDCCH set. In some such examples, the number of eCCEs corresponds to a number of eCCEs included in a second ePDCCH set configured for the UE, the second ePDCCH set being different from the first ePDCCH set. For example, the number of eCCEs included in the second ePDCCH set can correspond to a largest number of eCCEs from among a plurality of ePDCCH sets configured for the UE.

Some such example methods further include calculating the first term based on the number of eCCEs and depending on the condition, wherein the calculating includes setting the first term equal to the number of eCCEs when the UE is to monitor the ePDCCH in the first subframe, and setting the first term equal to zero when the UE is not to monitor the ePDCCH in the first subframe.

These and other example methods, apparatus, systems and articles of manufacture (e.g., physical storage media) to enable uplink control channel resource allocation for an enhanced downlink control channel are disclosed in greater detail below. For example, as described below, one or more of the example methods/solutions disclosed herein can correspond to and/or be implemented by operations performed by a machine in response to executing machine readable instructions, which are stored on a tangible machine readable storage medium (e.g., such as a tangible storage device, disk, etc.). In some examples, one or more of the example methods/solutions disclosed herein can correspond to and/or be implemented by operations performed by a suitably configured apparatus, such as an example uplink control channel resource allocator implemented by hardware and/or a processor with memory.

As noted above, a UE device in an LTE mobile communication system reports the detection status of data received via a PDSCH using a PUCCH resource allocated to the UE device. In prior LTE systems, the UE device can determine its PUCCH resource allocation from information received in, or otherwise associated with, a PDCCH used to provide scheduling information for the PDSCH. However, future LTE mobile communication systems are being developed to support an ePDCCH, which is different from the PDCCH, for providing control channel information, including PDCCH scheduling information, to UE devices. Example methods, apparatus, systems and articles of manufacture (e.g., physical storage media) disclosed herein enable PUCCH resource allocation to be performed using information received in, or otherwise associated with, an ePDCCH used to provide scheduling information for a PDSCH to be received by the UE device.

Turning to the figures, a block diagram of an example mobile communication system 100 supporting uplink control channel resource allocation for an enhanced downlink control channel as disclosed herein is illustrated in FIG. 1. In the illustrated example, the mobile communication system 100 corresponds to an LTE mobile communication system and includes an example UE device 105 in communication with an example eNB 110 or, more generally, an example access node 110. The UE device 105 is able to receive data from the eNB 110 over example downlink (DL) channels 115. The DL channels 115 can include, for example, one or more PDCCHs, one or more ePDCCHs, one or more PDSCHs, etc., which are described in greater detail below. The UE device 105 is also able to transmit data to the eNB 110 over example uplink (UL) channels 120, which can include, for example, one or more PUCCHs as described in greater detail below.

In the illustrated example of FIG. 1, the UE device 105 and the eNB 110 include respective functionality to support operation in an LTE-compliant mobile communication system, such as the system 100. Additionally, the UE device 105 includes an example UE uplink control channel (UCC) resource allocator 125 to implement UE functionality for performing uplink control channel resource allocation, such as PUCCH resource allocation, for an enhanced downlink control channel, such as an ePDCCH, as disclosed herein. Similarly, the eNB 110 includes an example eNB UCC resource allocator 130 to implement eNB functionality for performing uplink control channel resource allocation, such as PUCCH resource allocation, for an enhanced downlink control channel, such as an ePDCCH, as disclosed herein. Example implementations and operations of the UE UCC resource allocator 125 and the eNB UCC resource allocator 130 are described in greater detail below.

The example UE device 105 of FIG. 1 can be implemented by any type of user device, mobile station, user endpoint equipment, etc., such as a smartphone, a mobile telephone device that is portable, a mobile telephone device implementing a stationary telephone, a personal digital assistant (PDA), etc., or, for example, any other type of UE device. Furthermore, although one UE 105 and one eNB 110 are illustrated in FIG. 1, the example system 100 can support any number and/or type(s) of UE devices 105 and/or eNBs 110. Accordingly, uplink control channel resource allocation, as disclosed herein, can be performed with multiple UE devices 105 and/or eNBs 110 in a mobile communication system, such as the system 100. Moreover, the example system 100 may support other communication standards and/or functionality in addition to LTE mobile communications.

In an LTE system, such as the example system 100, PDCCHs can be used to carry DL control information (DCI) from an eNB, such as the eNB 110, to one or more UEs, such as the UE device 105. The DCI can include, for example, DL or UL data scheduling information, or grants, for one or more UEs. Such scheduling information may include a resource allocation, a modulation and coding rate (or transport block size), the identity of the intended UE or UEs, and/or other information.

A PDCCH could be intended for a single UE, multiple UEs or all UEs in a cell, depending on the nature and content of the scheduled data. For example, a broadcast PDCCH can be used to carry scheduling information for a PDSCH that is intended to be received by all UEs in a cell, such as a PDSCH carrying system information about the eNB. A multicast PDCCH can be intended to be received by a group of UEs in a cell. A unicast PDCCH can be used to carry scheduling information for a PDSCH that is intended to be received by only a single UE. In cells where relays or similar components are used, the downlink control information may be carried by a relay PDCCH (R-PDCCH) or a similar channel type. Any such type of channel will be referred to herein as the PDCCH. By decoding PDCCHs in a subframe, a UE knows the location of a DL data transmission scheduled to itself in the current DL subframe, and/or the location of an UL resource assignment for itself in a future UL subframe.

Figure 2:
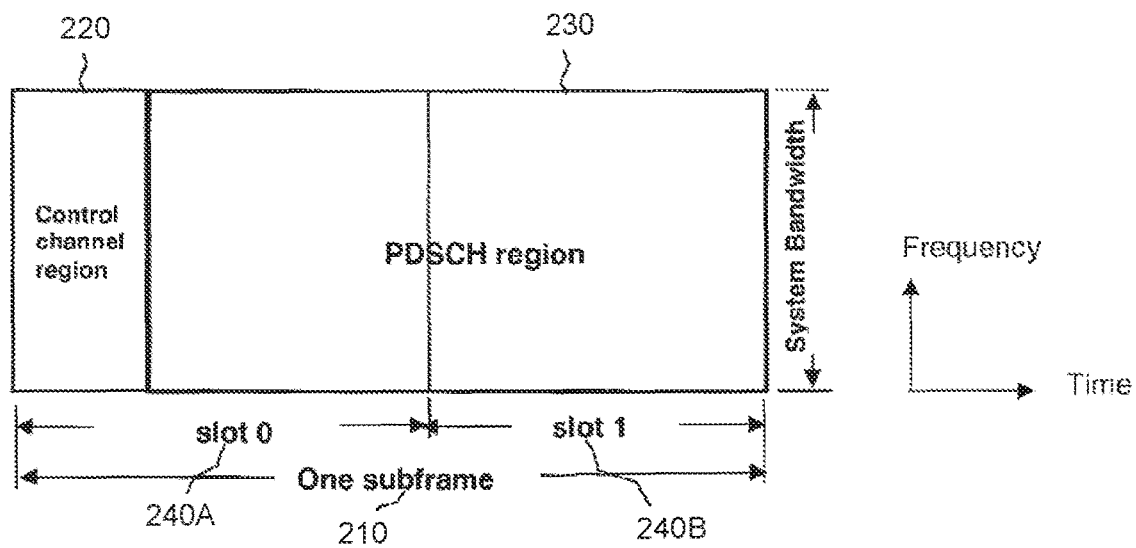
FIG. 2 illustrates an example downlink LTE subframe supported by the example system of FIG. 1.

FIG. 2 illustrates an example DL LTE subframe 210 that can be supported by the example system 100 of FIG. 1. Control information is transmitted in a control channel region 220 and may include a physical control format indicator channel (PCFICH), a physical hybrid automatic repeat request (HARQ) indicator channel (PHICH), and a PDCCH. The control channel region 220 includes the first few OFDM (orthogonal frequency division multiplexing) symbols in the subframe 210. The number of OFDM symbols for the control channel region 220 is either dynamically indicated by PCFICH, which is transmitted in the first symbol, or semi-statically configured in the case of carrier aggregation in, for example, LTE Release-10 (Rel-10).

Also referring to FIG. 2, a PDSCH, a physical broadcast channel (PBCH), a primary synchronization channel/secondary synchronization channel (PSC/SSC), and a channel state information reference signal (CSI-RS) are transmitted in a PDSCH region 230 of the subframe 210. DL user data is carried by the PDSCH channels scheduled in the PDSCH region 230. Cell-specific reference signals are transmitted over both the control channel region 220 and the PDSCH region 230.

The PDSCH is used in LTE to transmit DL data to a UE. The PDCCH and the PDSCH are transmitted in different time-frequency resources in a LTE subframe as shown in FIG. 2. Different PDCCHs can be multiplexed in the PDCCH region 220, while different PDSCHs can be multiplexed in the PDSCH region 230.

In a frequency division duplex system, a radio frame includes ten subframes of one millisecond each. A subframe 210 includes two slots in time and a number of resource blocks (RBs) in frequency as shown in FIG. 2. The number of RBs is determined by the system bandwidth. For example, the number of RBs is 50 for a 10 megahertz system bandwidth.

An OFDM symbol in time and a subcarrier in frequency together define a resource element (RE). A physical RB (PRB) can be defined as, for example, 12 consecutive subcarriers in the frequency domain and all the OFDM symbols in a slot in the time domain. An RB pair with the same RB index in slot 0 (represented by reference numeral 240A in FIG. 1) and slot 1 (represented by reference numeral 240B in FIG. 1) in a subframe can be allocated together to the same UE for its PDSCH.

Figure 3:
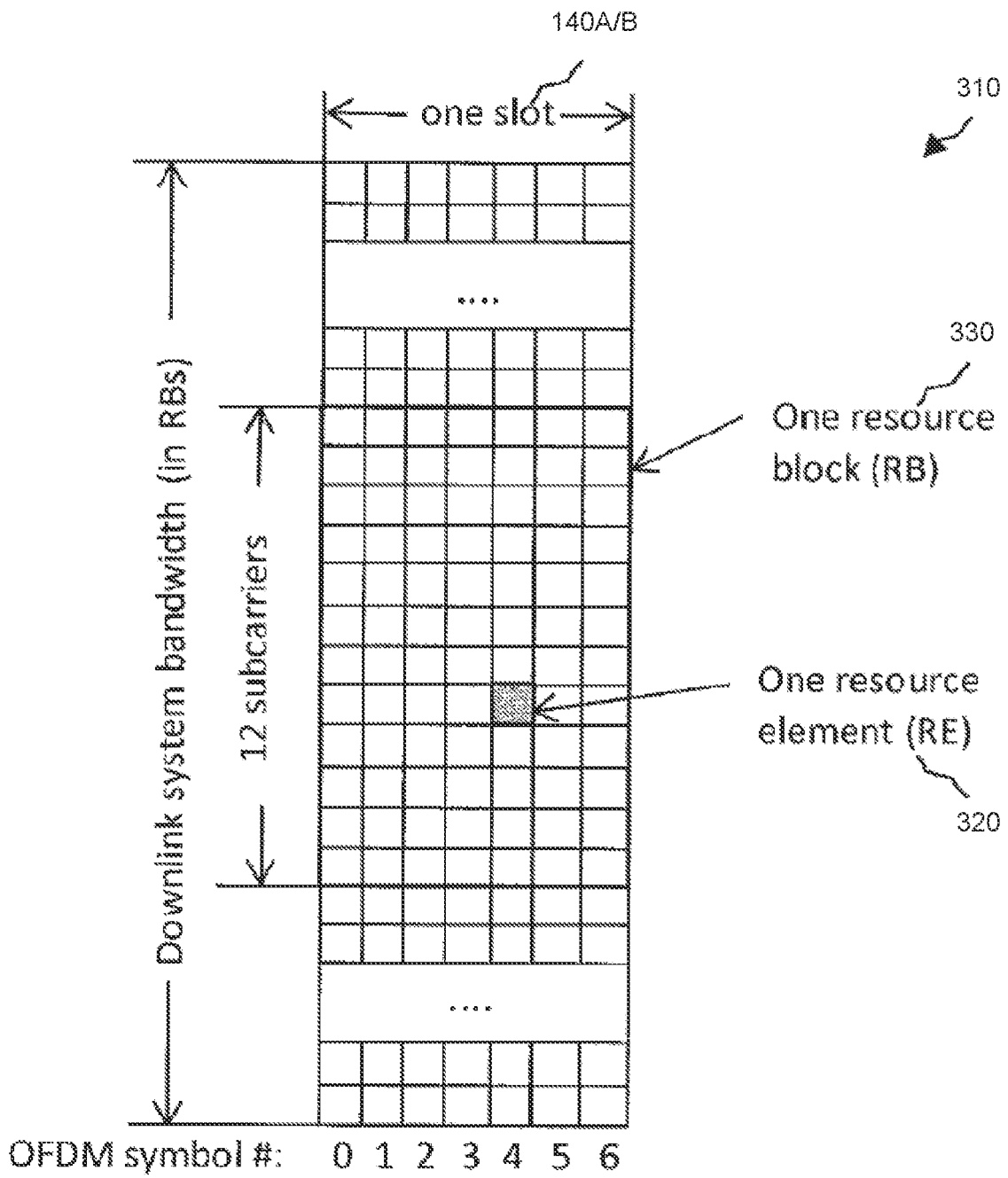
FIG. 3 illustrates an example LTE downlink resource grid supported by the example system of FIG. 1.

In an LTE system, such as the example system 100, multiple transmit antennas can be supported at the eNB for DL transmissions. Each antenna port can have a resource grid as illustrated in the example of FIG. 3. As shown in FIG. 3, a DL slot includes seven OFDM symbols in the case of a normal cyclic prefix configuration. A DL slot can include six OFDM symbols in the case of an extended cyclic prefix configuration. To simplify the following discussion, subframes with the normal cyclic prefix configuration will be considered hereinafter, but it should be understood that similar concepts are applicable to subframes with an extended cyclic prefix.

FIG. 3 shows an example LTE DL resource grid 310 within each slot 240A/B in the case of a normal cyclic prefix configuration. The resource grid 310 is defined for each antenna port or, in other words, each antenna port has its own separate resource grid 310. Each element in the resource grid 310 for an antenna port corresponds to a respective RE 320, which is uniquely identified by an index pair of a subcarrier and an OFDM symbol in a slot 240A/B. An RB 330 includes a number of consecutive subcarriers in the frequency domain and a number of consecutive OFDM symbols in the time domain, as shown in FIG. 3. An RB 330 is the basic unit used for the mapping of certain physical channels to REs 320.

For DL channel estimation and demodulation purposes, cell-specific reference signals (CRSs) are transmitted over each antenna port on certain predefined time and frequency REs in every subframe. CRSs can be used by UEs to demodulate the control channels. Resource element groups (REGs) are used in LTE for defining the mapping of control channels, such as the PDCCH, to REs. An REG consists of either four or six consecutive REs in an OFDM symbol, depending on the number of CRS configured. A PDCCH is transmitted on an aggregation of one or several consecutive control channel elements (CCEs), where one CCE consists of nine REGs. The CCEs available for a UE's PDCCH transmission are numbered from 0 to $N_{CCE}-1$. In LTE, multiple formats are supported for the PDCCH.

Downlink control information (DCI) is transmitted on the PDCCH and is used to allocate resources and assign other attributes for a shared data channel in a downlink or uplink. The PDCCH can occupy 1, 2, 4 or 8 CCEs depending on scheduling by the eNB. Larger CCEs can transmit a large number of physical bits, and consequently a lower code rate can be achieved, assuming the DCI payload size is the same. Therefore, a UE near a cell edge may use a greater number of CCEs than one near the cell center.

UE-specific reference signals, which can also be referred to as demodulation reference signals (DMRS), are used for PDSCH demodulation and are transmitted on antenna ports p=7, p=8, or one or several of p∈ {7, 8, 9, 10, 11, 12, 13, 14}. DMRSs are transmitted only in the RBs upon which the corresponding PDSCH for a particular UE is mapped.

Figure 4:
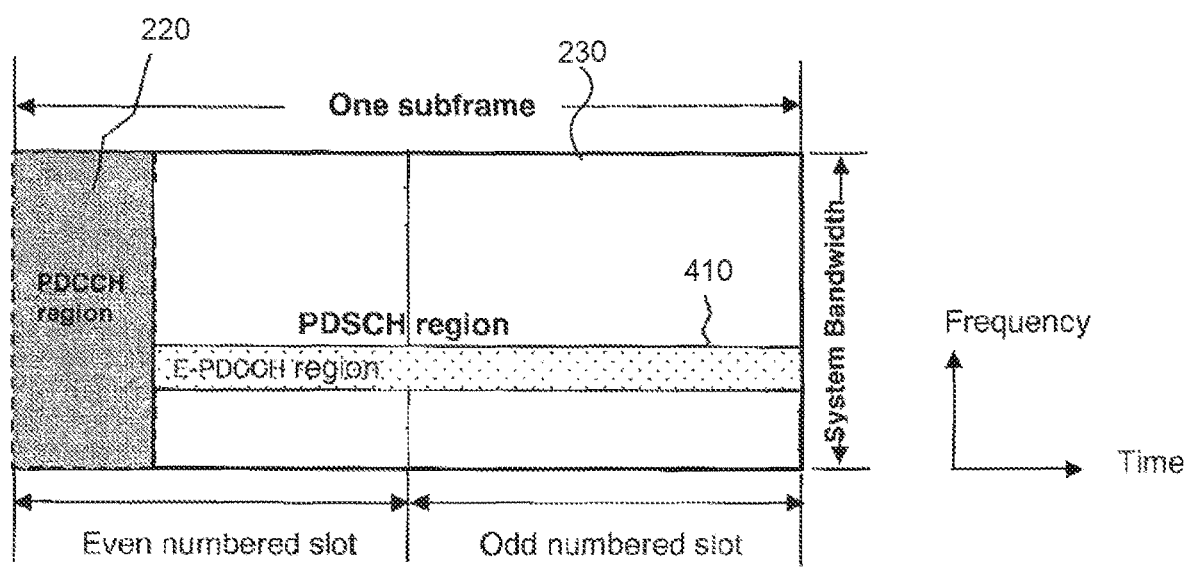
FIG. 4 illustrates example ePDCCH regions supported by the example system of FIG. 1.

With the introduction new features in LTE systems, the PDCCH capacity alone may not be enough to support a large number of UEs in a cell. One approach for PDCCH capacity enhancement is to transmit DCI in an ePDCCH residing in the legacy PDSCH region 230. The set of RBs and OFDM symbols reserved for an ePDCCH can be referred to as an ePDCCH region. An examples of a possible ePDCCH region 410 in a PDSCH region 230 is illustrated in FIG. 4. The time and frequency resources of the illustrated example ePDCCH region 410 may be configurable. Also, the PDCCH region 220 in a subframe may or may not be present in a subframe containing one or more ePDCCH regions 410.

PUCCH resource allocation in a LTE Rel-10 system is now described. In LTE, the detection status (e.g., in terms of acknowledgment and negative acknowledgment indications, abbreviated as Ack/Nack or A/N) of a downlink PDSCH at a UE is reported back to eNB over PUCCH in the uplink. When a single carrier is deployed at the eNB, PUCCH format 1a or format 1b is used to carry the A/N information, depending on whether one or two transport blocks are carried in the PDSCH. For frequency division duplex (FDD) operation in an LTE system, the PUCCH resource for carrying the A/N information on the first antenna, denoted as $p_0$ or $\tilde{p}_0$, at a UE is implicitly signaled to the UE by the index of the first CCE used to transmit the corresponding PDCCH for the PDSCH. As specified in 3GPP Technical Specification (TS) 36.213, V10.1.0 (Mar. 30, 2011), which is incorporated herein by reference in its entirety, the UE can derive the PUCCH resource for the first antenna using the following equation:

$$n_{PUCCH}^{(1,\tilde{p}_0)} = n_{CCE} + N_{PUCCH}^{(1)}.$$ Equation 1

In Equation 1, $n_{PUCCH}^{(1,\tilde{p}_0)}$ is the PUCCH resource index, $n_{CCE}$ is the index of the first CCE used to transmit the PDCCH that scheduled the PDSCH, and $N_{PUCCH}^{(1)}$ is an offset value configured by higher layer signaling. For two antenna port transmission by the UE, the PUCCH resource for the second antenna port, denoted as $p_1$ or $\tilde{p}_1$, is determined by the UE using the following equation:

$$n_{PUCCH}^{(1,\tilde{p}_1)} = n_{CCE} + 1 + N_{PUCCH}^{(1)}.$$ Equation 2

Because the set of PDCCH candidates or the UE specific search space (UESS) for a UE can vary subframe by subframe, the CCEs used for PDCCH transmission to the UE can also change. Accordingly, the PUCCH resource derived from the first CCE of a PDCCH can also vary. Therefore, the implicit resource for the PUCCH can be in different RBs depending on the subframe in which the corresponding PDCCH is received.

When more than one carrier is deployed by the eNB through carrier aggregation (CA), either PUCCH format 1b with channel selection or PUCCH format 3 may be configured to carry A/N information. In the case of PUCCH format 1b with channel selection, up to four (4) Ack/Nack bits can be supported, which means that PUCCH format 1b can be used to support two carriers. Channel selection can provide more Ack/Nack bits than PUCCH format 1b by selecting among multiple PUCCH resources. Therefore, multiple PUCCH resources are allocated to each UE. The resources are allocated differently depending on if PDCCHs are transmitted on a primary cell (PCell) or a secondary cell (SCell), and up to two or four PUCCH resources are signaled by PDCCHs on SCell and on PCell, respectively. For FDD operation in an LTE system, PUCCH resource(s) corresponding to a PDSCH scheduled by a PDCCH on the PCell is(are) derived by the UE using the following equation:

$$n_{PUCCH,j}^{(1)} = n_{CCE} + N_{PUCCH}^{(1)}.$$ Equation 3

In Equation 3, j∈ {0, 1, . . . , A–1} is the PUCCH resource index and A∈ {2,3,4} is the total number of PUCCH resources available to a UE in the subframe. For FDD operation in an LTE system with a transmission mode that supports up to two transport blocks, an additional PUCCH resource $n_{PUCCH,j+1}^{(1)}$ corresponding to a PDSCH scheduled by a PDCCH on the PCell is determined by the UE using the following equation:

$$n_{PUCCH,j+1}^{(1)} = n_{CCE} + 1 + N_{PUCCH}^{(1)}$$ Equation 4

The PUCCH resource(s) corresponding to a PDSCH scheduled by a PDCCH on the SCell is(are) signaled to a UE explicitly by a combination of higher layer and physical layer signaling, which is referred to as explicit resource allocation. For example, four PUCCH resources for the SCell are semi-statically configured by higher layer signaling for a UE. One or two of the four resources can then be selected dynamically through the PDCCH. Two bits of the PDCCH (e.g., two transmit power control (TPC) bits transmitted in DL grant) on the SCell are used as A/N resource indication (ARI) bits. One PUCCH resource is indicated for each combination of ARI bits.

In contrast to implicit signaling, explicit PUCCH resources addressed by the ARI are semi-statically allocated to each UE, and therefore do not move between PUCCH PRBs unless the UE is reconfigured using higher layer signaling. Since an implicitly signaled PUCCH resource can occupy different RBs on a subframe by subframe basis, but an explicitly signaled PUCCH occupies the same RB until the UE is reconfigured, the explicit and implicit PUCCH resources may not be in the same PUCCH PRB.

The explicit PUCCH resource(s) corresponding to each ARI state are independently signaled such that they can be positioned anywhere in the PUCCH resource. This means that the PUCCH resources can be, but are not necessarily, configured to be in the same PRB.

In the case of PUCCH format 3, the PUCCH resource is also explicitly signaled by higher layer signaling.

Further aspects of the ePDCCH are now described. Building on the description provided above, in LTE Release 11 (Rel-11), PDCCH enhancement will be introduced by allowing transmission of both downlink and uplink control channel information (e.g., DCI) over the legacy PDSCH region to support increased control channel capacity, inter-cell interference management and new LTE features, such as coordinated multi-point transmission (CoMP). This enhanced PDCCH is generally referred to as an ePDCCH. The minimum time-frequency resource unit allocated to an ePDCCH is referred as an enhanced control channel element (eCCE). An eCCE consists of a predefined number of resource elements (REs) within two physical resource blocks (PRBs) in adjacent slots (e.g., corresponding to a single resource block pair). An eCCE may be further divided into multiple enhanced resource element groups (eREGs). An ePDCCH may be transmitted over one or multiple eCCEs, referred to as aggregation levels. The position of an eCCE is identified with a non-negative integer eCCE index.

There can be one or two ePDCCH transmission modes configured to a UE in a subframe, referred to as a localized mode and a distributed mode, respectively. Localized and distributed ePDCCHs can either share the same PRB pairs or use different PRB pairs.

For at least localized ePDCCH transmission, it is envisioned that a UE would be informed by an eNB about the PRB pairs over which an ePDCCH may be transmitted to the UE, which may also be referred to as an ePDCCH region, as described above. For example, it is envisioned that the eCCEs over these PRB pairs would be indexed starting from the first possible eCCE location in these PRB pairs. In some examples, UEs may be configured with different PRBs and thus the eCCE indexing is local to a UE or, in other words, is UE specific. In other examples, a set of common PRB pairs are configured for a group, or all, UEs in an area and the eCCEs are instead indexed over this set of common PRBs known to the UEs receiving the ePDCCH. In either example, an index uniquely identifies the eCCE regardless of whether the ePDCCH is transmitted in localized or distributed mode.

In each subframe, a UE will search over a set of ePDCCH resources (also referred to as ePDCCH candidates) that may contain a grant for the UE at each ePDCCH aggregation level. The resources for the ePDCCH candidates may change from one subframe to another. The set of ePDCCH candidates at each aggregation level is referred to as a search space. For ePDCCH demodulation purposes, one of the four demodulation reference signal (DMRS) ports (e.g. 7 to 10) may be used by the UE for channel estimation in ePDCCH detection in the case of localized ePDCCH. Either the same or different DMRS ports may be allocated to different ePDCCH candidates at each aggregation level. The DMRS port allocation can be either explicitly signaled by the eNB or implicitly derived based on the location of the ePDCCH among ePDCCH resources and/or other parameters, such as UE ID, etc., or any combination thereof. For distributed ePDCCH transmission, any one or multiple DMRS ports may be allocated to an ePDCCH candidate.

Multiple ePDCCHs may be transmitted over different multiple input multiple output (MIMO) layers to different UEs using multi-user MIMO (MU-MIMO) transmission. In such examples, different MU-MIMO transmissions may occupy the same set of eCCEs and, thus, the transmissions are not distinguishable by eCCE indices alone. However, the MIMO layers transmitted to the UEs may be distinguished by which DMRS is used for their transmission. The DMRS may be associated with an antenna port and/or a scrambling index.

It is envisaged that ePDCCH may be transmitted in a common search space (CSS) or a UE specific search space (UESS). When transmitted in a common search space, multiple UEs may search for an ePDCCH in the same set of eCCEs, and this set of eCCEs is broadcast to the UEs in a message on a common control channel, or specified such that the set of eCCEs is known to the network and UEs (e.g. by including the values of the set in physical layer specifications). Because UE specific signaling is not needed to determine the common search space, UEs can receive grants in an ePDCCH common search space while not in connected mode. This can reduce signaling overhead and enable reception of ePDCCH without the UE becoming radio resource control (RRC) connected, thereby allowing stand-alone operation of a carrier containing only ePDCCH.

The eCCEs of a UE specific search space are determined using variables or parameters that are specific to a particular UE, such as a random sequence initialized by a UE identifier (ID) or a value signaled to the UE using radio resource control (RRC) signaling. Because UE specific search spaces for different UEs may occupy different eCCEs, this can allow the ePDCCHs for multiple UEs to be multiplexed, improving spectral efficiency for ePDCCH.

It is possible that the index of an eCCE could be determined differently in a CSS than in an UESS. When they are determined differently, the eCCE index of an ePDCCH in CSS could be the same as the eCCE index of an ePDCCH in a UESS. Therefore, in some examples, both the search space and the ePDCCH resource position are used to uniquely identify an ePDCCH within the available ePDCCH resources.

Similarly, it is possible that the position of a UE's ePDCCH could be determined differently for localized and distributed ePDCCH transmission. A localized ePDCCH in one PRB could have the same ePDCCH position as a distributed ePDCCH in another PRB. Therefore, in some examples, both the ePDCCH allocation type (localized or distributed allocation) and the ePDCCH position are used to uniquely identify an ePDCCH within ePDCCH resources.

Both ePDCCH and PDCCH may be present in a subframe. One feature for ePDCCH is that ePDCCH resources could be occupied by PDSCH if not scheduled with localized ePDCCH transmission, so ePDCCH overhead could be low even though large resources are configured for potential ePDCCH transmission.

As discussed previously, for most PDSCH transmissions in the downlink to a UE, a corresponding PUCCH resource is needed in the uplink for A/N transmission by the UE. This is true also for PDSCH transmission scheduled by ePDCCH. However, as described above, LTE Rel-10 implicit PUCCH resource allocation was designed based on a one to one mapping between PUCCH and PDCCH resources. Thus, using those same techniques to perform PUCCH resource allocation for PDSCHs scheduled by ePDCCHs can lead to several problems. For example, such prior PDCCH techniques for PUCCH resource allocation can yield inefficient PUCCH resources (e.g., by over-allocating PUCCH resources). Additionally, as discussed above, the starting eCCE index of an ePDCCH may not uniquely identify the ePDCCH and thus, the prior PDCCH techniques for PUCCH allocation, which use just the starting CCE index to identify the PDCCH, may result in ambiguous PUCCH allocations when used with an ePDCCH. For example, in the case of MU-MIMO transmission, an eCCE index may not uniquely identify an ePDCCH and, thus, PUCCH resources determined for a given eCCE index could be the same for two MU-MIMO users with ePDCCHs in the same eCCEs. This could lead to different UEs transmitting on the same PUCCH resource, and the inability of the network to decode their Ack/Nack transmission. As another example, because eCCEs in common and UE specific search spaces could be indexed separately, one eCCE index may not uniquely identify the location of an ePDCCH in both search spaces. It may be possible for an ePDCCH in one UE's CSS to have the same eCCE indices as an ePDCCH in another UE's UESS. If implicit resource allocation used only the eCCE index, as in the case of the prior PDCCH-based techniques of LTE Rel-10, the same PUCCH resources could be allocated to both UEs. As yet another example, localized and distributed ePDCCH may also be indexed separately. If a UE scheduled on a localized ePDCCH and another UE scheduled on a distributed ePDCCH can occupy eCCEs with the same indices, then determining their PUCCH resources solely from the eCCE index could result in a PUCCH resource collision.

Another problem associated with using prior PDCCH-based resource allocation is that a UE's search space on PDCCH in LTE Release-8 (Rel-8) may be constrained such that higher aggregation level PDCCHs can only be scheduled in a restricted set of CCEs. An aggregation level L PDCCH can only be scheduled in CCEs that satisfy mod $(n_{CCE}, L)=0$, where $n_{CCE}$ is the location of the PDCCH in the available PDCCH resources. Therefore, some CCEs may be more frequently occupied than others. More quantitatively, consider an example of $L_0=4$ CCEs that satisfy $mod(n_{eCCE}, 4) \in \{0,1,2,3\}$. For purposes of discussion, define $\bar{n}_{CCE} = mod(n_{CCE}, 4)$, and refer to a set of CCEs that have $\bar{n}_{CCE} = i$ as CCE group i. For example, in an urban macro environment, the probability that aggregation levels 1, 2, 4, and 8 are occupied has been found in one example simulation to be 29.8%, 39.4%, 18.1%, and 12.7%, respectively. Aggregation level 1, 2, 4, and 8 PDCCHs can be scheduled in CCEs that satisfy $\bar{n}_{CCE} \in \{0,1,2,3\}$, $\bar{n}_{CCE} \in \{0,2\}$, $\bar{n}_{CCE} \in \{0\}$, and $\bar{n}_{CCE} \in \{0\}$, respectively. Therefore, assuming that PDCCHs at a given aggregation level are distributed evenly over all the possible locations, the probability of occupancy in an urban macro environment for the CCE groups in the foregoing example is: 29.8/4+39.4/2+18.1+12.7=58% for CCE group 0; 29.8/4=7.4% for CCE group 1; 29.8/4+39.4/2=27.1% for CCE group 2; and 29.8/4=7.4% for CCE group 3. In such an example, CCE group 0 is 58/7.4=7.8 times more likely to be occupied than CCE group 1. Unfortunately, because the PUCCH resources corresponding to CCE groups are evenly distributed across PUCCH resources, all PRBs in Rel-8 PUCCH resources tend to be occupied. This means it is infeasible to exploit uneven occupancy of CCE groups to improve PUCCH resource allocation efficiency.

With reference to FIG. 1, the UE UCC resource allocator 125 of the UE 105 and the eNB UCC resource allocator 130 of the eNB 110 implement one or more solutions, or combination(s) thereof, for performing uplink control channel resource allocation for an enhanced downlink control channel, which includes PUCCH resource allocation for an ePDCCH. In at least some examples, the solution(s) implemented by the UE UCC resource allocator 125 and the eNB UCC resource allocator 130 can overcome one or more of the problems associated with PDCCH-based resource allocation techniques discussed above. Example resource allocation solutions that can be implemented by the UE UCC resource allocator 125 and the eNB UCC resource allocator 130 include, but are not limited to, any one or more (or combination) of the following:

A) hybrid implicit/explicit resource allocation, where one or more tables of PUCCH resources corresponding to at least the location of a transmission to a UE on ePDCCH or PDSCH are used for PUCCH resource allocation;
  B) extended implicit resource allocation where PUCCH resources are not signaled, but instead are directly mapped from the transmission location of the ePDCCH using UE specific parameters;
  C) dynamic signaling of an A/N PUCCH resource region in downlink control information;
  D) PUCCH resource remapping, where infrequently occupied CCEs are mapped closer together in PUCCH resource regions;
  E) PUCCH resource allocation using a dynamic PUCCH offset indication provided in DCI.

For example, hybrid resource allocation allows arbitrary mapping to PUCCH resources, including mapping a many-to-one ePDCCH resource index to a PUCCH resource mapping that allows more efficient operation for aggregation levels greater than 1. Also, UE-specific PUCCH resources are available, and localized and distributed ePDCCHs can share the same PUCCH resource. However, hybrid resource allocation may increase RRC signaling overhead.

Extended implicit resource allocation also allows for efficient usage of PUCCH resources for aggregation levels greater than 1 by using a many to one mapping. Extended implicit resource allocation differs from hybrid resource allocation in that it does not utilize explicit signaling of PUCCH resources. However, because the PUCCH resource allocations are made different in extended implicit resource allocation by making the input parameters to the allocation function different, extended implicit resource allocation may utilize more parameters and more complexity to match the same level of flexibility as hybrid implicit/explicit resource allocation.

Dynamic signaling of an A/N PUCCH resource region selects among multiple PUCCH resource regions that are semi-statically configured to a UE. A region is selected dynamically through DCI. Within the selected region, a predefined mapping table or function (e.g., such as that associated with hybrid resource allocation or extended implicit resource allocation) can be used to map between an ePDCCH scheduled PDSCH and a PUCCH resource.

PUCCH resource remapping does not use a many to one mapping. Instead, it is based on the realization that the LTE Rel-10 PDCCH search space constraints can result in rather uneven use of PDCCH CCEs. Based on this realization, PUCCH resource remapping makes changes to Rel-10 implicit PUCCH resource allocation such that groups of CCEs are mapped to PUCCH resources based on how frequently they are occupied. For example, the most frequently occupied eCCE groups can be mapped to low PUCCH resource indices, so PUCCH PRBs corresponding to high PUCCH resource indices may be infrequently occupied, and so a smaller amount of total PUCCH resources may be used.

These and other resource allocation solutions that can be implemented by the UE UCC resource allocator 125 and the eNB UCC resource allocator 130 of FIG. 1 are described in greater detail below in the context of the flowcharts and illustrations provided in FIGS. 5-25. Also, as noted above, various combinations of the above solutions can be implemented by the UE UCC resource allocator 125 and the eNB UCC resource allocator 130. For example, resource remapping can be performed within each dynamically signaled resource region by combining dynamic signaling of an A/N PUCCH resource region (C) with PUCCH resource remapping (D).

While an example manner of implementing the mobile communication system 100, the UE device 105, the eNB 110, the UE UCC resource allocator 125 and the eNB UCC resource allocator 130 has been illustrated in FIG. 1, one or more of the elements, processes and/or devices illustrated in FIG. 1 may be combined, divided, re-arranged, omitted, eliminated and/or implemented in any other way. Further, the example mobile communication system 100, the example UE device 105, the example eNB 110, the example UE UCC resource allocator 125 and/or the example eNB UCC resource allocator 130 of FIG. 1 may be implemented by hardware, software, firmware and/or any combination of hardware, software and/or firmware. Thus, for example, any of the example mobile communication system 100, the example UE device 105, the example eNB 110, the example UE UCC resource allocator 125 and/or the example eNB UCC resource allocator 130 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example mobile communication system 100, the example UE device 105, the example eNB 110, the example UE UCC resource allocator 125 and/or the example eNB UCC resource allocator 130 are hereby expressly defined to include a tangible computer readable medium such as a memory, digital versatile disk (DVD), compact disk (CD), Blu-ray Disc™ etc., storing such software and/or firmware. Further still, the example mobile communication system 100, the example UE device 105, the example eNB 110, the example UE UCC resource allocator 125 and/or the example eNB UCC resource allocator 130 of FIG. 1 may include one or more elements, processes and/or devices in addition to, or instead of, those illustrated in FIG. 1, and/or may include more than one of any or all of the illustrated elements, processes and devices.

Flowcharts representative of example processes for implementing the example mobile communication system 100, the example UE device 105, the example eNB 110, the example UE UCC resource allocator 125 and/or the example eNB UCC resource allocator 130 of FIG. 1 are shown in FIGS. 5-24. In these examples, the process represented by each flowchart may be implemented by one or more programs comprising machine readable instructions for execution by a processor, such as the processor 2512 shown in the example processing system 2500 discussed below in connection with FIG. 25. The one or more programs, or portion(s) thereof, may be embodied in software stored on a tangible computer readable storage medium such as a CD-ROM, a floppy disk, a hard drive, a digital versatile disk (DVD), a Blu-ray Disc™, or a memory associated with the processor 2512, but the entire program or programs and/or portions thereof could alternatively be executed by a device other than the processor 2512 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 5-24, or one or more portion(s) thereof, may be implemented manually. Further, although the example processes are described with reference to the flowcharts illustrated in FIGS. 5-24, many other methods of implementing the 5-24 may alternatively be used. For example, with reference to the flowcharts illustrated in FIGS. 5-24, the order of execution of the blocks may be changed, and/or some of the blocks described may be changed, eliminated, combined and/or subdivided into multiple blocks.

As mentioned above, the example processes of FIGS. 5-24 may be implemented using coded instructions (e.g., computer readable instructions) stored on a tangible computer readable storage medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk, and to exclude propagating signals. Additionally or alternatively, the example processes of FIGS. 5-24 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device and/or storage disk, and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 5:
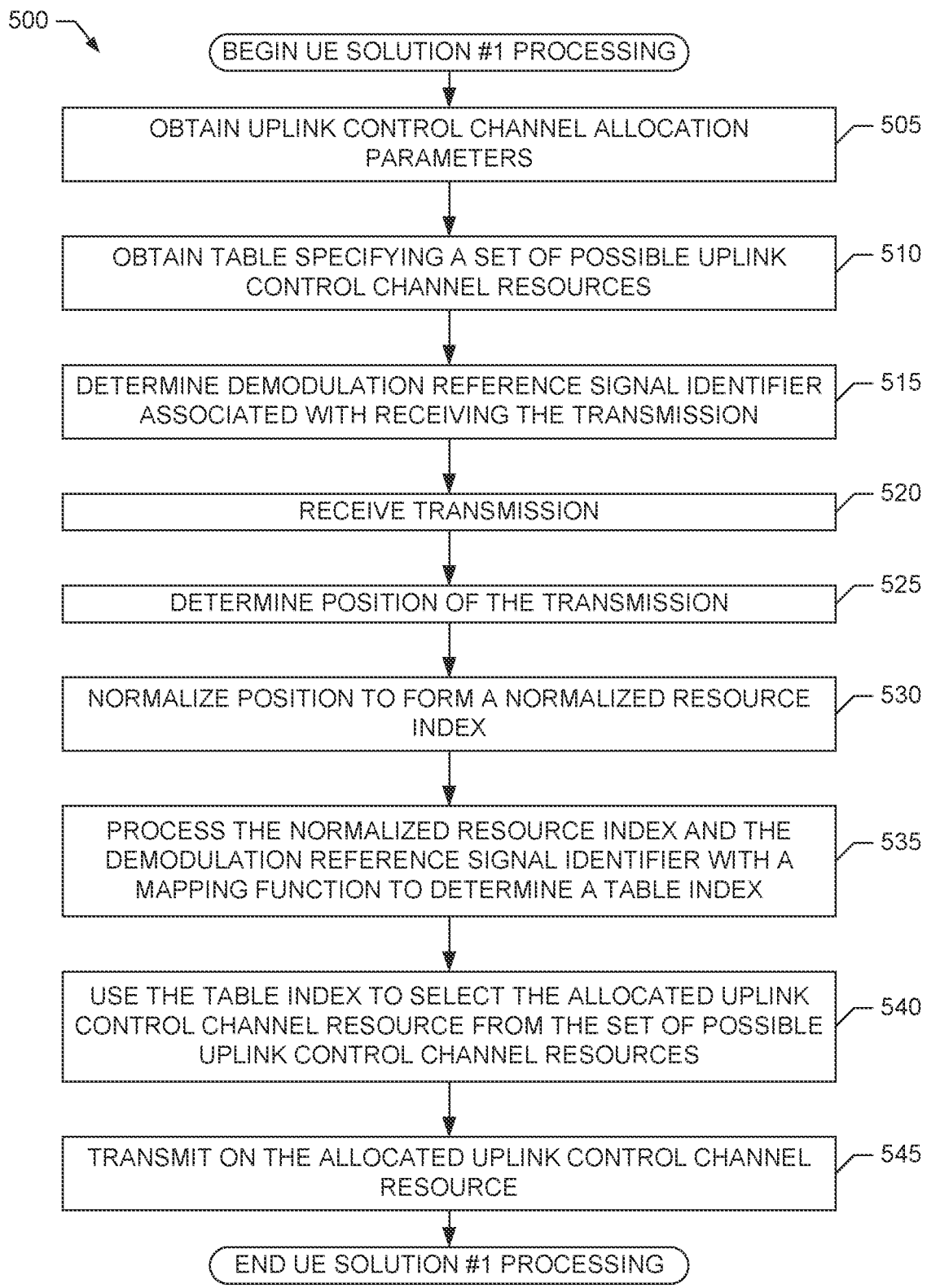
FIG. 5 is a flowchart representative of a first example UE process for performing uplink control channel resource allocation for an enhanced downlink control channel in the example system of FIG. 1.
Figure 6:
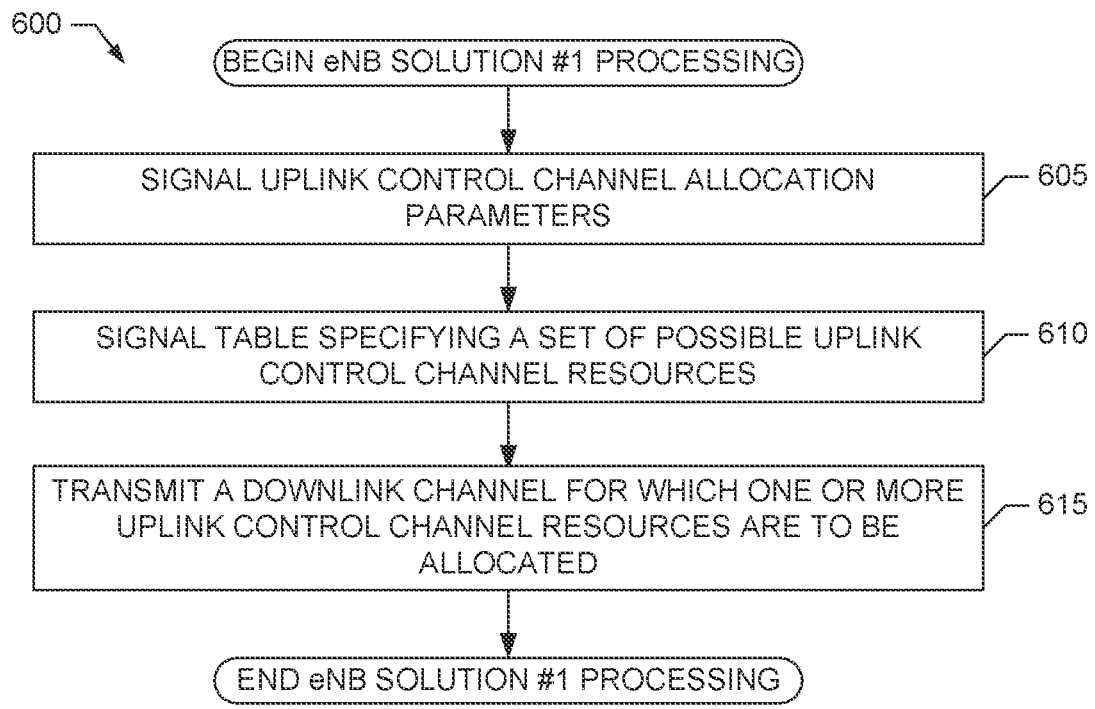
FIG. 6 is a flowchart representative of a first example eNB process for performing uplink control channel resource allocation for an enhanced downlink control channel in the example system of FIG. 1.

A first example UE process 500 that may be executed to implement the example UE UCC resource allocator 125 of FIG. 1 is illustrated in FIG. 5. A corresponding first example eNB process 600 that may be executed to implement the example eNB UCC resource allocator 130 of FIG. 1 is illustrated in FIG. 6. The first example processes 500 and 600 implement a first example solution (also referred to herein as example solution #1) disclosed herein for performing PUCCH resource allocation for an ePDCCH. Example solution #1 corresponds to hybrid implicit/explicit allocation using, for example, DMRS and eCCE or PRB indices. Furthermore, the first example processes 500 and 600 can be used to implement at least two example types of hybrid implicit/explicit PUCCH resource allocation. In the first example type, the resource allocation is not adjusted by the ePDCCH region size, whereas the allocation in the second example type is a function of the ePDCCH region size.

For hybrid allocation with a fixed ePDCCH region size, a table of PUCCH resources is signaled by the eNB 110 to the UE 105 and used by the UE 105 to determine the PUCCH resources. The resource(s) the UE 105 is to transmit on are determined by selecting the resources from the table using at least the position of a downlink transmission to the UE 105, the position having a resource index. For example, the downlink transmission may be a downlink grant on an ePDCCH, a data transmission on a PDSCH, etc. In addition to the resource index, a DMRS identifier may be used to select PUCCH resources, for example when the UE 105 receives MU-MIMO ePDCCHs. For example, the DMRS identifier may be an antenna port, a DMRS scrambling index, etc., or it may identify a combination of antenna port and DMRS scrambling index, etc. The table may be specific to each UE 105, and may contain different sets of PUCCH resources according to the type of the ePDCCH transmission, where the sets are selected depending on, for example, whether the ePDCCH is in a CSS or a UESS, and/or whether the ePDCCH is distributed or localized. PUCCH resources can be shared between these sets to improve resource usage efficiency, or the sets may have more disjoint resource usage in order to decrease the chance of resource assignment collisions, depending on the loading and available PUCCH resource. In some examples, a network 100 using hybrid implicit/explicit allocation may construct the tables assigned to the UE 105 using techniques similar to those used for ARI in LTE Rel-10.

In example solution #1, the use of a table of PUCCH resources is enabled by a disclosed example many-to-one mapping of a normalized resource index to a table index that ensures the table index stays within the bounds of the table. In some examples, the normalized resource index is calculated by dividing the resource index of a downlink control or data transmission to the UE by its length, and quantizing the dividend to an integer. In some examples, the many to one mapping may map a sum of the normalized resource index and a scaled index of a DMRS configuration or antenna port to the table index.

With the foregoing in mind, and with reference to the preceding figures and associated descriptions, the example process 500 of FIG. 5 begins execution at block 505 at which the UE UCC resource allocator 125 of the UE 105 obtains (e.g., via signaling from the eNB 110 and/or any other manner) any uplink control channel allocation parameters to be used for performing PUCCH resource allocation. At block 510, the UE UCC resource allocator 125 obtains (e.g., via signaling from the eNB 110 and/or any other manner) one or more tables specifying a set of possible PUCCH resources to which the UE 105 may be allocated. At block 515, the UE UCC resource allocator 125 determines a DMRS identifier based on DMRS information associated with an ePDCCH transmission to be received by the UE 105. At block 520, the UE 105 receives an ePDCCH transmission for which one or more PUCCH resources are to be allocated. At block 525, the UE UCC resource allocator 125 determines a position (e.g., an eCCE index) of the received ePDCCH transmission.

As described above and in greater detail below, at block 530, the UE UCC resource allocator 125 normalizes the determined position of the received ePDCCH transmission to determine a normalized resource index. At block 535, the UE UCC resource allocator 125 processes the normalized resource index and the DMRS identifier with a mapping function (e.g., which may be based on the parameters obtained at block 505), as described in greater detail below, to determine a table index into the table obtained at block 510. At block 540, the UE UCC resource allocator 125 uses the table index to select an allocated PUCCH resource from the set of possible PUCCH resources included in the table. Then, at block 545, the UE 105 transmits on the allocated PUCCH resource selected from the table.

Correspondingly, the example process 600 of FIG. 6 begins execution at block 605 at which the eNB UCC resource allocator 130 of the eNB 110 provides (e.g., via signaling and/or any other appropriate manner) to the UE 105 any uplink control channel allocation parameters to be used for performing PUCCH resource allocation. At block 610, the eNB UCC resource allocator 130 provides (e.g., via signaling and/or any other manner) one or more tables specifying a set of possible PUCCH resources to which the UE 105 may be allocated. At block 615, the eNB 110 transmits the ePDCCH for which the one or more PUCCH resources are to be allocated. In some examples, the eNB 110 determines a DMRS port and/or a DMRS scrambling index and the associated DMRS identifier for use in transmitting the ePDCCH. The eNB 110 also determines the position (e.g. an eCCE index) at which it will transmit the ePDCCH. The eNB 110 then transmits the ePDCCH to the UE 105 at the determined position using the DMRS port and/or the DMRS scrambling index.

Figure 7:
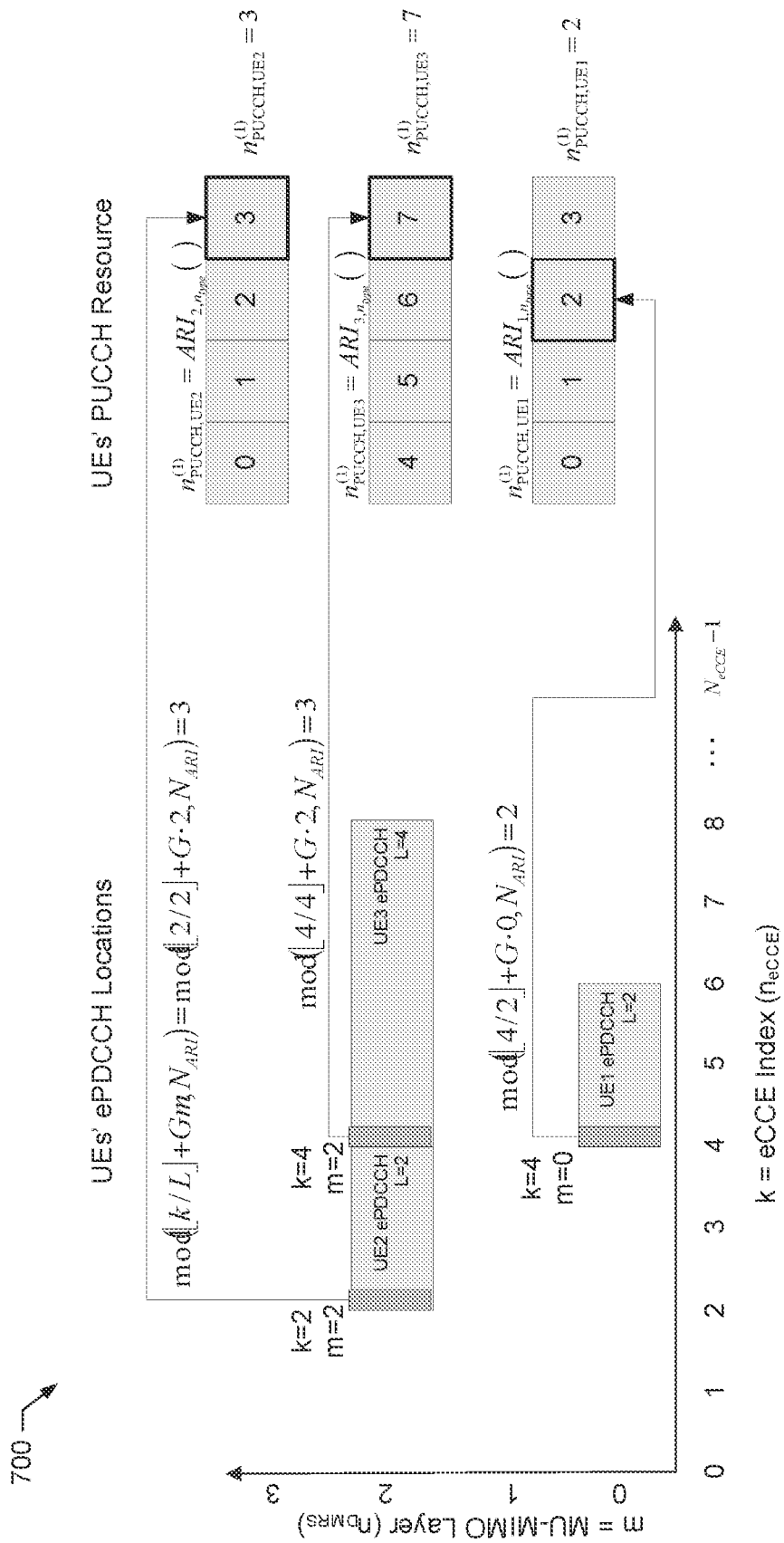
FIGS. 7-8 illustrate example operations of the example processes of FIGS. 5-6.

An example operation 700 of the example processes 500 and 600 implementing example solution #1 in which the position of an ePDCCH is mapped to a PUCCH resource is illustrated in FIG. 7. In the illustrated example of FIG. 7, a normalized resource index is calculated as $\lfloor k/L \rfloor$, using the index of the first eCCE of a UE's ePDCCH ('k') and the length of the ePDCCH ('L') in units of eCCE, and where $\lfloor x \rfloor$ is the largest integer smaller than or equal to the real number x. The normalized resource index $\lfloor k/L \rfloor$ and the ePDCCH's MU-MIMO layer ('m') are then combined and sent to a modulo function to produce a table index. In the illustrated example, the table index calculation is expressed as mod($\lfloor k/L \rfloor$+Gm, $N_{ARI}$). In the illustrated example of FIG. 7, the MU-MIMO scale factor, G, and the table size, $N_{ARI}$, are assumed to be G=2 and $N_{ARI}$=4. The table index is used in the corresponding table for the UE to determine the PUCCH resource allocated for that UE, where $ARI_{u,n_{type}}$ is a table of PUCCH resources specific to UE denoted by u in FIG. 7. The UE's allocated PUCCH resource is shown as $n_{PUCCH, UEu}^{(1)}$ in the FIG. 7.

The example operation 700 illustrated in FIG. 7, which corresponds to the first type of hybrid implicit/explicit allocation that is not adjusted by the ePDCCH region size, can be modified to support cases when, for example, the number of PUCCH resources a UE uses varies. When the number of available ePDCCH resources varies, it may be possible for the mapped PUCCH resources to exist in one subframe and not in another. Therefore, when the number of PUCCH resources may vary with time, the second type of hybrid implicit/explicit allocation, which corresponds to hybrid implicit/explicit allocation that is a function of the ePDCCH region size, may be used to vary the mapping to ensure that it stays within the available PUCCH resources and/or to improve PUCCH resource utilization efficiency.

For example, PUCCH resource efficiency may be improved by using a variable PUCCH resource scale factor on the PUCCH resource value looked up from the table. As described in further detail below, the PUCCH resource scale factor can be calculated in each subframe according to the available PUCCH resource, which allows the mapping to track the available PUCCH resource.

Further details concerning example solution #1, which corresponds to hybrid implicit/explicit resource allocation and which may be implemented by the example processes 500 and/or 600, are now provided. Per the discussion above, two disclosed examples of hybrid implicit/explicit allocation are considered. In the first, the resource allocation is not adjusted by the ePDCCH region size, whereas the allocation in the second disclosed example is a function of the ePDCCH region size.

In an example of hybrid PUCCH allocation with a fixed ePDCCH region size, which may be implemented by the example processes 500 and/or 600, a table of PUCCH resources is used to determine the PUCCH resources a UE (e.g., the UE 105) is to transmit on. The resources are at least determined by an ePDCCH or a PDSCH resource index. A normalized resource index is calculated by dividing the resource index by the length of the ePDCCH or PDSCH transmission to the UE, and quantizing the dividend to an integer. The normalized index is used to determine the UE's PUCCH resources from the table. In addition to the resource index, a DMRS identifier may be used to determine PUCCH resources when a UE can receive MU-MIMO ePDCCHs. The table may contain different sets of PUCCH resources according to the type of the ePDCCH transmission, where the sets are selected depending on whether the ePDCCH is in CSS or UESS, and/or on whether the ePDCCH is distributed or localized. The PUCCH resource allocation for this example type of solution #1 may be described as a mapping function using the Equation 5 below:

$$n^{(1)}_{PUCCH} = ARI_{u,n_{type}}(\text{mod}(\lfloor k/L \rfloor + Gm, N_{ARI}))$$  Equation 5

Equation 5 includes the following parameters:

$n_{PUCCH}^{(1)}$ is a vector of one or more PUCCH resources the UE may transmit on. This vector may contain more than one PUCCH resource when an LTE UE is configured to transmit PUCCH format 1b with channel selection or when it is configured to transmit PUCCH using transmit diversity;

$ARI_{u,n_{type}}$ is a table of PUCCH resources for the UE u scheduled on an ePDCCH transmission type indexed by $n_{type}$. $ARI_{u,n_{type}}$ (i) is the $i^{th}$ element of the table, and is a vector of one or more PUCCH resources. Each UE's $ARI_{u,n_{type}}$ contains $N_{ARI}$ elements. For consistency with Rel-10 ARI operation, this value can be $N_{ARI}=4$ when $N_{DMRS}=1$, where $N_{DMRS}$ is the number of DMRS configurations used for the ePDCCH or the corresponding PDSCH. Otherwise (e.g., when $N_{DMRS}\neq 1$), this value can be larger, and may be for example $N_{ARI}=4N_{DMRS}$;

u is an integer index representing a particular UE;

$n_{type}$ is an integer representing the ePDCCH transmission type. It may have different values when ePDCCH is transmitted on CSS than when it is transmitted on UESS, and/or than when ePDCCH is localized, and/or than when ePDCCH is distributed;

k is an integer that identifies a location of ePDCCH containing a downlink grant to the UE, or that identifies the location of a PDSCH transmission containing data for the UE;

L is the length of the ePDCCH in eCCEs or the PDSCH transmission in PRBs;

$\lfloor k/L \rfloor$ is a normalized resource index;

m is an integer that identifies an antenna port and/or an MU-MIMO layer of an ePDCCH containing a downlink grant to the UE. If m is not needed (such as when MU-MIMO is not used on ePDCCH), it can be omitted, or equivalently set to 0;

G is an integer used to allow ePDCCHs on different antenna ports and/or MU-MIMO layers to be mapped farther apart in PUCCH resources. It can be omitted (equivalently set G=1) if not needed;

$\lfloor x \rfloor$ is the largest integer smaller than or equal to the real number x;

mod(x, y) is the remainder when the integer x is divided by the integer y. When x and y are vectors, they are the same size, and the calculation is done element by element. That is, the remainder of x(i) divided by y(i) is calculated where $1 \leq i \leq I$ and I is the maximum index of vector x.

In a first disclosed example of hybrid implicit/explicit allocation, a PUCCH resource is determined using the resource position and the DMRS configuration of the ePDCCH transmitted to the UE. In this case, $k=n_{eCCE}$, where $n_{eCCE}$ is the location of the ePDCCH in ePDCCH resources. It may be an index of one of the eCCEs (such as the first CCE) of the ePDCCH transmitted to the UE. The value of m is set to $m=n_{DMRS}$. The variable $n_{DMRS}$ is an index of a DMRS configuration used in a successful decode of a ePDCCH located at $n_{eCCE}$. Each DMRS configuration can be a combination of scrambling index and antenna port.

It is possible that the combinations of scrambling index and/or antenna port could be fixed in one or more future LTE specifications, and/or signaled with radio resource control (RRC) signaling, and that either or both of the scrambling index or antenna port could be fixed to a single value for a UE. $N_{DMRS}$ is the number of DMRS configurations of the ePDCCH DMRS(s) that may be a phase reference for the ePDCCH. Also, $G=\lceil N_{ARI}/N_{DMRS} \rceil$, where $\lceil x \rceil$ is the smallest integer greater than or equal to the real number x.

Figure 8:
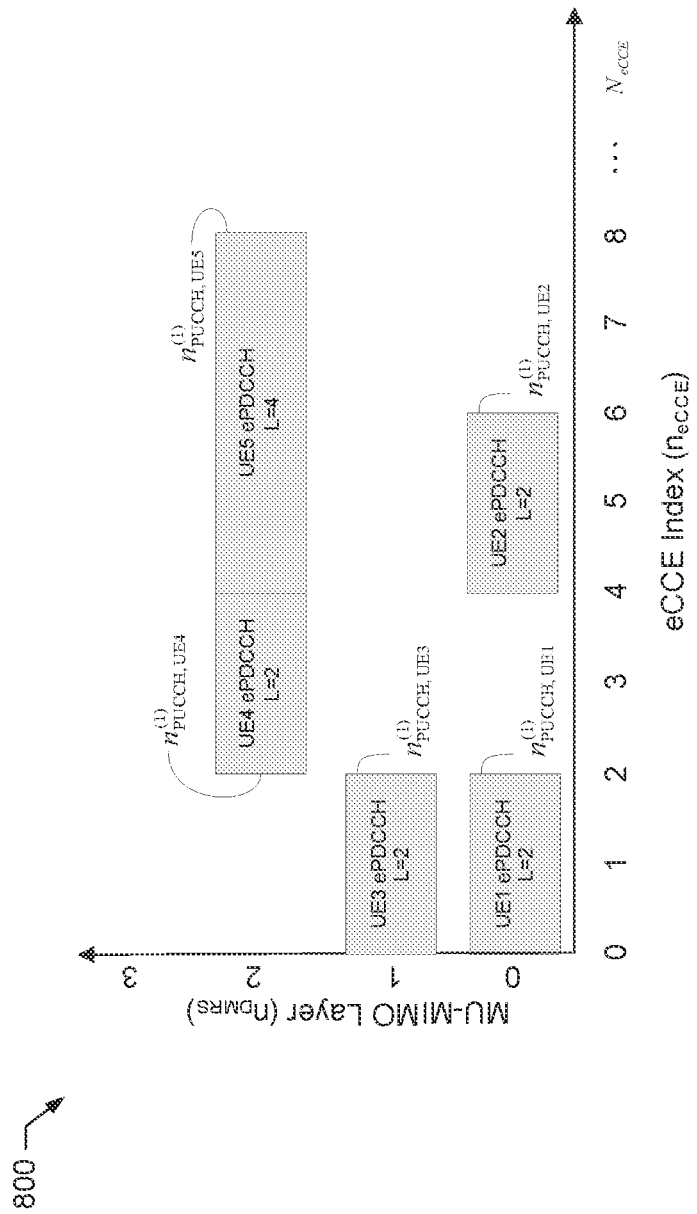

An example operation 800 of this first disclosed example of hybrid implicit/explicit PUCCH resource allocation is illustrated in FIG. 8. The X axis of FIG. 8 shows the eCCEs that are occupied by the UEs' ePDCCHs, while the Y axis of FIG. 8 shows the DMRS configuration on which they are transmitted. FIG. 8 shows the case where the DMRS configuration corresponds to an MU-MIMO layer. The eCCE locations are given as the eCCE index, $n_{eCCE}$, and the MIMO layer is indexed according to the DMRS configuration associated with that layer, $n_{DMRS}$. In the illustrated example operation 800 of FIG. 8, five UEs are scheduled on ePDCCH. Considering the first three UEs, UE1 and UE3 are both scheduled using MU-MIMO, occupying the same eCCEs but on different MU-MIMO layers (e.g., eCCEs 0 and 1 on MU-MIMO layers 0 and 1 in the example operation 800 of FIG. 8), whereas UE2 is scheduled in a different set of eCCEs (e.g., eCCEs 4 and 5 in the example operation 800 of FIG. 8). The PUCCH resource associated with the ePDCCH for UE1, 2 and 3 are labeled in FIG. 8 as $n_{PUCCH,UE1}^{(1)}$, $n_{PUCCH,UE1}^{(2)}$, and $n_{PUCCH,UE1}^{(3)}$, respectively.

In the example operation 800, the PUCCH resources for the UEs are determined by substituting the corresponding values of $n_{eCCE}$ and $n_{DMRS}$ for each UE. Considering a disclosed example where $n_{eCCE}$ is determined as the index of the first eCCE index occupied by the ePDCCH, then for UE2, $n_{eCCE}=4$ and $n_{DMRS}=0$. If $N_{DMRS}=4$, $N_{ARI}=4N_{DMRS}=16$, and $G=N_{ARI}/N_{DMRS}=4$, then since UE2's ePDCCH occupies two eCCEs, L=2, and $$n^{(1)}_{PUCCH,UE2} = ARI_{2,n_{type}}(\text{mod}(\lfloor 4/2 \rfloor + 4 \cdot 0, 16)) = ARI_{2,n_{type}}(2),$$

where x·y indicates that x and y are multiplied together. Similarly, the PUCCH resources for UEs 1 and 3 are determined as $$n^{(1)}_{PUCCH,UE1} = ARI_{1,n_{type}}(\text{mod}(\lfloor 0/2 \rfloor + 4 \cdot 0, 16)) = ARI_{1,n_{type}}(0),$$

and $$n^{(1)}_{PUCCH,UE3} = ARI_{3,n_{type}}(\text{mod}(\lfloor 0/2 \rfloor + 4 \cdot 1, 16)) = ARI_{3,n_{type}}(4),$$

respectively. Therefore it can be seen that if $ARI_{1,n_{type}}(0) \neq ARI_{2,n_{type}}(2) \neq ARI_{3,n_{type}}(4)$, then all three UEs will be assigned distinct PUCCH resources, as is needed for correct Ack/Nack operation, UEs 1 and 2 show the benefit of using the position of the ePDCCH in ePDCCH resources to determine PUCCH resource. Because UEs 1 and 2 occupy different eCCEs, and so have different values of n e cc, the first value (with index 0) of $ARI_1$ and the third value (with index 2) of $ARI_2$, respectively, are allocated to UEs 1 and 2. Therefore, moving the ePDCCHs in ePDCCH resources results in different PUCCH resource assignments. This allows the network to control PUCCH resource assignment by selecting where UEs' ePDCCHs are scheduled in ePDCCH resources.

A possible benefit of using a normalized PUCCH resource index is that more values of the ARI function can be produced when L>1. If the resource index is not normalized, then Equation 5 would instead be:

$$n^{(1)}_{PUCCH} = ARI_{u,n_{type}}(\mod(k + Gm, N_{ARI})) \quad \text{Equation 6}$$

The LTE Rel-10 PDCCH search space is constructed such that PDCCHs start on even boundaries of aggregation levels, such that $\mod(n_{CCE},L)=0$. Assuming that ePDCCH has the same behavior, then with $k=n_{eCCE}$, we have $\text{rem}(k,L)=0$. For example, if $L=N_{ARI}=4$ and $m=0$, then Equation 6 becomes $$n^{(1)}_{PUCCH} = ARI_{u,n_{type}}(\mod(k, 4)) = ARI_{u,n_{type}}(0).$$

Therefore, only one value of ARI( ) would be produced in this case. However, if Equation 5 is used instead, then four (4) distinct values of ARI( ) are possible, since if $0 \leq k < 16$, then $\mod(\lfloor k/L \rfloor, 4) \in \{0,1,2,3\}$. Therefore, it can be observed that the normalization can allow better scheduling flexibility for higher aggregation levels.

In the example operation 800 of FIG. 8, UEs 1 and 3 show the benefit of using $n_{DMRS}$ to determine PUCCH resource. If the ARI function were defined without it, the definition could be $$n^{(1)}_{PUCCH} = ARI_{u,n_{type}}(\mod(\lfloor k/L \rfloor, N_{ARI}))$$

and the assigned PUCCH resources would then be $$n_{PUCCH,UE1} = ARI_{1,n_{type}}(\mod(\lfloor 0/4 \rfloor, 16)) = ARI_{1,n_{type}}(0) \text{ and}$$

$$n_{PUCCH,UE3} = ARI_{3,n_{type}}(\mod(\lfloor 0/4 \rfloor, 16)) = ARI_{3,n_{type}}(0). \text{ IF } ARI_1(0) = ARI_3(0)$$

the same PUCCH resources would be assigned to UEs 1 and 3, resulting in incorrect Ack/Nack operation. However, when $n_{DMRS}$ is used in the ARI functions, different indices are used to look up each UE's PUCCH resource(s), and the network has better control over how PUCCH resources are allocated. Stated another way, because $n_{eCCE}$ and $n_{DMRS}$ can be independent variables that are both dynamic and under network control, the using them both to determine the PUCCH resources allows the scheduler more flexibility to optimally schedule ePDCCH while avoiding PUCCH resource conflicts.

UEs 4 and 5 in the example operation 800 of FIG. 8 have somewhat different behavior than the first 3 UEs. UEs 4 and 5 are both scheduled on MU-MIMO layer 2, and are assigned PUCCH resources $$n^{(1)}_{PUCCH,UE4} = ARI_{4,n_{type}}(\mod(\lfloor 2/2 \rfloor + 4 \cdot 2, 16)) = ARI_{4,n_{type}}(9) \text{ and}$$

$$n^{(1)}_{PUCCH,UE5} = ARI_{5,n_{type}}(\mod(\lfloor 4/4 \rfloor + 4 \cdot 2, 16)) = ARI_{5,n_{type}}(9),$$

respectively. The arguments in the ARI( ) functions for UEs 1-3 were distinct, and so in that case it would be possible to have one set of values for ARI, such that $ARI_{1,n_{type}}(i) = ARI_{2,n_{type}}(i) = ARI_{3,n_{type}}(i)$ for all values of i. However, if one set of values for ARI were used for UEs 4 and 5, then the PUCCH resources would be $$n^{(1)}_{PUCCH,UE4} = ARI_{4,n_{type}}(9) = ARI_{5,n_{type}}(9) = n^{(1)}_{PUCCH,UE5}.$$

Incorrect Ack/Nack operation would result from using the same PUCCH resources for UEs 4 and 5. Therefore, UEs 4 and 5 illustrate the benefit of using different PUCCH resources between UEs' ART( ) functions.

It may be desirable to identify ePDCCH transmissions using the DMRS port they are transmitted on instead of the more general DMRS configuration index defined in the example of Equation 5. Therefore, in another alternate disclosed example of hybrid implicit/explicit allocation, $m=p-7$, where $p \in \{7,8,9,10\}$ is a DMRS port that at least a portion of the ePDCCH is transmitted to the UE on.

Since a PUCCH ACK/NACK transmission is in response to a PDSCH transmission, some examples of hybrid implicit/explicit PUCCH resource allocation use PDSCH parameters rather than parameters of an ePDCCH scheduling the PDSCH transmission. Such example techniques may be appropriate for subframes where all PDSCHs are scheduled by ePDCCH and there is no PDCCH on a carrier. Subframes of the so called 'New Carrier Type' (NCT) discussed for LTE Rel-11 standards could have such configuration. Therefore, in another alternate disclosed example of hybrid implicit/explicit allocation, $k=n_{PDSCH}$, where $n_{PDSCH}$ is the location of the PDSCH in PDSCH resources. It may be an index of one of the PDSCH PRBs (such as the first PRB) of the PDSCH transmission. In such examples, m can be set to $m=n_{DMRS}$, but with $n_{DMRS}$ defined to be an index of a DMRS configuration used to decode a PDSCH located at $n_{PDSCH}$. Each DMRS configuration can be a combination of scrambling index and antenna port. It is possible that the combinations of scrambling index or antenna port could be fixed in specifications or signaled with RRC signaling, and that either or both of the scrambling index or antenna port would be fixed to a single value for a UE. $N_{DMRS}$ is the number of DMRS configurations of the PDSCH DMRS(s) that may be phase reference(s) for the PDSCH. Also, $G = \lceil N_{ARI}/N_{DMRS} \rceil$, where $\lceil x \rceil$ is the smallest integer greater than or equal to the real number x.

As described above, the position of an ePDCCH in ePDCCH resources may not be unique unless the search space or allocation type is taken into account. Therefore, different sets of resources for ARM may be used by the UE for localized allocations than for distributed allocations. In other words, assuming $n_{type}=1$ for localized allocation and $n_{type}=2$ for distributed allocation, then $ARI_{u,1}(i) \neq ARI_{u,2}(i)$ in some examples.

In some examples, a set of PUCCH resources for ARM may be shared by multiple UEs for ePDCCHs in a common search space. In such examples, it can be beneficial to broadcast the list to all UEs served by a cell in a message on a common control channel, such as a system information block (SIB), using an RRC message with a group based radio network temporary identifier (RNTI) on an ePDCCH transmitted to a group of UEs in a cell, or to specify predetermined values of the list such that they are known to both the network and UE (e.g. by including the values of the list in physical layer specifications). The lists of PUCCH resources corresponding to UE specific search spaces or localized ePDCCH may be different for each UE, and so may be signaled to each UE independently using dedicated messaging, e.g. via RRC signaling. The parameter G can be either broadcast in SIB or signaled to each UE individually through dedicated signaling.

The disclosed example defined by Equation 5 above maps PUCCH resource allocations to a fixed set of PUCCH resources. If the number of PUCCH resources varies with time, which can be desirable when the number of available ePDCCH resources varies subframe by subframe, such as that controlled by a new enhanced physical control channel format indicator channel (ePCFICH) control, it would be possible for the mapped PUCCH resources to exist in one subframe and not in another. Therefore, when the number of PUCCH resources may vary with time, a second disclosed example may be used that varies the mapping as a function of the ePDCCH region size to ensure that it stays within the available PUCCH resources. This second disclosed example, which may be implemented by the example processes 500 and/or 600, can be described as a mapping function using Equation 7 below.

$$n_{PUCCH}^{(1)} = \lfloor ARI_u(\mathrm{mod}\ (\lfloor k/L \rfloor + Gm, N_{ARI})) \cdot E_\Delta \rfloor + N_{ePUCCH}^{(1)}(u, n_{type}) \quad \text{Equation 7}$$

In Equation 7, the variables as defined for Equation 5 are the same, and Equation 7 also includes the following parameters:

$ARI_u(i)$ is a list of PUCCH resource vectors for the UE with index u, indexed by the integer i. $ARI_u(i)$ contains $N_{ARI}$ elements. This value can be $N_{ARI}=4$ when $N_{DMRS}=1$; otherwise this value can be larger, such as, for example, $N_{ARI}=4N_{DMRS}$;

$E_\Delta$ is a PUCCH resource scale factor determined in each subframe, where $0<E_\Delta \leq 1$. When $ARI_{u,n_{type}}(i)$ contains more than one element, each element of $ARI_{u,n_{type}}(i)$ may be multiplied by $E_\Delta$. If $E_\Delta$ is not needed, it can be omitted, or equivalently set to 1;

$n_{ePUCCH}^{(1)}(u, n_{type})$ is a integer PUCCH resource offset that defines the start of PUCCH resources for ePDCCH for a UE with index u scheduled on an ePDCCH transmission type indexed by $n_{type}$. It is similar to $N_{PUCCH}^{(1)}$ that is used for PDCCH reception in LTE Rel-8. It may be common to all UEs on the carrier containing ePDCCH, depending on the ePDCCH transmission type. In such an example, a single value of $N_{ePUCCH}^{(1)}(u, n_{type})$ be used for all UEs, that is, $$N_{ePUCCH}^{(1)}(u, n_{type}) = N_{ePUCCH}^{(1)}(0, n_{type})$$

for all UE indices u. If $N_{ePUCCH}^{(1)}(u, n_{type})$ may be different for each UE, it may be signaled to UEs with RRC signaling.

The simplifications used for the disclosed example of Equation 5 also apply to this disclosed example of Equation 7. If m is not needed (such as when MU-MIMO is not used on ePDCCH), it can be omitted, or equivalently set to m=0. Also, G can be omitted (equivalently set G=1) if not needed.

The disclosed example of Equation 7 modifies the PUCCH resources that would have been allocated by the disclosed example of Equation 5, scaling them by $E_\Delta$, which can vary with the available PUCCH resources in each subframe. A first example way to determine $E_\Delta$ is to use a formula fixed in future LTE specifications. One way to do this is to select $E_\Delta = N_{ePUCCH}'/N_{ePUCCH}^{max}$, where $N_{ePUCCH}'$ is the total number of PUCCH resources required for ePDCCH in a subframe, and $N_{ePUCCH}^{max}$ is the maximum total number of PUCCH resources available for ePDCCH in any subframe. For example, if ePCFICH is supported, $N_{ePUCCH}^{max}$ and a list of the values of $N_{ePUCCH}'$ corresponding to the size of ePDCCH are signaled to the UE (e.g., the UE 105) using higher layer signaling. In each subframe, the UE looks up the value of $N_{ePUCCH}'$ from the list of values of $N_{ePUCCH}'$ by selecting one that corresponds to the size of ePDCCH signaled on ePCFICH.

A second set of example methods to determine $E_\Delta$ is to use higher layer signaling in a more direct manner. In one such example method, $E_\Delta$ is selected from a list of C values indicated to the UE using RRC signaling or on a system information block (SIB) transmitted using a physical broadcast channel (PBCH). An element with index c is selected from the list, where c is a positive integer corresponding to the size of an ePDCCH region. The index c is indicated to the UE in each subframe.

Scaling $ARI_u(i)$ by $E_\Delta$ produces numbers closer to zero independent of the value of u, that is, for all UEs. Therefore, the offset $N_{ePUCCH}^{(1)}(u, n_{type})$ is used to allow the PUCCH resource region to be set independently on a per UE basis. Because $N_{ePUCCH}^{(1)}(u, n_{type})$ can adjust the PUCCH resource region according to the ePDCCH transmission type, it is not necessary for $ARI_u(i)$ to depend on the transmission type in this disclosed example of hybrid PUCCH allocation that is a function of the ePDCCH region size.

Figure 10:
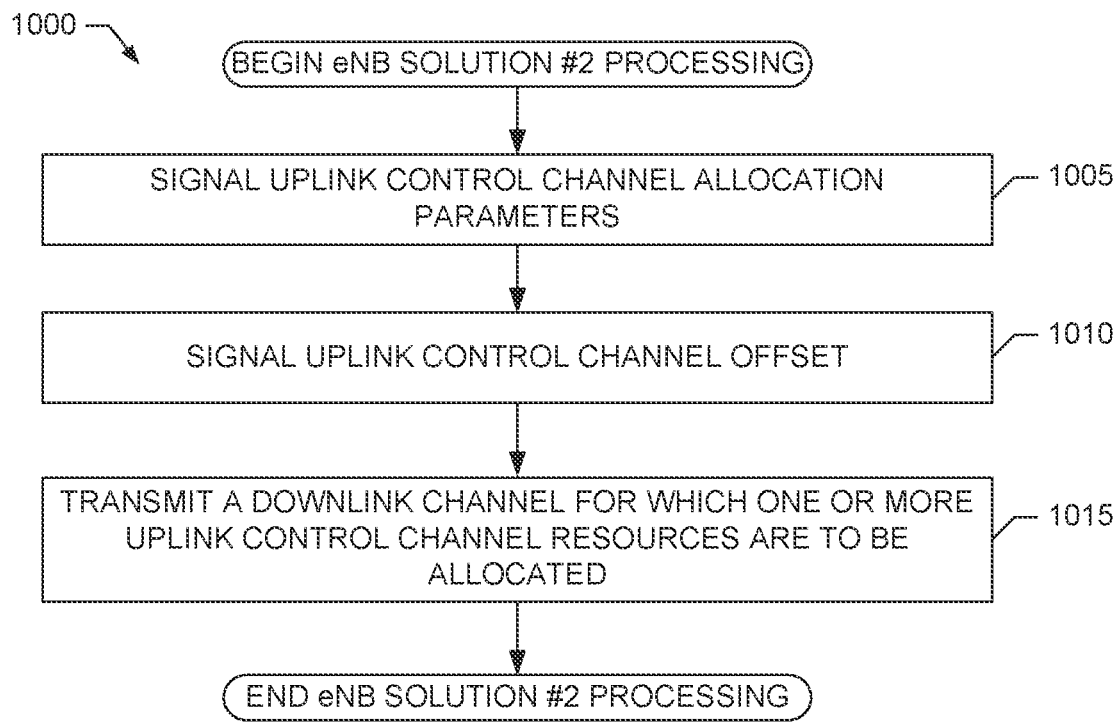
FIG. 10 is a flowchart representative of a second example eNB process for performing uplink control channel resource allocation for an enhanced downlink control channel in the example system of FIG. 1.
Figure 9:
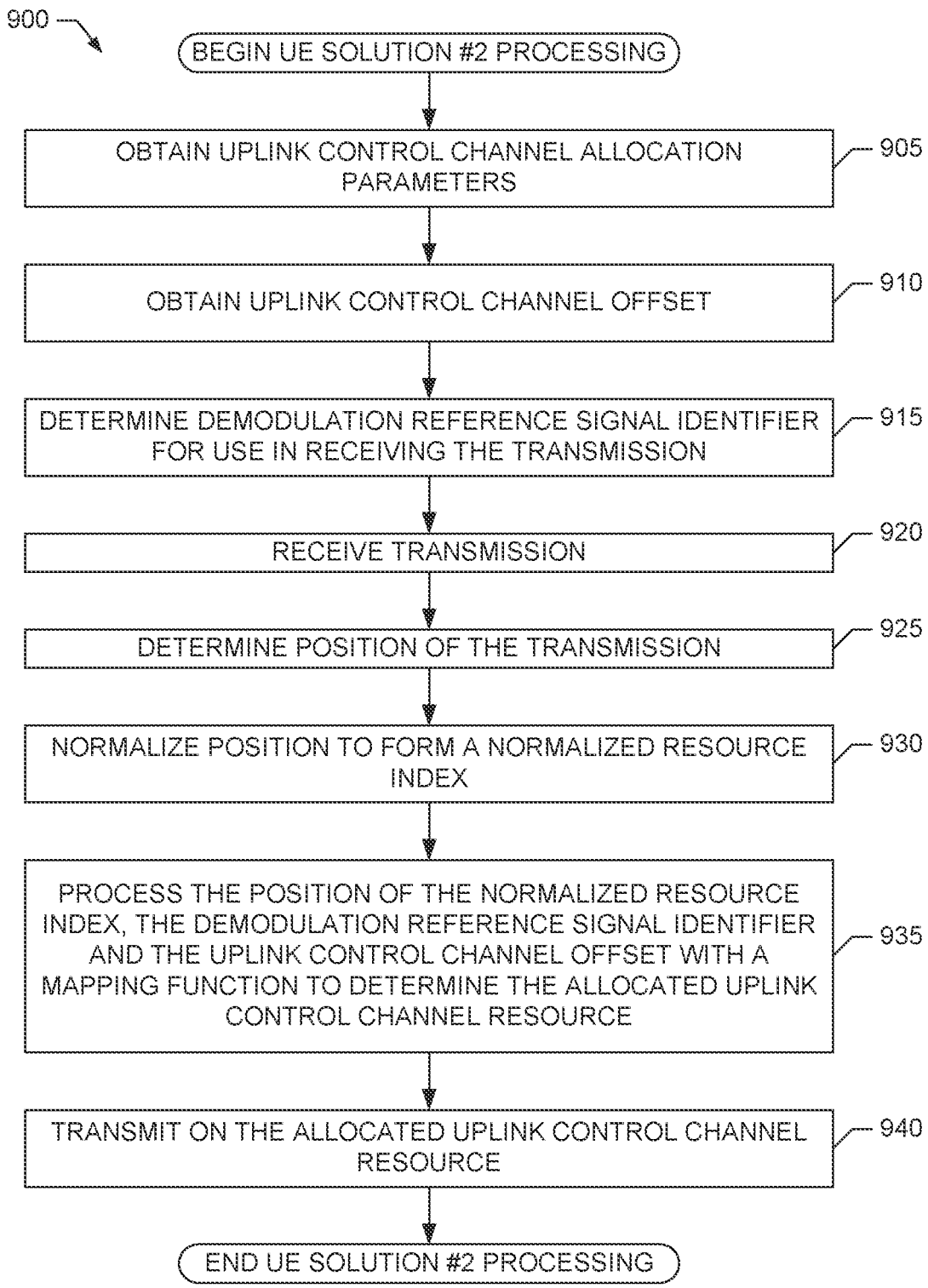
FIG. 9 is a flowchart representative of a second example UE process for performing uplink control channel resource allocation for an enhanced downlink control channel in the example system of FIG. 1.

A second example UE process 900 that may be executed to implement the example UE UCC resource allocator 125 of FIG. 1 is illustrated in FIG. 9. A corresponding second example eNB process 1000 that may be executed to implement the example eNB UCC resource allocator 130 of FIG. 1 is illustrated in FIG. 10. The second example processes 900 and 1000 implement a second example solution (also referred to herein as example solution #2) disclosed herein for performing PUCCH resource allocation for an ePDCCH. Example solution #2 corresponds to extended implicit resource allocation in which PUCCH resources are not determined (e.g., indirectly) from lists or tables, but instead are mapped from the received ePDCCH transmission location using UE specific parameters. Furthermore, the second example processes 900 and 1000 can be used to implement at two example types of extended implicit PUCCH resource allocation. In the first example type, one PUCCH resource is allocated, whereas in the second example type, more than one PUCCH resource is allocated. The latter disclosed example may be used, for example, when PUCCH format 1b channel selection or PUCCH transmit diversity is configured for a UE.

In a disclosed example of extended implicit resource allocation for one PUCCH resource (e.g., the first example type of extended implicit resource allocation), PUCCH resources are directly mapped from implicitly signaled parameters rather than being indirectly determined from lists or tables. As in hybrid implicit/explicit resource allocation (e.g., solution #1 discussed above), PUCCH resources are at least determined by a resource index, and a DMRS identifier may be further used to determine the PUCCH resources. Different sets of PUCCH resources may be allocated to each UE according to, for example, the type of the ePDCCH transmission, with the sets being selected depending on, for example, whether ePDCCH is in CSS or UESS, and/or on whether ePDCCH is distributed or localized, etc.

Like hybrid implicit/explicit resource allocation, extended implicit PUCCH resource allocation also uses a many-to-one mapping of a normalized resource index. For example, the normalized resource index can be calculated the same way as for hybrid implicit/explicit allocation. In some examples, the normalized resource index can then be mapped to a PUCCH resource by adding a PUCCH resource offset to the normalized resource index. In some examples, the PUCCH resource offset may be signaled to each UE, and different offsets may be signaled for the different ePDCCH transmission types, such as corresponding to whether ePDCCH is in CSS or UESS, and/or whether ePDCCH is distributed or localized.

If UEs have the same value of a normalized PUCCH resource, as can happen for ePDCCH MU-MIMO transmission, additional mechanisms may be used to avoid mapping the UEs to the same PUCCH resource when performing extended implicit PUCCH resource allocation. For example, the many-to-one mapping may map a sum of the normalized resource index and a scaled index of a DMRS configuration or antenna port to the PUCCH resource.

It may be desirable to ensure the allocated resources stay within certain bounds when performing extended implicit PUCCH resource allocation. For example, the many-to-one mapping may additionally comprise a modulo division of the normalized resource index or the sum of the normalized resource index with the scaled DMRS configuration index by a number of available PUCCH resources. In such examples, the PUCCH resource to be used by the UE may be determined by adding the PUCCH resource offset to the result of the modulo division.

With the foregoing in mind, and with reference to the preceding figures and associated descriptions, the example process 900 of FIG. 9 begins execution at block 905 at which the UE UCC resource allocator 125 of the UE 105 obtains (e.g., via signaling from the eNB 110 and/or any other manner) any uplink control channel allocation parameters to be used for performing PUCCH resource allocation. At block 910, the UE UCC resource allocator 125 obtains (e.g., via signaling from the eNB 110 and/or any other manner) an uplink control channel offset to be used for extended implicit PUCCH resource allocation. At block 915, the UE UCC resource allocator 125 determines a DMRS identifier based on DMRS information associated with an ePDCCH transmission to be received by the UE 105. At block 920, the UE 105 receives an ePDCCH transmission for which one or more PUCCH resources are to be allocated. At block 925, the UE UCC resource allocator 125 determines a position (e.g., an eCCE index) of the received ePDCCH transmission.

As described above and in greater detail below, at block 930, the UE UCC resource allocator 125 normalizes the determined position of the received ePDCCH transmission to determine a normalized resource index. At block 935, the UE UCC resource allocator 125 processes the normalized resource index, the DMRS identifier and the uplink control channel offset with a mapping function (e.g., which may be based on the parameters obtained at block 905), as described in greater detail below, to determine an allocated PUCCH resource. At block 940, the UE 105 transmits on the allocated PUCCH resource.

Correspondingly, the example process 1000 of FIG. 10 begins execution at block 1005 at which the eNB UCC resource allocator 130 of the eNB 110 provides (e.g., via signaling and/or any other appropriate manner) to the UE 105 any uplink control channel allocation parameters to be used for performing PUCCH resource allocation. At block 1010, the eNB UCC resource allocator 130 provides (e.g., via signaling and/or any other manner) the uplink control channel offset to the UE 105 for use by the UE 105 when performing extended implicit PUCCH resource allocation. At block 1015, the eNB 110 transmits the ePDCCH for which the one or more PUCCH resources are to be allocated. In some examples, the eNB 110 determines a DMRS port and/or a DMRS scrambling index and the associated DMRS identifier for use in transmitting the ePDCCH. The eNB 110 also determines the position (e.g. an eCCE index) at which it will transmit the ePDCCH. The eNB 110 then transmits the ePDCCH to the UE 105 at the determined position using the DMRS port and/or the DMRS scrambling index.

Figure 11:
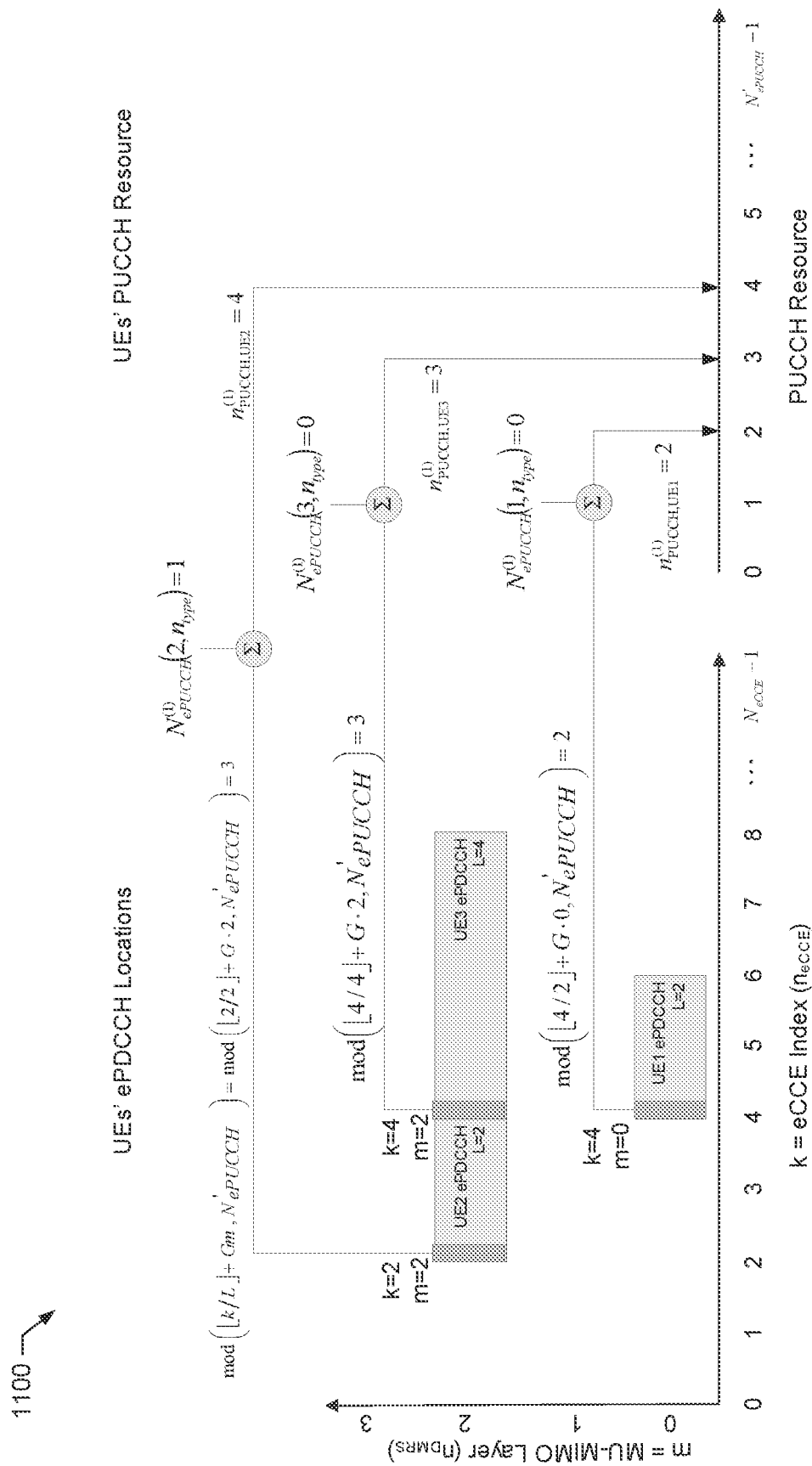
FIGS. 11-13 illustrate example operations of the example processes of FIGS. 9-10.

An example operation 1100 of the example processes 900 and 1000 implementing example solution #2 in which the position of an ePDCCH is mapped to a PUCCH resource using extended implicit resource allocation is illustrated in FIG. 11. In the illustrated example of FIG. 11, and like in hybrid implicit/explicit allocation (e.g., example solution #1), a normalized resource index is calculated as $\lfloor k/L \rfloor$, using the index of the first eCCE of a UE's ePDCCH ('k') and the length of the ePDCCH ('L') in units of eCCE. The normalized resource index $\lfloor k/L \rfloor$ and the ePDCCH's MU-MIMO layer ('m') are then combined and sent to a modulo function that limits the combined PUCCH resource to a range. This calculation of the limited combined PUCCH resource can be expressed as $\mathrm{mod}(\lfloor k/L \rfloor + Gm, N_{ePUCCH}')$. In the illustrated example operation 1100 of FIG. 11, the MU-MIMO scale factor, G, is assumed to be G=2. Furthermore, the number of PUCCH resources available, $N_{ePUCCH}'$ is assumed to be larger than the sum of the normalized resource index and scaled MU-MIMO layer index. In the illustrated example operation 1100, the limited combined PUCCH resource is then further combined with a PUCCH resource offset, $N_{ePUCCH}^{(1)}(u, n_{type})$, to produce the allocated PUCCH resource, where u is the index of the UE and $n_{type}$ is an integer representing the ePDCCH transmission type (e.g., common search space vs. UE-specific search space). The allocated PUCCH resource is for UE u is indicated as $n_{PUCCH,UEu}^{(1)}$ in the illustrated example operation 1100 of FIG. 11.

The example operation 1100 illustrated in FIG. 11, which corresponds to the first type of extended implicit PUCCH resource allocation in which one PUCCH resource is allocated, can be modified to support, for example, channel selection and/or transmit diversity. When an LTE UE is configured to transmit PUCCH format 1b with channel selection or when it is configured to transmit PUCCH using transmit diversity, the UE may be allocated multiple PUCCH resources. Accordingly, in a second example type of extended implicit resource allocation, multiple PUCCH resources are allocated to a UE.

In some such examples, additional PUCCH resources may be allocated using extended implicit resource allocation by using secondary PUCCH resource offsets. For example, a sum of the secondary PUCCH resource offsets and the normalized PUCCH resource index may replace the normalized PUCCH resource index that was used in the first type of extended implicit resource allocation calculations for determining one PUCCH resource calculation. Furthermore, in some examples, the secondary PUCCH resource offsets may be scaled to avoid resource allocation conflicts between UEs with the same normalized PUCCH resources. In other examples, the normalized PUCCH resource may be replaced by a sum of the secondary PUCCH offset and a scaled value of the normalized PUCCH resource to avoid the conflicts.

In time division duplex (TDD) operation, a UE (e.g., the UE 105) may receive an ePDCCH in each of multiple subframes. In such examples, it may be desirable for the amount of required PUCCH resources to grow with both the number of PUCCH resources allocated to a UE in a subframe, as well as the size of the ePDCCH region. In that way, the amount of PUCCH resource can be reduced when a UE is scheduled fewer PDSCHs and when fewer UEs are scheduled in a subframe. Therefore, some examples of the second type of extended implicit resource allocation allocate higher PUCCH resource indices for UEs scheduled with higher normalized PUCCH resources, and for the PDSCHs with higher time indices, using a time varying PUCCH resource offset.

Further details concerning example solution #2, which corresponds to hybrid extended implicit resource allocation and which may be implemented by the example processes 900 and/or 1000, are now provided. Per the discussion above, two disclosed examples for extended implicit resource allocation are considered. The first allocates one PUCCH resource, whereas the second allocates more than one. The latter disclosed example may be used when PUCCH format 1b with channel selection or PUCCH transmit diversity is configured for a UE (e.g., the UE 105).

In an example of extended implicit resource allocation for one PUCCH resource, PUCCH resources are directly mapped from implicitly signaled parameters rather being indirectly determined from lists or tables. As in the hybrid implicit/explicit example solution #1 described above, the PUCCH resources are at least determined by a normalized resource index, and a DMRS identifier may be used to determine PUCCH resources when a UE can receive MU-MIMO ePDCCHs. Different sets of PUCCH resources may be allocated according to the type of the ePDCCH transmission, with the sets being selected depending on, for example, whether ePDCCH is in CSS or UESS, and/or on whether ePDCCH is distributed or localized, etc. The general form of the extended implicit resource allocation mapping may be described as a mapping function using the equation below:

$$n^{(1)}_{PUCCH} = \mathrm{mod}(\lfloor k/L \rfloor + Gm, N'_{ePUCCH}) + N^{(1)}_{ePUCCH}(u, n_{type}) \quad \text{Equation 8}$$

Equation 8 includes the following parameters:
$n_{PUCCH}^{(1)}$ is a PUCCH resource the UE may transmit on;
k is an integer that identifies the location of an ePDCCH containing a downlink grant to the UE, or that identifies the location of a PDSCH transmission containing data for the UE;
L is the length of the ePDCCH in eCCEs, or the PDSCH transmission in PRBs;
$\lfloor k/L \rfloor$ is a normalized resource index;
m is an integer that identifies an antenna port and/or an MU-MIMO layer of an ePDCCH containing a downlink grant to the UE. If m is not needed (such as when MU-MIMO is not used on ePDCCH), it can be omitted, or equivalently set to 0;

G is an integer used to allow E-PDCCHs on different antenna ports and/or MU-MIMO layers to be mapped farther apart in PUCCH resources. It can be omitted (equivalently set G=1) if not needed;
$N_{ePUCCH}^{(1)}(u, n_{type})$ is integer PUCCH resource offset that defines the start of PUCCH resources for ePDCCH for a UE with index u scheduled on an ePDCCH transmission type indexed by $n_{type}$. It may be similar to $N_{PUCCH}^{(1)}$ that is used for PDCCH reception in LTE Rel-8. In some examples, the integer PUCCH resource offset may be common to all UEs on the carrier containing ePDCCH, depending on the ePDCCH transmission type. In such examples, a single value of $N_{ePUCCH}^{(1)}(u, n_{type})$ may be used for all UEs, that is, $$N^{(1)}_{ePUCCH}(u, n_{type}) = N^{(1)}_{ePUCCH}(0, n_{type})$$

for all UE indices u. If $N_{ePUCCH}^{(1)}(u, n_{type})$ may be different for each UE, it may be signaled to UEs with UE specific RRC signaling;
$N_{ePUCCH}'$ is the number of PUCCH resources available and/or or configured for ePDCCH for at least one UE in a subframe;
$n_{type}$ is an integer representing the ePDCCH transmission type. It may have different values when ePDCCH is transmitted on CSS than when it is transmitted on UESS, and/or than when ePDCCH is localized, and/or than when ePDCCH is distributed.
mod(x, y) is the remainder when the integer x is divided by the integer y.

In a first disclosed example of extended implicit resource allocation, a PUCCH resource is determined using the position and the DMRS configuration of the ePDCCH transmitted to the UE. In such an example, $k=n_{eCCE}$, where $n_{eCCE}$ is the location of the ePDCCH in ePDCCH resources. It may be an index of one of the eCCEs (such as the first CCE) of the ePDCCH transmitted to the UE. Also $m=n_{DMRS}$, where $n_{DMRS}$ is the DMRS configuration index defined in the disclosed example of Equation 5.

The operation of this first disclosed example of extended implicit PUCCH resource allocation when G=1 can be demonstrated using the illustration of FIG. 11 (which was also used for illustrating operation of hybrid implicit/explicit PUCCH resource). In this example, the PUCCH resources for the UEs are determined by substituting the corresponding values of k and m for each UE. Considering a disclosed example where $n_{eCCE}$ is determined as the index of the first eCCE index occupied by the ePDCCH, then for UE2 of FIG. 11, u=2, $n_{eCCE}=4$ and $n_{DMRS}=0$. If $N_{ePUCCH}^{(1)}(1, n_{type})=0$ and $N_{ePUCCH}'=16$, then since UE2's ePDCCH occupies two eCCEs, L=2, and $$n^{(1)}_{PUCCH,UE2} = \mathrm{mod}(\lfloor 4/2 \rfloor + 0, 16) + N^{(1)}_{ePUCCH}(2, n_{type}) = 2 + N^{(1)}_{ePUCCH}(2, n_{type}).$$

Similarly, the PUCCH resources for UEs 1 and 3 of FIG. 1 can be determined as $$n^{(1)}_{PUCCH,UE1} = \mathrm{mod}(\lfloor 0/2 \rfloor + 0, 16) + N^{(1)}_{ePUCCH}(1, n_{type}) = N^{(1)}_{ePUCCH}(1, n_{type}), \text{ and}$$

$$n^{(1)}_{PUCCH,UE3} = \mathrm{mod}(\lfloor 0/2 \rfloor + 1, 16) + N^{(1)}_{ePUCCH}(3, n_{type}) = 1 + N^{(1)}_{ePUCCH}(3, n_{type}),$$

respectively. Therefore, it can be seen that if their UE specific offsets are identical, that is, $$N^{(1)}_{ePUCCH}(1, n_{type}) = N^{(1)}_{ePUCCH}(2, n_{type}) = N^{(1)}_{ePUCCH}(3, n_{type}),$$

then all three UEs 1, 2 and 3 of FIG. 11 will be assigned distinct PUCCH resources, as is needed for correct Ack/Nack operation.

UEs 1 and 2 of FIG. 11 demonstrate the benefit of using k to determine PUCCH resources. Because UEs 1 and 2 occupy different eCCEs, and so have different values of $n_{eCCE}$, different PUCCH resources are allocated to UEs 1 and 2 even if the UEs' UE specific offsets are identical. Therefore, moving the ePDCCHs in ePDCCH resource results in different PUCCH resource assignments. This allows the network to control PUCCH resource assignment by selecting where UEs' ePDCCHs are scheduled in ePDCCH resources.

UEs 1 and 3 of FIG. 11 demonstrate the benefit of using m to determine PUCCH resource. If the function of Equation 8 was defined without it, the definition could be $$n^{(1)}_{PUCCH} = \mathrm{mod}(\lfloor k/L \rfloor, N'_{ePUCCH}) + N^{(1)}_{ePUCCH}(u, n_{type}),$$

and the assigned PUCCH resources would then be $$n^{(1)}_{PUCCH,UE1} = \mathrm{mod}(\lfloor 0/2 \rfloor, 16) + N^{(1)}_{ePUCCH}(1, n_{type}) =$$
$$N^{(1)}_{ePUCCH}(1, n_{type}) \text{ and } n^{(1)}_{PUCCH,UE3} = \mathrm{mod}(\lfloor 0/2 \rfloor, 16) + N^{(1)}_{ePUCCH}(3, n_{type}) =$$
$$N^{(1)}_{ePUCCH}(3, n_{type}). \text{ If } N^{(1)}_{ePUCCH}(1, n_{type}) = N^{(1)}_{ePUCCH}(3, n_{type})$$

the same PUCCH resources would be assigned to UEs 1 and 3, resulting in incorrect Ack/Nack operation. However, when m is used in Equation 8, different indices are used to look up each UE's PUCCH resource(s), and the network has better control over how PUCCH resources are allocated. Stated another way, because k and m can be independent variables that are both dynamic and under network control, then using them both to determine the PUCCH resources allows the scheduler more flexibility to optimally schedule ePDCCH while avoiding PUCCH resource conflicts.

UEs 4 and 5 of FIG. 11 have somewhat different behavior than the first three UEs 1, 2 and 3. For example, UEs 4 and 5 of FIG. 11 are both scheduled on MU-MIMO layer 2, and are assigned PUCCH resources $$n^{(1)}_{PUCCH,UE4} = \mathrm{mod}(\lfloor 2/2 \rfloor + 2, 16) + N^{(1)}_{ePUCCH}(4, n_{type}) = \quad (1)$$
$$3 + N^{(1)}_{ePUCCH}(4, n_{type}) \text{ and } n^{(1)}_{PUCCH,UE4} =$$
$$\mathrm{mod}(\lfloor 4/4 \rfloor + 2, 16) + N^{(1)}_{ePUCCH}(5, n_{type}) = 3 + N^{(1)}_{ePUCCH}(5, n_{type})$$

respectively. The PUCCH resources for UEs 1-3 were distinct even when their UE specific offsets were the same, that is, when $$N^{(1)}_{ePUCCH}(1, n_{type}) = N^{(1)}_{ePUCCH}(2, n_{type}) = N^{(1)}_{ePUCCH}(3, n_{type}).$$

However, if UEs 4 and 5 had the same UE specific offsets, that is, $$N^{(1)}_{ePUCCH}(4, n_{type}) = N^{(1)}_{ePUCCH}(5, n_{type}),$$

then the PUCCH resources would be $$n^{(1)}_{PUCCH,UE4} = 3 + N^{(1)}_{ePUCCH}(4, n_{type}) = 3 + N^{(1)}_{ePUCCH}(5, n_{type}) = n^{(1)}_{PUCCH,UE5}.$$

Incorrect Ack/Nack operation would result from using the same PUCCH resources for UEs 4 and 5. Therefore, UEs 4 and 5 illustrate the benefit of using different UE specific PUCCH resource offsets in Equation 8, such as when $$N^{(1)}_{ePUCCH}(4, n_{type}) \neq N^{(1)}_{ePUCCH}(5, n_{type}).$$

As described above, the position of an ePDCCH in ePDCCH resources may not be unique unless the search space or allocation type is taken into account. Therefore, the UE specific PUCCH resource offsets $N_{ePUCCH}^{(1)}(u, n_{type})$ for a given UE may be different for localized allocation and distributed allocation. In other words, assuming $n_{type}=1$ for localized allocation and $n_{type}=2$ for distributed allocation, $N_{ePUCCH}^{(1)}(u,1) \neq N_{ePUCCH}^{(1)}(u,2)$ in some examples.

In addition to UE specific PUCCH resource offsets, common PUCCH resource offsets may be used. Common PUCCH resource offsets are shared by multiple UEs for ePDCCHs in a common search space. In such examples, it can be beneficial to broadcast the common PUCCH resource offsets in a message on a common control channel, or to specify predetermined values of the common PUCCH resource offsets such that the values are known to both the network and UE (e.g. by including the values of the common PUCCH resource offset in future physical layer specifications). The PUCCH resource offsets corresponding to UE specific search spaces and/or localized ePDCCH may be specific to each UE, and so may be signaled to each UE independently using dedicated messaging, e.g. via RRC signaling.

Figure 12:
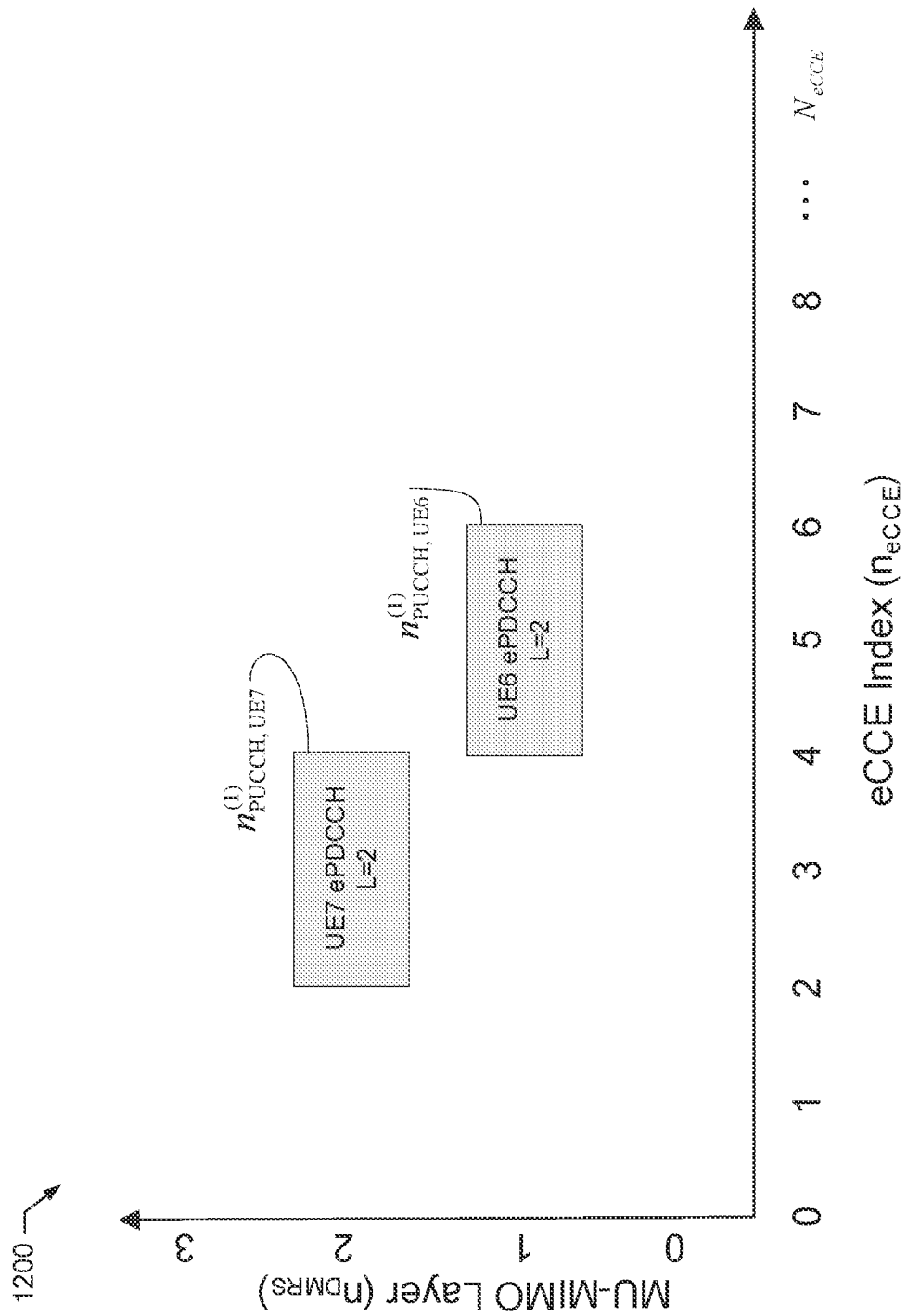

An example operation 1200 of this first disclosed example of extended implicit PUCCH resource allocation when G>1 is illustrated in FIG. 12 for two example UEs 6 and 7. When G=1, given their particular ePDCCH positions, aggregation levels, and MIMO layers, UEs 6 and 7 of FIG. 12 will map to the same PUCCH resources unless $$N^{(1)}_{ePUCCH}(6, n_{type}) \neq N^{(1)}_{ePUCCH}(7, n_{type}).$$

However, if G>1, it is possible to have $$N^{(1)}_{ePUCCH}(6, n_{type}) = N^{(1)}_{ePUCCH}(7, n_{type}).$$

In one example approach, G is selected to be a fraction of the total PUCCH resource available in a subframe. In general, $\lfloor k/L \rfloor$ tends to be less than $N_{ePUCCH}'$ because the average value of L is greater than one. Therefore large valued PUCCH resources are not as likely to be allocated when m=0 and $N_{ePUCCH}^{(1)}(u,n_{type})=0$. When the maximum value of $\lfloor k/L \rfloor$ is approximately $N_{ePUCCH}/2$, G can be chosen to be, for example, $G=N_{ePUCCH}/2$. Applying Equation 8 and taking $N_{ePUCCH}'=16$ for example, the PUCCH resources for UEs 6 and 7 of FIG. 12 are then $$n_{PUCCH,UE6}^{(1)} = \mathrm{mod}(\lfloor 4/2 \rfloor + 8 \cdot 1, 16) + N_{ePUCCH}^{(1)}(6, n_{type}) =$$

$$10 + N_{ePUCCH}^{(1)}(6, n_{type}) \text{ and } n_{PUCCH,UE7}^{(1)} =$$

$$\mathrm{mod}(\lfloor 2/2 \rfloor + 8 \cdot 2, 16) + N_{ePUCCH}^{(1)}(7, n_{type}) = 1 + N_{ePUCCH}^{(1)}(7, n_{type})$$

In such an example, even if $$N_{ePUCCH}^{(1)}(6, n_{type}) = N_{ePUCCH}^{(1)}(7, n_{type}),$$

different PUCCH resources will be allocated to UEs 6 and 7.

The benefit of using the mod( ) operator of this first disclosed example can also be seen considering UE 7 of FIG. 12 when G>1. If the mod( ) operator is omitted, Equation 8 becomes $$n_{PUCCH}^{(1)} = \lfloor k/L \rfloor + Gm + N_{ePUCCH}^{(1)}(u, n_{type}),$$

and the resource allocated to UE 7 would therefore be $$n_{PUCCH,UE7}^{(1)} = \lfloor 2/2 \rfloor + 8 \cdot 2 + N_{ePUCCH}^{(1)}(7, n_{type}) =$$

$$17 + N_{ePUCCH}^{(1)}(7, n_{type}). \text{ When } N_{ePUCCH}^{(1)}(7, n_{type}) \geq 0,$$

$$\text{then } n_{PUCCH,UE7}^{(1)} = 17 + N_{ePUCCH}^{(1)}(7, n_{type}) > N_{ePUCCH}',$$

and UE 7 could be allocated a PUCCH resource that is greater than the number available. Therefore, a benefit of the mod( ) operator is to ensure that valid PUCCH resource allocations are used even when $\lfloor k/L \rfloor + Gm$ is large, as might happen when an ePDCCH is transmitted on an antenna port or an MU-MIMO layer with a high index.

It may be possible to restrict the ePDCCH allocations such that $\lfloor k/L \rfloor + Gm$ is not large. Therefore, in an alternate disclosed example of extended implicit resource allocation, PUCCH resources are allocated using Equation 9 below.

$$n_{PUCCH}^{(1)} = \lfloor k/L \rfloor + Gm + N_{ePUCCH}^{(1)}(u, n_{type}). \quad \text{Equation 9}$$

The simplifications used for the example of Equation 8 can also apply to the disclosed example of Equation 9. For example, if m is not needed (such as when MU-MIMO is not used on ePDCCH), it can be omitted, or equivalently set to m=0. Also, G can be omitted (equivalently set G=1) if not needed.

It may be desirable to identify ePDCCH transmissions using the DMRS port they are transmitted on instead of the more general DMRS configuration index defined in the disclosed example of Equation 5. Therefore, in another alternate disclosed example of extended implicit resource allocation, m in Equation 8 and/or Equation 9 can be associated with a DMRS port instead of an antenna port. For example, m=p−7, where p ∈ {7,8,9,10} is a DMRS port that at least a portion of the ePDCCH is transmitted to the UE on.

Since a PUCCH ACK/NACK transmission can be in response to a PDSCH transmission, it may be beneficial to use PDSCH parameters rather than to use parameters of an ePDCCH scheduling the PDSCH transmission. For example, such an approach may be appropriate for subframes where all PDSCHs are scheduled by ePDCCH and there is no PDCCH on a carrier. Subframes of the so called 'New Carrier Type' (NCT) discussed for LTE Rel-11 standards could have such configuration. Therefore, in another alternate disclosed example of extended implicit resource allocation, k in Equation 8 and/or Equation 9 is associated with PDSCH resources instead of ePDCCH location. For example, $k=n_{PDSCH}$, where $n_{PDSCH}$ is the location of the PDSCH in PDSCH resources, which may be an index of one of the PDSCH PRBs (such as the first PRB) of the PDSCH transmission.

When an LTE UE is configured to transmit PUCCH format 1b with channel selection, or when it is configured to transmit PUCCH using transmit diversity, the UE may be allocated multiple PUCCH resources. In such, in a second disclosed example type of extended implicit resource allocation (e.g., targeted for channel selection or transmit diversity), at least a second PUCCH resource, in addition to a first PUCCH resource, is allocated to a UE. The mapping function for this example type of extended implicit resource allocation is given by below:

$$n_{PUCCH,i}^{(1,p=p_j)} = \quad \text{Equation 10}$$

$$\mathrm{mod}(F\lfloor k/L \rfloor + Gm + H\delta_{i,j} + N_\Delta, N_{ePUCCH}') + N_{ePUCCH}^{(1)}(u, n_{type})$$

In Equation 10, the variables as defined for Equation 8 are the same, and Equation 10 also includes the following parameters:

$n_{PUCCH,i}^{(1,p=p_j)}$ is the $i^{th}$ PUCCH resource the UE may transmit on. It may be represented by a vector of one or more PUCCH resources the UE may transmit on, $n_{PUCCH}^{(1)}$. If transmit diversity is configured, elements can include $n_{PUCCH,i}^{(1,p=p_0)}$, which is transmitted on the first antenna port $p_0$, and $n_{PUCCH,i}^{(1,p=p_1)}$, which is transmitted on the second antenna port $p_1$. If transmit diversity is not configured, then $n_{PUCCH}^{(1)}$ may contain only one element, $n_{PUCCH,i}^{(1,p=p_0)}$;

F is an integer used to allow ePDCCHs with adjacent values of $\lfloor k/L \rfloor$ to be mapped to non-adjacent PUCCH resources. It can be omitted (equivalently set F=1) if not needed;

i is a non-negative integer index of the allocated PUCCH resources on antenna port $p_0$ and on antenna port $p_1$. If two PUCCH resources are allocated to an antenna port, then i=0 or i=1;

j is a non-negative integer index of the antenna port PUCCH resource may be transmitted upon;

$\delta_{i,j}$ is a non-negative integer indicating secondary PUCCH resource offset. It may be used to allocate more PUCCH resources to a UE. For example, it may be used when PUCCH transmit diversity is configured, or for format 1b with channel selection when a UE may receive a PDSCH containing two transport blocks;

H is an integer used to allow ePDCCHs with different PUCCH resource offset $\delta_{i,j}$ to be mapped farther apart in PUCCH resources. It can be omitted (equivalently set H=1) if not needed;

$N_\Delta$ is a time varying integer PUCCH resource offset determined in each subframe that may be used when PDSCHs from more than one downlink subframe require Ack/Nack in TDD systems. If $N_\Delta$ is not needed, it can be omitted, or equivalently set to 0;

In the following descriptions of extended implicit resource allocation, $N_\Delta=0$ unless indicated otherwise, in order to simplify the discussions. It should be understood that non-zero values can be used in these disclosed examples when non-zero values of $N_\Delta$ are needed.

In a disclosed example of the second type of extended implicit resource allocation, when (1) PUCCH format 1b with channel selection is used, (2) transmit diversity is not configured for the UE and (3) the UE is configured for a downlink transmission mode that supports up to two transport blocks and is granted a PDSCH transmission indicated by a corresponding ePDCCH, then $n_{PUCCH}^{(1)}$ contains two PUCCH resources for antenna port $p_0$, namely, $n_{PUCCH,0}^{(1,p=p_0)}$ and $n_{PUCCH,1}^{(1,p=p_0)}$. The two corresponding secondary PUCCH resource offsets are $\delta_{0,0}=0$ and $\delta_{1,0}=1$. In such an example, $$n_{PUCCH,0}^{(1,p=p_0)} = \mathrm{mod}(F\lfloor k/L \rfloor + Gm, N'_{ePUCCH}) + N_{ePUCCH}^{(1)}(u, n_{type}) \text{ and } n_{PUCCH,1}^{(1,p=p_0)} =$$
$$\mathrm{mod}(F\lfloor k/L \rfloor + Gm + 1 \cdot H, N'_{ePUCCH}) + N_{ePUCCH}^{(1)}(u, n_{type}).$$

When $\lfloor k/L \rfloor + Gm + 1 < N_{ePUCCH}'$ and both F=1 and H=1 (or they are not used), then $$n_{PUCCH,1}^{(1,p=p_0)} = n_{PUCCH,0}^{(1,p=p_0)} + 1,$$

which is consistent with how resource allocation channels selection for MIMO is specified in LTE Rel-10.

Figure 13:
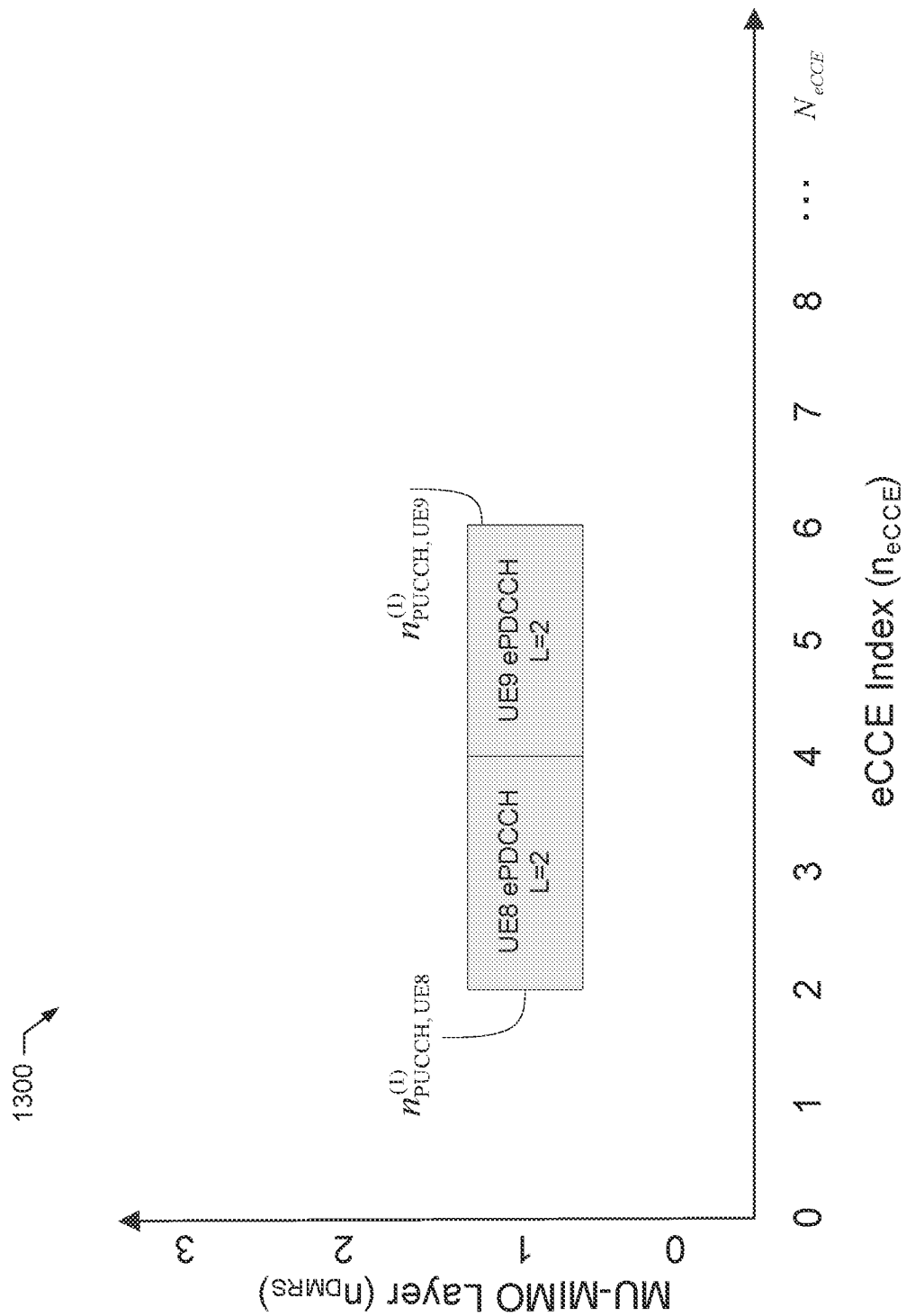

When F=1 and H=1 in this disclosed example of the second type of extended implicit resource allocation, ePDCCHs with adjacent values of $\lfloor k/L \rfloor$ can have PUCCH resource allocations that conflict when MIMO or PUCCH transmit diversity (TxD) is configured. An example operation 1300 of this second type of extended implicit resource allocation is illustrated in FIG. 13. When MIMO is configured, but PUCCH TxD is not, and taking $N_{ePUCCH}'=16$ and $G=N_{ePUCCH}'/2$, then UE8 of FIG. 13 will be allocated PUCCH resources $$n_{PUCCH,UE8,0}^{(1,p=p_0)} = \mathrm{mod}\bigl(1 \cdot \lfloor 2/2 \rfloor + 8 \cdot 1 + 1 \cdot 0, 16\bigr) + N_{ePUCCH}^{(1)}(8, n_{type}) =$$
$$9 + N_{ePUCCH}^{(1)}(8, n_{type}) \text{ and } n_{PUCCH,UE8,0}^{(1,p=p_0)} =$$
$$\mathrm{mod}\bigl(1 \cdot \lfloor 2/2 \rfloor + 8 \cdot 1 + 1 \cdot 1, 16\bigr) + N_{ePUCCH}^{(1)}(8, n_{type}) = 10 + N_{ePUCCH}^{(1)}(8, n_{type}).$$

Similarly, UE9 of FIG. 13 will be allocated PUCCH resources $$n_{PUCCH,UE9,0}^{(1,p=p_0)} = \mathrm{mod}\bigl(1 \cdot \lfloor 4/2 \rfloor + 8 \cdot 1 + 1 \cdot 0, 16\bigr) + N_{ePUCCH}^{(1)}(9, n_{type}) =$$
$$10 + N_{ePUCCH}^{(1)}(9, n_{type}) \text{ and } n_{PUCCH,UE9,0}^{(1,p=p_0)} =$$
$$\mathrm{mod}\bigl(1 \cdot \lfloor 4/2 \rfloor + 8 \cdot 1 + 1 \cdot 1, 16\bigr) + N_{ePUCCH}^{(1)}(4, n_{type}) = 11 + N_{ePUCCH}^{(1)}(9, n_{type}).$$

In the illustrated example, $$n_{PUCCH,UE8,0}^{(1,p=p_1)} = n_{PUCCH,UE9,0}^{(1,p=p_0)},$$

so the PUCCH resource allocation for UE 8 on antenna port 1 is the same as the one for UE 9 on antenna port 0 when $$N_{ePUCCH}^{(1)}(8, n_{type}) = N_{ePUCCH}^{(1)}(9, n_{type}).$$

PUCCH resource conflicts in the situation just described can be avoided by setting F>1. UEs requiring the same number of PUCCH resources can be grouped together, and the value of F can be set to the number of resources needed per UE. For example, two PUCCH resources may be needed per UE when MIMO is configured, but PUCCH TxD is not. In such example, we can set F=2. In such examples, UE8 of FIG. 13 will be allocated PUCCH resources $$n_{PUCCH,UE8,0}^{(1,p=p_0)} = \mathrm{mod}\bigl(2 \cdot \lfloor 2/2 \rfloor + 8 \cdot 1 + 1 \cdot 0, 16 \bigr) + N_{ePUCCH}^{(1)}(8, n_{type}) =$$
$$10 + N_{ePUCCH}^{(1)}(8, n_{type}) \text{ and } n_{PUCCH,UE8,0}^{(1,p=p_0)} =$$
$$\mathrm{mod}\bigl(2 \cdot \lfloor 2/2 \rfloor + 8 \cdot 1 + 1 \cdot 1, 16 \bigr) + N_{ePUCCH}^{(1)}(8, n_{type}) = 11 + N_{ePUCCH}^{(1)}(8, n_{type}).$$

Similarly, UE9 of FIG. 13 will be allocated PUCCH resources $$n_{PUCCH,UE9,0}^{(1,p=p_0)} = \mathrm{mod}\bigl(2 \cdot \lfloor 4/2 \rfloor + 8 \cdot 1 + 1 \cdot 0, 16\bigr) + N_{ePUCCH}^{(1)}(9, n_{type}) =$$
$$12 + N_{ePUCCH}^{(1)}(9, n_{type}) \text{ and } n_{PUCCH,UE9,0}^{(1,p=p_1)} =$$
$$\mathrm{mod}\bigl(2 \cdot \lfloor 4/2 \rfloor + 8 \cdot 1 + 1 \cdot 1, 16\bigr) + N_{ePUCCH}^{(1)}(9, n_{type}) = 13 + N_{ePUCCH}^{(1)}(9, n_{type})$$

Therefore even when $$N_{ePUCCH}^{(1)}(8, n_{type}) = N_{ePUCCH}^{(1)}(9, n_{type}),$$

all 4 PUCCH resources are distinct, and there is no conflict.

The PUCCH resource conflicts described above can also be avoided by setting H>1. In such examples, H can be set in a manner similar to G, where H is selected to be a significant fraction of the total PUCCH resource available in a subframe. When the maximum value of $F\lfloor k/L \rfloor$ is approximately $N_{ePUCCH}'/2$, we can choose $H=N_{ePUCCH}'/2$. For simplicity, it may be desirable in some disclosed examples to set F=1 when H>1. It may also be desirable for further simplicity to additionally set H=G.

The operation of this disclosed example when H>1 and $F=N_{ePUCCH}'/2$ may be understood considering UEs 8 and 9 of FIG. 13. For example, two PUCCH resources may be needed per UE when MIMO is configured, but PUCCH TxD is not. In such examples, we can set F=2. In such examples, UE8 of FIG. 13 will be allocated PUCCH resources $$n_{PUCCH,UE8,0}^{(1,p=p_0)} = \mathrm{mod}\bigl(1 \cdot \lfloor 2/2 \rfloor + 8 \cdot 1 + 8 \cdot 0, 16\bigr) + N_{ePUCCH}^{(1)}(8, n_{type}) =$$
$$8 + N_{ePUCCH}^{(1)}(8, n_{type}) \text{ and } n_{PUCCH,UE8,0}^{(1,p=p_1)} =$$
$$\mathrm{mod}\bigl(1 \cdot \lfloor 2/2 \rfloor + 8 \cdot 1 + 8 \cdot 1, 16\bigr) + N_{ePUCCH}^{(1)}(8, n_{type}) = 0 + N_{ePUCCH}^{(1)}(8, n_{type}).$$

Similarly, UE9 of FIG. 13 will be allocated PUCCH resources $$n_{PUCCH,UE9,0}^{(1,p=p_0)} = \mod(1 \cdot \lfloor 4/2 \rfloor + 8 \cdot 1 + 8 \cdot 0, 16) + N_{ePUCCH}^{(1)}(9, n_{type}) =$$
$$10 + N_{ePUCCH}^{(1)}(9, n_{type}) \text{ and } n_{PUCCH,UE9,0}^{(1,p=p_1)} =$$
$$\mod(1 \cdot \lfloor 4/2 \rfloor + 8 \cdot 1 + 8 \cdot 1, 16) + N_{ePUCCH}^{(1)}(9, n_{type}) = 2 + N_{ePUCCH}^{(1)}(9, n_{type}).$$

Therefore even when $$N_{ePUCCH}^{(1)}(8, n_{type}) = N_{ePUCCH}^{(1)}(9, n_{type}),$$

all 4 PUCCH resources are distinct, and there is no conflict.

When a UE (e.g., the UE 105) is configured for PUCCH transmit diversity and for a downlink transmission mode that supports up to one transport block, the same PUCCH resource allocation method can be used with different antenna ports, such that $n_{PUCCH}^{(1)}$ an contains two PUCCH resources, namely, $n_{PUCCH,0}^{(1,p=p_0)}$ and $n_{PUCCH,0}^{(1,p=p_1)}$. Here, the two corresponding PUCCH secondary resource offsets are $\delta_{0,0}=0$ and $\delta_{1,0}=1$. Therefore, $$n_{PUCCH,0}^{(1,p=p_0)} =$$
$$\mod(F\lfloor k/L \rfloor + Gm + H \cdot 0, N'_{ePUCCH}) + N_{ePUCCH}^{(1)}(u, n_{type}) \text{ and } n_{PUCCH,0}^{(1,p=p_1)} =$$
$$\mod(F\lfloor k/L \rfloor + Gm + H \cdot 1, N'_{ePUCCH}) + N_{ePUCCH}^{(1)}(u, n_{type}).$$

Note that when $\lfloor k/L \rfloor + Gm + 1 < N_{ePUCCH}'$ and both F=1 and H=1 (or they are not used), $n_{PUCCH,0}^{(1,p=p_1)} = n_{PUCCH,0}^{(1,p=p_0)} + 1$ which is consistent with how PUCCH transmit diversity is specified in LTE Rel-10.

More PUCCH resources may be needed when a UE is configured for PUCCH transmit diversity and for a downlink transmission mode that supports up to two transport blocks. In such examples, 4 PUCCH resources may be needed, with the 4 corresponding PUCCH secondary resource offsets being: $\delta_{0,0}=0$, $\delta_{0,1}=2$. $\delta 1,0=1$ and $\delta_{1,1}=3$. PUCCH resources are then allocated as:

$$n_{PUCCH,0}^{(1,p=p_0)} = \mod(F\lfloor k/L \rfloor + Gm + H \cdot 0, N'_{ePUCCH}) + N_{ePUCCH}^{(1)}(u, n_{type}),$$
$$n_{PUCCH,0}^{(1,p=p_1)} = \mod(F\lfloor k/L \rfloor + Gm + H \cdot 2, N'_{ePUCCH}) + N_{ePUCCH}^{(1)}(u, n_{type}),$$
$$n_{PUCCH,1}^{(1,p=p_0)} = \mod(F\lfloor k/L \rfloor + Gm + H \cdot 1, N'_{ePUCCH}) + N_{ePUCCH}^{(1)}(u, n_{type}), \text{ and}$$
$$n_{PUCCH,1}^{(1,p=p_1)} = \mod(F\lfloor k/L \rfloor + Gm + H \cdot 3, N'_{ePUCCH}) + N_{ePUCCH}^{(1)}(u, n_{type}).$$

Note that when $\lfloor k/L \rfloor + Gm + 3 < N_{ePUCCH}'$ and both F=1 and H=1 (or they are not used), $$n_{PUCCH,1}^{(1,p=p_0)} = n_{PUCCH,0}^{(1,p=p_0)} + 1, n_{PUCCH,0}^{(1,p=p_1)} = n_{PUCCH,0}^{(1,p=p_0)} + 2,$$
$$\text{and } n_{PUCCH,1}^{(1,p=p_1)} = n_{PUCCH,1}^{(1,p=p_0)} + 2.$$

In a TDD system, a UE may receive an ePDCCH in each of multiple DL subframes and transmit all the corresponding A/N bits in one UL subframe. In such examples, it may be allocated multiple PUCCH resources corresponding to the PDSCHs in the different subframes. In such examples, it can be desirable for the amount of required PUCCH resource to grow with both the number of PUCCH resources allocated to a UE in a subframe, as well as the size of the ePDCCH region. In that way, the amount of PUCCH resources can be reduced when a UE is scheduled fewer PDSCHs and when fewer UEs are scheduled in a subframe. One example approach to achieve this, which is compatible with LTE Rel-10 TDD PUCCH resource allocation, is to allocate higher PUCCH resource indices for UEs scheduled with higher ePDCCH indices (that is, those with higher values of $\lfloor k/L \rfloor$), and for the PDSCHs with higher time indices, as further described below. Therefore, a first example allocation techniques uses a time varying PUCCH resource offset, $N_A$, which may be calculated using the following equation:

$$N_A = (O-o-1) \cdot N_c + o \cdot N_c + 1. \quad \text{Equation 11}$$

In Equation 11 the UE first selects a c value out of $\{0, 1, 2, \ldots, C_{ePDCCH}^{max}-1\}$ which makes $N_c \leq \mod(F\lfloor k/L \rfloor + Gm + H\delta_{i,j}, N_{ePUCCH}') \leq N_{c+1}$, and the parameters of Equation 11 are:

O is a number of DL subframes with PDSCH transmissions requiring an Ack/Nack response in an uplink subframe;

o is a non-negative integer time index corresponding to one of the O DL subframes, and has a range of $0 \leq o < O$;

$$N_c = \max\{0, \lfloor [N_{RB}^{DL} \cdot (N_{sc}^{RB} \cdot c - D_0)]/D_1 \rfloor\};$$

$C_{ePDCCH}^{max}$ is the number of distinct sizes that an ePDCCH region can be set to;

$D_0$ is an integer representing the expected subcarriers averaged over all values of c that cannot be used for ePDCCH data in a PRB, such as subcarriers reserved for reference signals. An example value may be $D_0=4$;

$D_1$ is a real valued scale factor to adjust the number of allocated PUCCH resources to more closely match to the number of needed PUCCH resources. One example value may be $D_1=36 \cdot D_2$, where $D_2$ is may be set to a value greater than 1;

$N_{RB}^{DL}$ is the number of downlink resource blocks on a carrier in a subframe, as defined in, for example, 3GPP TS 36.211 V10.1.0 (Mar. 20, 2011), which is hereby incorporated by reference in its entirety; and $N_{sc}^{RB}$ is the resource block size in the frequency domain, expressed as a number of subcarriers as defined in, for example, 3GPP TS 36.211 V10.1.0.

Alternatively, $N_c$ may be calculated according to the maximum amount of PUCCH resource associated with ePDCCH and how many different sizes an ePDCCH region can have. For example, the following equation may be used:

$$N_c = \lfloor c N_{ePUCCH}^{max} / C_{ePDCCH}^{max} \rfloor \quad \text{Equation 12}$$

In Equation 12, $N_{ePDCCH}^{max}$ is the maximum total number of PUCCH resources available for ePDCCH in any subframe.

Because the formula for $N_A$ and $N_c$ may not change, they may be fixed in future physical layer specifications.

As another example, $N_A$ can be determined using higher layer signaling. For example, a list of $C_{ePDCCH}^{max}$ values for $N_c$ can be indicated to the UE using RRC e PDCCH signaling or on a system information block transmitted using PBCH. An element of the list of values for $N_c$ with index c is selected from the list, where c is determined as above. The selected value is then used to determine $N_A$ using Equation 11 above.

Figure 14:
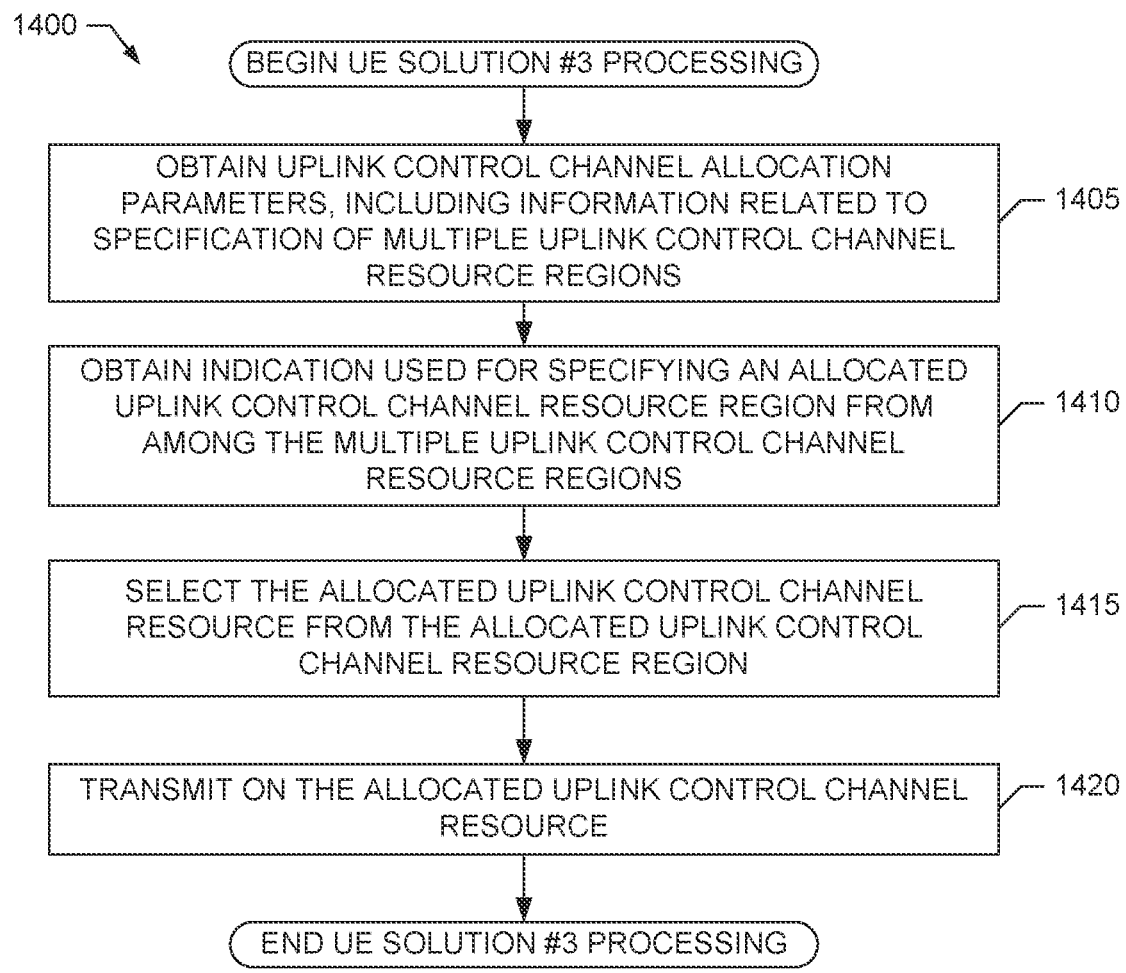
FIG. 14 is a flowchart representative of a third example UE process for performing uplink control channel resource allocation for an enhanced downlink control channel in the example system of FIG. 1.
Figure 15:
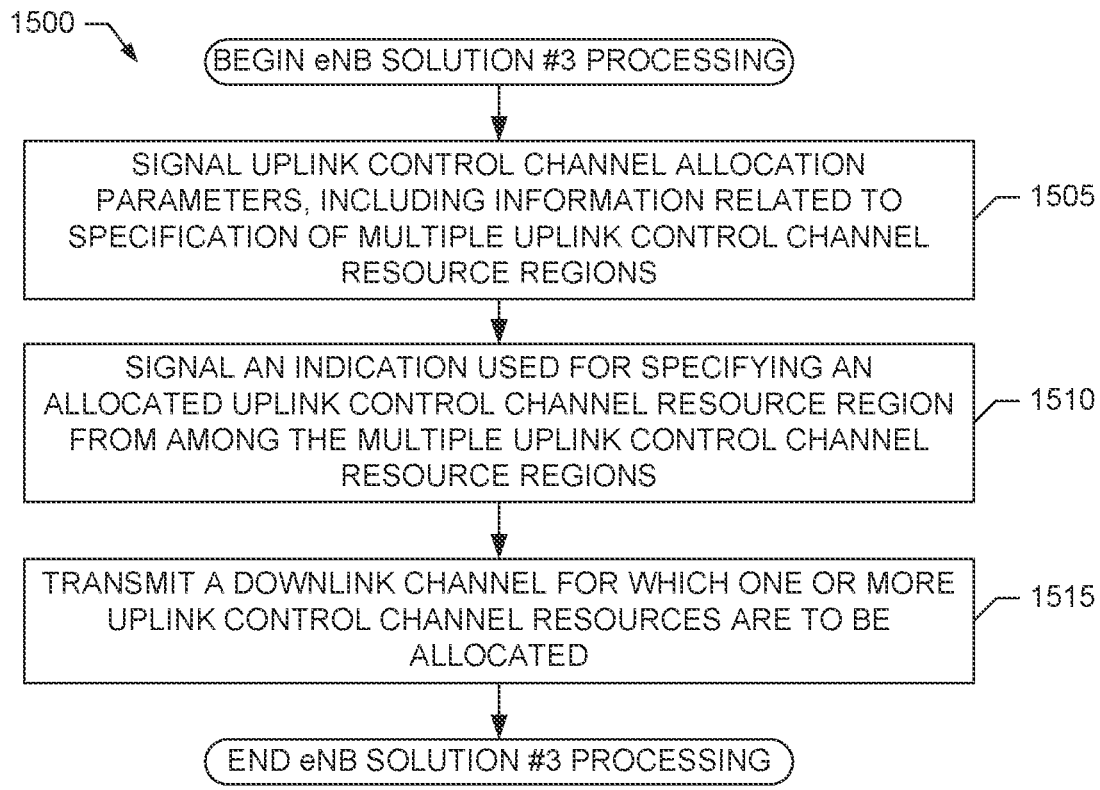
FIG. 15 is a flowchart representative of a third example eNB process for performing uplink control channel resource allocation for an enhanced downlink control channel in the example system of FIG. 1.

A third example UE process 1400 that may be executed to implement the example UE UCC resource allocator 125 of FIG. 1 is illustrated in FIG. 14. A corresponding third example eNB process 1500 that may be executed to implement the example eNB UCC resource allocator 130 of FIG. 1 is illustrated in FIG. 15. The third example processes 1400 and 1500 implement a third example solution (also referred to herein as example solution #3) disclosed herein for performing PUCCH resource allocation for an ePDCCH. Example solution #3 corresponds to resource allocation involving dynamic signaling of an ack/nack (A/N) PUCCH resource region to a UE (e.g., the UE 105). For example, multiple A/N PUCCH resource regions may be semi-statically configured for a UE. Then, a particular A/N PUCCH resource region may be selected dynamically through DCI for each PDSCH scheduled by an ePDCCH. Within the selected region, any appropriate technique, such as a mapping table, a hash function, etc., such as those defined in example solutions #1 or 2 discussed above, could be used to map between an ePDCCH scheduled PDSCH and an A/N PUCCH resource. Additionally or alternatively, a hash function based on a UE identifier could be used to determine the allocated PUCCH resource in the signaled A/N PUCCH resource region.

With the foregoing in mind, and with reference to the preceding figures and associated descriptions, the example process 1400 of FIG. 14 begins execution at block 1405 at which the UE UCC resource allocator 125 of the UE 105 obtains (e.g., via signaling from the eNB 110 and/or any other manner) any uplink control channel allocation parameters to be used for performing PUCCH resource allocation. Additionally, at block 1405, the UE UCC resource allocator 125 obtains (e.g., via signaling from the eNB 110 and/or any other manner) information related to specification of multiple A/N PUCCH resource regions. At block 1410, the UE UCC resource allocator 125 obtains (e.g., via signaling from the eNB 110 and/or any other manner) an indication specifying a particular A/N PUCCH resource region allocated to the UE 105 from among the multiple A/N PUCCH resource regions configured at block 1405. For example, the indication may be carried in a control channel transmitted from the eNB 110 to the UE 105 (e.g. such as in DCI carried in an ePDCCH).

At block 1415, the UE UCC resource allocator 125 uses any appropriate technique (such as, but not limited to, a technique based on solutions #1 and/or #2 described above) to select an allocated PUCCH resource from the particular A/N PUCCH resource region allocated to the UE 105 at block 1410. In some examples, the UE UCC resource allocator 125 may use information determined from receiving an ePDCCH carrying the indication specifying the particular A/N region to select the allocated PUCCH A/N resource. For example, the UE 105 may determine the position (e.g. an eCCE index) of the ePDCCH, and the UE UCC resource allocator 125 may map the position to a resource in the particular PUCCH A/N region (e.g., according to Equation 13 discussed in detail below). Then, at block 1420, the UE 105 transmits on the allocated PUCCH resource.

Correspondingly, the example process 1500 of FIG. 15 begins execution at block 1505 at which the eNB UCC resource allocator 130 of the eNB 110 provides (e.g., via signaling and/or any other appropriate manner) to the UE 105 any uplink control channel allocation parameters to be used for performing PUCCH resource allocation, including the information related to specification of the multiple A/N PUCCH resource regions. At block 1510, the eNB UCC resource allocator 130 provides (e.g., via signaling and/or any other manner) the indication specifying a particular A/N PUCCH resource region allocated to the UE 105 from among the multiple A/N PUCCH resource regions configured at block 1505. For example, the indication may be carried in a control channel transmitted from the eNB 110 to the UE 105 (e.g. such as in DCI carried in an ePDCCH). In some examples, the ePDCCH carrying the indication may also be used to select an allocated PUCCH A/N resource by determining the position (e.g. an eCCE index) of the ePDCCH and mapping it to a resource in the particular PUCCH A/N region (e.g., according to Equation 13 discussed in detail below). At block 1515, the eNB 110 determines the position (e.g. an eCCE index) at which it will transmit the ePDCCH. The eNB 110 then transmits the ePDCCH to the UE 105 at the determined position.

Figure 16:
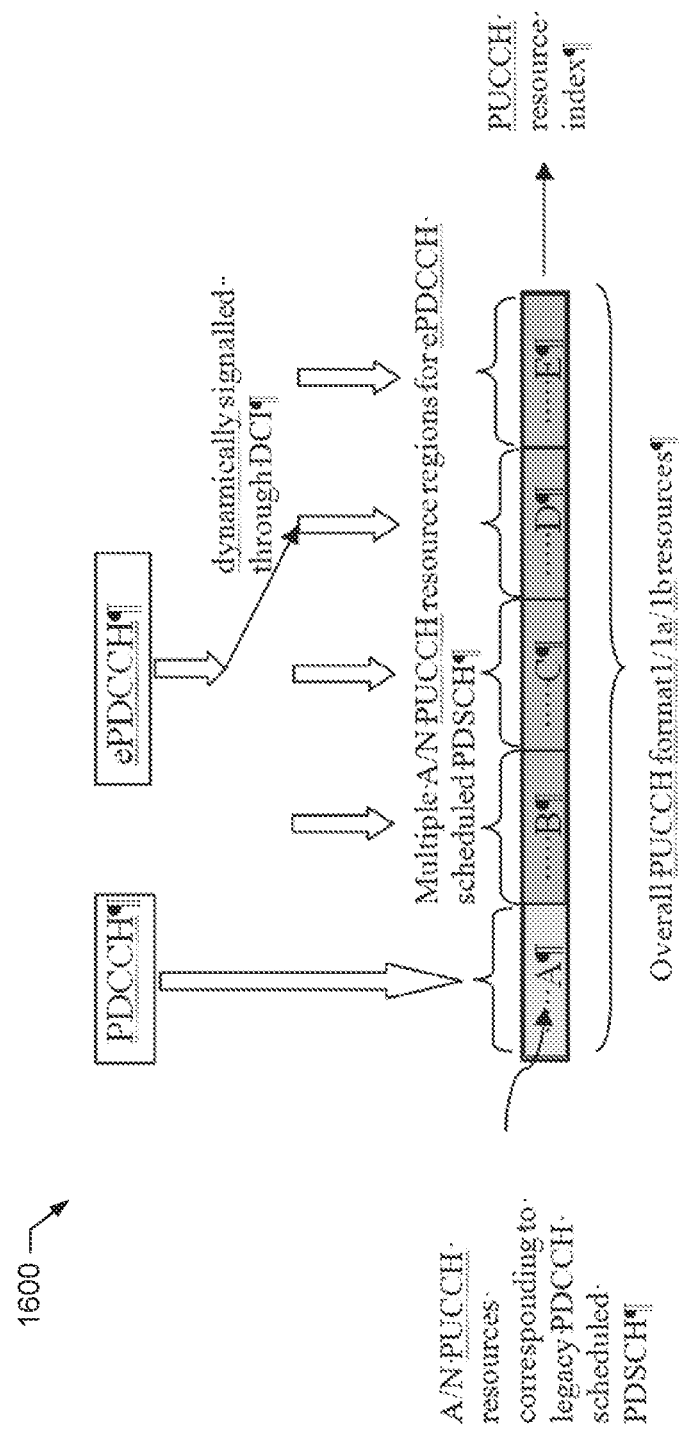
FIG. 16 illustrates an example operation of the example processes of FIGS. 14-15.

An example operation 1600 of the example processes 1400 and 1500 implementing example solution #3 is illustrated in FIG. 16. In the illustrated example operation 1600 of FIG. 16, PUCCH resources for ePDCCH are reserved separately from those of PDCCH, the latter of which is labeled as region 'A'. In some examples, region 'A' can overlap with other regions. In the illustrated example of FIG. 16, ePDCCH related PUCCH resources are broken into 4 regions (labeled 'B', 'C', 'D', and 'E in the figure), each of which may be addressed by two (2) bits in DCI messages carried on ePDCCH. In the example operation 1600, the location within a region, e.g., region 'B', for UE 105 is first determined by the eNB UCC resource allocator 130 of the eNB 110. If the determined location conflicts with an allocation for another UE, a location for the UE is calculated in another region, e.g., region 'C', by the eNB UCC resource allocator 130. If the determined location still conflicts, subsequent regions are tested by the eNB UCC resource allocator 130 until a region that does not conflict is found or until there are no more regions. The region without conflict is selected, and sent as a 2 bit address in the DCI message to the UE 105 by the eNB 110.

Further details concerning example solution #3, which corresponds to PUCCH resource allocation based on dynamic PUCCH resource region indication signaled in DCI and which may be implemented by the example processes 1400 and/or 1500, are now provided. Per the discussion above, multiple A/N PUCCH resource regions could be semi-statically configured for ePDCCH scheduled PDSCH. A UE (e.g., the UE 105) can be dynamically indicated in a DCI carried by an ePDCCH about which PUCCH resource region a corresponding A/N PUCCH resource is allocated. As mention above, an example 1600 of solution #3 is shown in FIG. 16. In the example operation 1600, four PUCCH resource regions, namely {B,C,D,E}, are defined for ePDCCH scheduled PDSCH and one of the four regions is dynamically indicated by two bits in the DCI carried by the ePDCCH.

The PUCCH resource regions may have the same or different sizes. The four regions shown in FIG. 16 may overlap, and may overlap with region A, which is where the PUCCH A/N resources corresponding to the legacy PDCCH are allocated in the illustrated example. For example, each PUCCH resource region can be defined by a starting PUCCH resource index and/or a size. In some examples, configuration information for the regions can be semi-statically signaled to a UE through higher layers (e.g., via RRC signaling). In other examples, the regions can be predefined.

Within each of the PUCCH resource regions, a mapping function or a hash function, such as that given by Equation 5 or Equation 8, can be used to determine the A/N PUCCH resource to be allocated to the UE. In such examples, each PUCCH resource region is then defined by either the ARI( ) in Equation 5, or $N_{PUCCH}'$ and $N_{ePUCCH}^{(1)}(u,n_{type})$ in Equation 8.

In some examples, the ePDCCH resources may be mapped to PUCCH resource(s) within a resource region by compressing the position indices to map to within a resource region. For example, such a compression mapping can be accomplished by setting the PUCCH resource using a sum of offsets calculated at a UE (e.g., the UE 105) and an eNB (e.g., the eNB 110), respectively, according to Equation 13:

$$n_{PUCCH,i}^{(1,p=p_j)} = \lfloor k/N_r \rfloor + Gm + H\delta_{i,j} + rN_{ePUCCH,r} + N_{ePUCCH}^{(1)}(u, n_{type}) \qquad \text{Equation 13}$$

Equation 13 includes the following parameters:
$n_{PUCCH,1}^{(1,p=p_j)}$ is the $i^{th}$ PUCCH resource the UE may transmit on antenna port $p_j$, as described in Equation 10;
k is an integer that identifies the location of an ePDCCH containing a downlink grant to the UE, or that identifies the location of a PDSCH transmission containing data for the UE;
$N^r$ is the number of PUCCH regions;
m is a non-negative time index. For TDD, it corresponds to the subframe in which the PDSCH was transmitted that $n_{PUCCH,i}^{(1,p=p_j)}$ corresponds to. For FDD, m is fixed at m=0;
$N_{ePUCCH,r}$ is the number of PUCCH resources in region r;
$r \in \{0, 1, \ldots, N_r-1\}$ is the assigned PUCCH region;
G is an integer used to allow PUCCH resources for subframes with different time indices to be mapped farther apart within a PUCCH region. One desirable value may be $G=\lfloor N_{eCCE}/N_r \rfloor$, where $N_{eCCE}$ is a number of eCCEs in a subframe. This parameter can be omitted (equivalently set G=1) if not needed;
H is an integer used to allow ePDCCHs with different PUCCH resource offset $\delta_{i,j}$ to be mapped farther apart in PUCCH resources. This parameter can be omitted (equivalently set H=1) if not needed;
$N_{ePUCCH}^{(1)}(u,n_{type})$, u, $\delta_{i,j}$, and $n_{type}$ may be defined and used as in extended implicit resource allocation, including as in Equation 8 and Equation 10.

By using Equation 13, the PUCCH region is set by $r \cdot N_{ePUCCH,r}$, and the location within the PUCCH region is set by $\lfloor k/N_r \rfloor + Gm + H\delta_{i,j}$. Based on typical parameter values expected to be used in at least some example LTE systems, a majority of the magnitudes of the offset $\lfloor k/N_r \rfloor$ is expected to be smaller than a maximum magnitude of the offset $rN_{ePUCCH,r}$ in Equation 13.

In another example, in each PUCCH resource region, a new hash function can be used, which based on a UE ID (e.g., such as the cell RNTI or C-RNTI) and the subframe index over which the ePDCCH is received. The purpose of the hash function is to generate a pseudo random output for a given UE ID and a subframe index. An example of such a hash function is given by Equation 14:

$$n_{PUCCH,i}^{(1)}(n_{RNTI}, k) = \mod(Y_k, M_{PUCCH}^i) + N_{PUCCH}^i \qquad \text{Equation 14}$$

Equation 14 includes the following parameters:
$n_{PUCCH,i}^{(1)}(n_{RNTI},k)$ is the PUCCH resource in the $i^{th}$ PUCCH region for a UE with C-RNTI, $n_{RNTI}$, and ePDCCH scheduled PDSCH in subframe k;
$N_{PUCCH}^i$ and $M_{PUCCH}^i$ are, respectively, the starting PUCCH index and the size of the $i^{th}$ PUCCH region;
$Y_k$ is a pseudo random number and an example is given by Equation 15:

$$Y_k = \mod(P \cdot Y_{k-1}, Q) \qquad \text{Equation 15}$$

For example, the parameters of Equation 15 can be set to P=39827, Q=65537, and $Y_{-1} = n_{RNTI} \neq 0$.

Example solution #3 employing the hash function of Equation 14 can be used for both FDD and TDD systems. For TDD systems, A/N information for PDSCHs scheduled in multiple DL subframes may be transmitted in one UL subframe. Because of the subframe dependent pseudo number generation described above, different PUCCH resources can be derived for PDSCHs scheduled to the same UE but in multiple DL subframes. If the eNB (e.g., the eNB 110) can perform multi-frame scheduling (e.g., in which the eNB makes scheduling decisions for both the current DL subframe as well as future DL subframes before the next UL subframe), then the PUCCH resources for the same UE can be allocated in the same PUCCH region. In such examples, only the first PUCCH resource is obtained for a UE by performing the hash function based on the UE ID and one of the DL subframe numbers, e.g. the first DL subframe. The rest of the PUCCH resources for the UE can be continuously allocated after the first PUCCH resource.

When two transport blocks (TBs) are scheduled for a PDSCH on the primary carrier and PUCCH format 1b with channel selection is configured, then the PUCCH resources are given by $\{n_{PUCCH,i}^{(1)}(n_{RNTI},k), n_{PUCCH,i}^{(1)}(n_{RNTI},k)+1\}$.

In case of cross carrier scheduling, a UE can be scheduled through a primary carrier with two PDSCHs each transmitted on a different carrier. In such examples, a UE (e.g., the UE 105) could receive two ePDCCHs on the primary carrier. A/N PUCCH resources for each of the PDSCHs are then allocated. One way to perform such PUCCH resource allocation using solution #3 is to map the PUCCH resources continuously starting from $n_{PUCCH,i}^{(1)}(n_{RNTI},k)$. For example, assuming that the PDSCH on the primary carrier has two TBs and the PDSCH on the secondary carrier has one TB, then with PUCCH format 1b with channel selection and one antenna is used for PUCCH transmission, the PUCCH resources are given by $\{n_{PUCCH,i}^{(1)}(n_{RNTI},k), n_{PUCCH,i}^{(1)}(n_{RNTI},k)+1, n_{PUCCH,i}^{(1)}(n_{RNTI},k)+2\}$.

If two antennas are used for the A/N PUCCH transmission, then the PUCCH resources on the second antenna can be given by $\{n_{PUCCH,i}^{(1)}(n_{RNTI},k)+3, n_{PUCCH,i}^{(1)}(n_{RNTI},k)+4, n_{PUCCH,i}^{(1)}(n_{RNTI},k)+5\}$.

With this dynamic PUCCH region selection, the A/N PUCCH resources can be adjusted in a subframe by subframe basis depending on the number of PDSCHs scheduled. When the number of PDSCHs scheduled by ePDCCH is small in a subframe and a subset of the A/N PUCCH resources is enough to support all the A/N feedback, all the UEs may be allocated to a single A/N PUCCH region and the rest of the regions can be used for physical uplink shared channel (PUSCH) transmission. When the number of PDSCHs scheduled in a subframe is large, different UEs may be distributed to different A/N PUCCH regions in order to accommodate the large number of A/N feedbacks. The overall size of the A/N PUCCH regions can be designed to accommodate the largest number of possible PDSCHs scheduled in a subframe by ePDCCH. The number of regions can be designed by considering both the dynamic signaling overhead and the reduction of A/N resource overhead. For example, two bits can be used to support four regions, while one bit can be used to support two regions.

In some examples, the A/N PUCCH resource regions can be semi-statically signaled. The size of the regions can be either the same or different. The regions may be contiguous or non-contiguous.

A possible benefit of example solution #3 is that the A/N resource overhead can be reduced dynamically by adjusting the number of A/N PUCCH resource regions used based on the number of PDSCHs scheduled in a subframe. The cost is the signaling overhead, as some additional bits are needed in the DCI to signal the A/N PUCCH resource region information.

Figure 18:
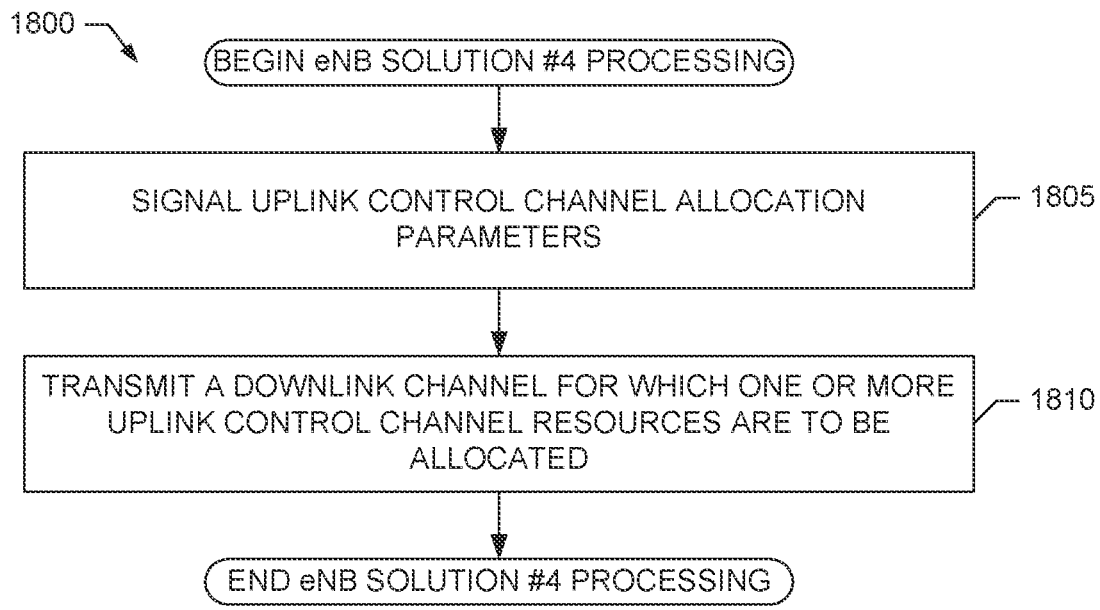
FIG. 18 is a flowchart representative of a fourth example eNB process for performing uplink control channel resource allocation for an enhanced downlink control channel in the example system of FIG. 1.
Figure 17:
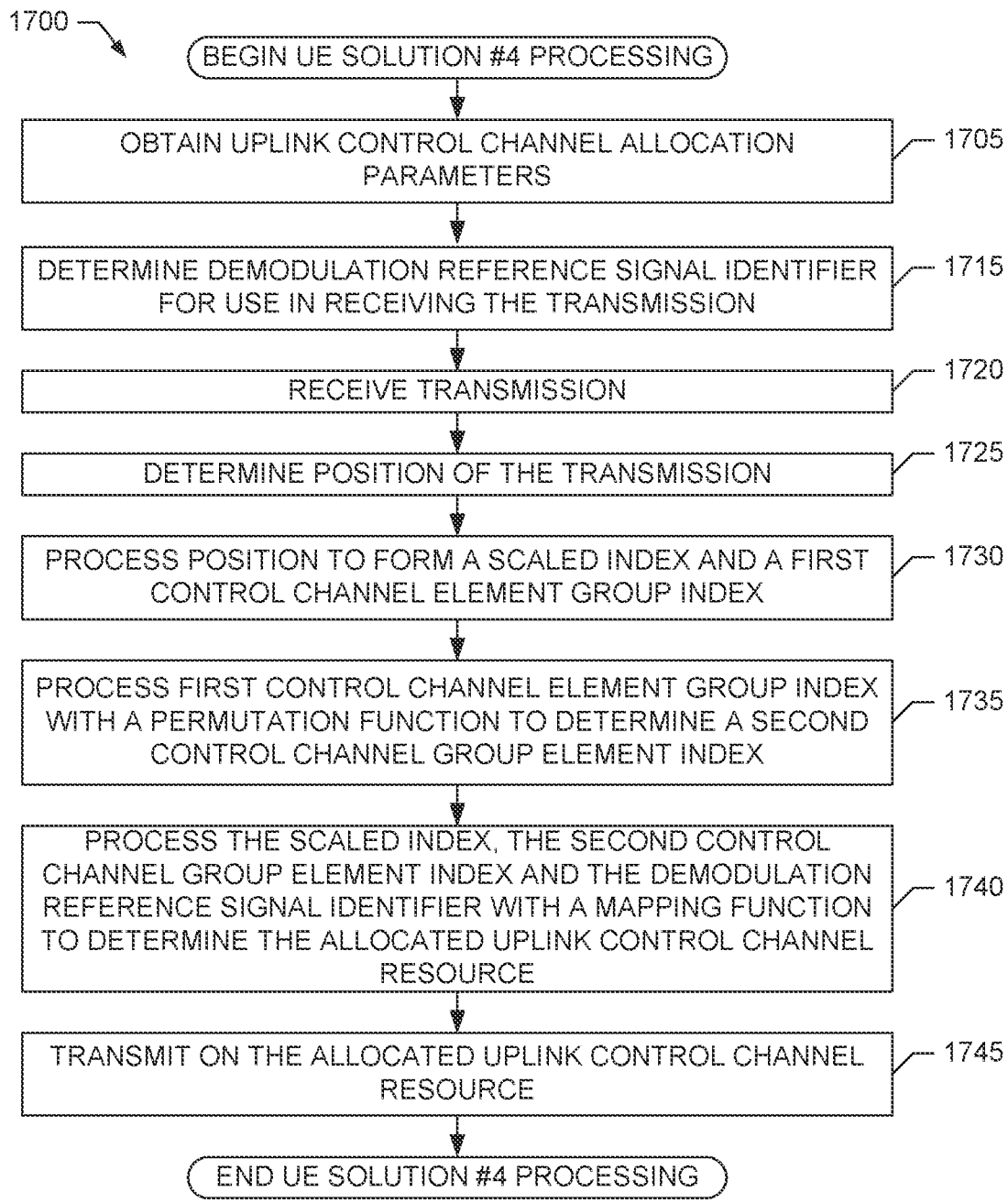
FIG. 17 is a flowchart representative of a fourth example UE process for performing uplink control channel resource allocation for an enhanced downlink control channel in the example system of FIG. 1.

A fourth example UE process 1700 that may be executed to implement the example UE UCC resource allocator 125 of FIG. 1 is illustrated in FIG. 17. A corresponding fourth example eNB process 1800 that may be executed to implement the example eNB UCC resource allocator 130 of FIG. 1 is illustrated in FIG. 18. The fourth example processes 1700 and 1800 implement a fourth example solution (also referred to herein as example solution #4) disclosed herein for performing PUCCH resource allocation for an ePDCCH. Example solution #4 corresponds to PUCCH resource allocation with PUCCH resource remapping.

In PUCCH resource remapping, CCEs are organized into groups according to $\bar{n}_{CCE}=\mathrm{mod}(n_{CCE}, L_0)$, such that a set of CCEs that have $\bar{n}_{CCE}=i$ is referred to as CCE group i, and $L_0$ as the number of CCE groups. In some examples, $L_0$ is chosen to be a multiple of, or equal to, the aggregation levels of the available ePDCCHs. In PUCCH resource remapping, CCEs within a CCE group are mapped to one or more regions of adjacent PUCCH resources, and CCE groups with the highest probability of occurrence are mapped to lower PUCCH resources.

Example solution #4 can be further customized for TDD. For example, the value of $N_c$ (which is discussed in greater detail below) can be adjusted to concentrate CCE group occupancy more than can be achieved in LTE Rel-10. In some examples, solution #4 also uses a block-based remapping to support cases where there are multiple downlink subframes requiring Ack/Nack in one uplink subframe.

With the foregoing in mind, and with reference to the preceding figures and associated descriptions, the example process 1700 of FIG. 17 begins execution at block 1705 at which the UE UCC resource allocator 125 of the UE 105 obtains (e.g., via signaling from the eNB 110 and/or any other manner) any uplink control channel allocation parameters to be used for performing PUCCH resource allocation. The uplink control channel allocation parameters may include parameters for use in evaluating a permutation function (described in greater detail below) to be used to remap CCE groups. In some examples, the permutation function may be known at the UE 105 (e.g., via specification in an appropriate communication standard), whereas in other examples, the permutation may be provided to the UE 105 (e.g., via signaling from the eNB 110). At block 1715, the UE UCC resource allocator 125 determines a DMRS identifier based on DMRS information associated with an ePDCCH transmission to be received by the UE 105. At block 1720, the UE 105 receives an ePDCCH transmission for which one or more PUCCH resources are to be allocated. At block 1725, the UE UCC resource allocator 125 determines a position (e.g., an eCCE index) of the received ePDCCH transmission.

As described in greater detail below, at block 1730, the UE UCC resource allocator 125 processes the determined position of the received ePDCCH transmission to determine a scaled index and a first CCE group index. At block 1735, the UE UCC resource allocator 125 processes the first CCE group index with the permutation function to determine a second CCE group index. At block 1740, the UE UCC resource allocator 125 processes the scaled index, the second CCE group index and the DMRS identifier with a mapping function, as described in greater detail below, to determine an allocated PUCCH resource. At block 1745, the UE 105 transmits on the allocated PUCCH resource.

Correspondingly, the example process 1800 of FIG. 18 begins execution at block 1805 at which the eNB UCC resource allocator 130 of the eNB 110 provides (e.g., via signaling and/or any other appropriate manner) to the UE 105 any uplink control channel allocation parameters to be used for performing PUCCH resource allocation. The uplink control channel allocation parameters may include parameters for use by the UE 105 when evaluating the permutation function to be used to remap CCE groups when performing PUCCH resource allocation with PUCCH resource remapping. At block 1810, the eNB 110 transmits an ePDCCH for which one or more PUCCH resources are to be allocated. In some examples, the eNB 110 determines a position (e.g. an eCCE index) at which it will transmit the ePDCCH. The eNB 110 then transmits the ePDCCH at the determined position.

Figure 19:
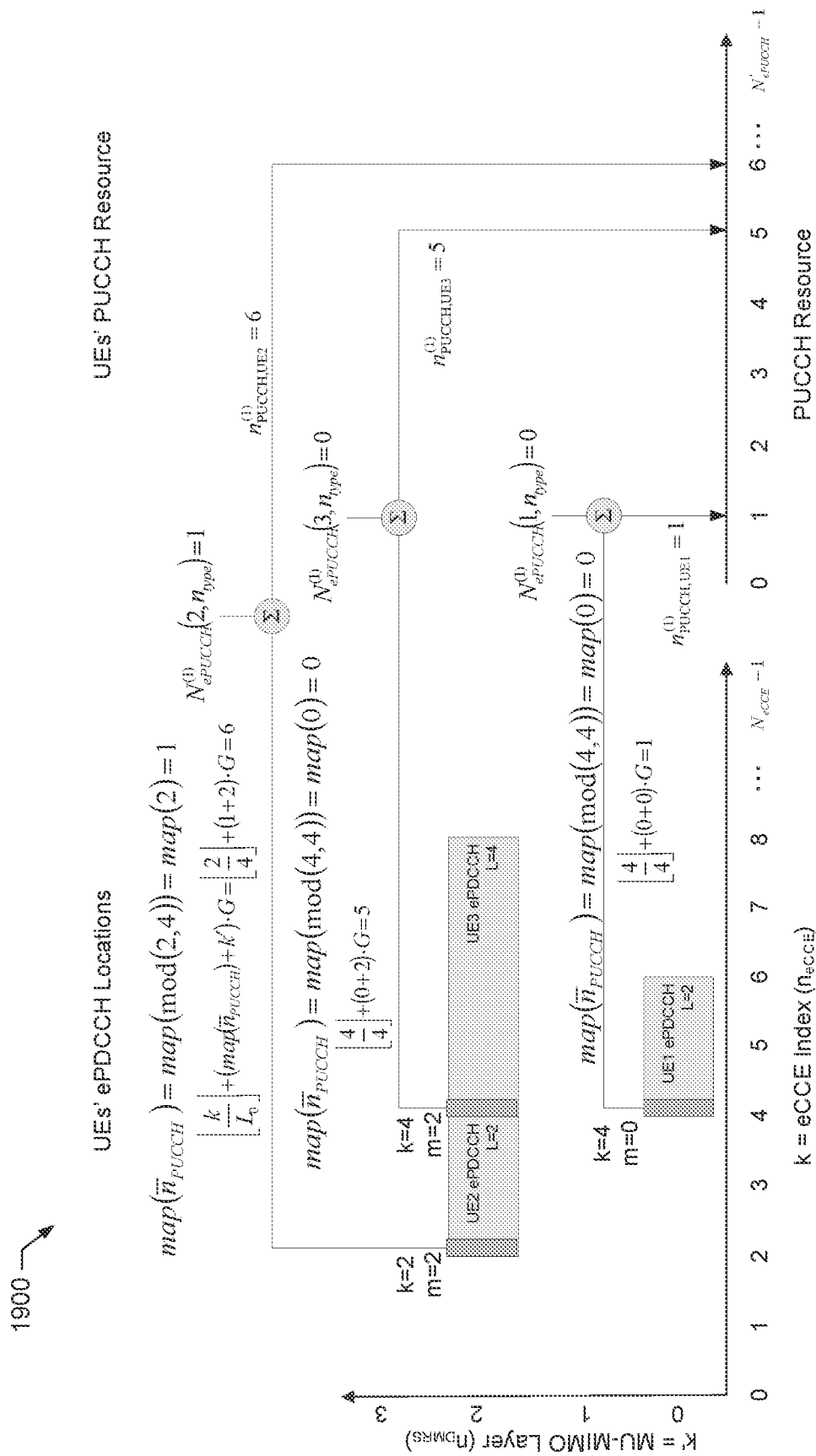
FIG. 19 illustrates an example operation of the example processes of FIGS. 17-18.

An example operation 1900 of the example processes 1700 and 1800 implementing example solution #4 in which the position of an ePDCCH is mapped to a PUCCH resource using PUCCH resource remapping is illustrated in FIG. 19. Somewhat different from hybrid implicit/explicit resource allocation (e.g., solution #1) and extended implicit resource allocation (e.g., solution #2), a scaled resource index (also referred to herein as a scaled index) is calculated instead of a normalized resource index in solution #4. In some examples, the scaled resource index is calculated as $\lfloor k/L_0 \rfloor$, using the index of the first eCCE of a UE's ePDCCH ('k') and the number of CCE groups ('$L_0$'). In some examples, the CCE group number is equivalent to a PUCCH resource allocation group described in greater detail below, and is indicated in FIG. 19 as $\bar{n}_{PUCCH}=\mathrm{mod}(k, L_0)$. In solution #4, the CCE group number (or PUCCH resource allocation group) is computed from the resource index, and then remapped to a different index according to the CCE groups' probability of occurrence. The remapped PUCCH resource group may be expressed as $\mathrm{map}(\bar{n}_{PUCCH})$. In the illustrated example operation 1900 of FIG. 19, an example remapping function is expressed as $\mathrm{map}(i)=\{0,2,1,3\}$, where map(i) indicates element i in the list, starting with element 0. In the illustrated example, the scaled resource index is then combined with the remapped group index and the ePDCCH's MU-MIMO layer ("k'") using a group scale factor, which can be expressed as $$\left\lfloor \frac{k}{L_0} \right\rfloor + (\mathrm{map}(\bar{n}_{PUCCH}) + k')G.$$

The group scale factor, G, is assumed to be G=2 in the example of FIG. 19. The combined result is then further combined with a PUCCH resource offset, $N_{ePUCCH}^{(1)}(u, n_{type})$, to produce the allocated PUCCH resource, where u is the index of the UE. The allocated PUCCH resource for UE u is indicated as $N_{ePUCCH,UEu}^{(1)}$ in the example of FIG. 19.

Further details concerning example solution #4, which corresponds to PUCCH resource allocation utilizing PUCCH resource remapping are now provided. As described above, some PUCCH resources are more frequently occupied than others when the position of an ePDCCH (e.g., the lowest eCCE index used to construct the ePDCCH) is used to determine the PUCCH resource. This behavior can be used to reduce the amount of PUCCH resources required in an LTE system, such as the system 100. For example, if the PUCCH mapping is changed such that the most frequently occupied eCCE groups map to small PUCCH resource indices, PUCCH PRBs corresponding to high PUCCH resource indices will be infrequently occupied. Therefore, a smaller amount of total PUCCH resource can be used. For example, using the occupation probabilities associated with the example operation 1900 of FIG. 19, eCCE groups can be ordered in decreasing order of probability as $\bar{n}_{eCCE}=0$, $\bar{n}_{eCCE}=2$, $\bar{n}_{eCCE}=1$, and $\bar{n}_{eCCE}=3$. In some example, mapping function and the permuting used in the PUCCH remapping procedure can be more generally described using Equation 16:

$$n_{PUCCH,i}^{(p=p_j)} = \left\lfloor \frac{k}{L_0} \right\rfloor + (\text{map}(\bar{n}_{PUCCH}) + \delta_{i,j} + k') \cdot G + N_{ePUCCH}^{(1)}(u, n_{type}) \quad \text{Equation 16}$$

Equation 16 includes the following parameters:

$n_{PUCCH,i}^{(1,p=p_j)}$ is the $i^{th}$ PUCCH resource the UE may transmit on antenna port $p_j$, as described in Equation 10;

k is an integer that identifies the location of an ePDCCH containing a downlink grant to the UE, or that identifies the location of a PDSCH transmission containing data for the UE;

k' is an integer that identifies an antenna port and/or an MU-MIMO layer of an ePDCCH containing a downlink grant to the UE. If k' is not needed (such as when MU-MIMO is not used on ePDCCH), it can be omitted, or equivalently set to 0. (Note that the variable k' is used in the example solution #4 to replace the variable m used in example solutions #1 and #2 in order to be consistent with LTE usage for TDD that is referenced in this solution);

$L_0$ is a number of PUCCH resource groups. An example value may be $L_0=4$. In some examples, $L_0$ can be chosen to be a multiple of, or equal to, the aggregation levels of the ePDCCHs. For example, if $L_0=4$, it is a multiple of aggregation levels 1, 2, and equal to aggregation level 4. Another suitable value may be $L_0=8$, as then all LTE Rel-10 aggregation levels are submultiples or equal to $L_0$;

$\bar{n}^{PUCCH}=\text{mod}(k, L_0)$ is an index of a PUCCH resource allocation group. In some examples, the PUCCH resource allocation groups can be eCCE groups, in which case $\bar{n}_{PUCCH}=\bar{n}_{eCCE}=\text{mod}(n_{eCCE},L_0)$;

map( ) is a remapping function that permutes group indices according to occupation probability. For example, the elements of map( ) can be ordered such that higher indexed elements have lower occupation probability. The function map(i) indicates element i in the list, starting with element 0. Furthermore, map( ) is a one to one mapping wherein each i corresponds to a single, unique, map(i). For example, if $L_0=4$, an example choice for the mapping function may be map(i)={0,2,1,3}. In this example, map(1)=2. The values shown are exemplary, and others may be used;

G is an integer used to allow PUCCH resource groups to be mapped farther apart in PUCCH resources. One example value may be $$G = \left\lfloor \frac{N_{eCCE}}{L_0} \right\rfloor,$$

where $N_{eCCE}$ is a number of eCCEs in a subframe;

$N_{ePUCCH}^{(1)}(u,n_{type})$, u, $\delta_{i,j}$, and $n_{type}$ may be defined and used as in extended implicit resource allocation, including as in Equation 8 and Equation 10.

In some examples, the location identifier, k, may be globally defined, wherein when a value of k is used by any UE, it refers to the same physical resource on ePDCCH or PDSCH. One approach for globally defining k is to have k=0 correspond to the beginning of resources in which any ePDCCH or PDSCH can be scheduled, and increasing values of k continue until the end of the ePDCCH or PDSCH resources. Equation 16 above is suitable for use with such a globally defined k.

If an index of an ePDCCH or PDSCH is UE specifically defined such that a value of k used by any UE may not refer to the same ePDCCH or PDSCH physical resource, an alternative disclosed example can be used wherein k is shifted to align the resource groups such that good resource group concentration is maintained. For example, this can be achieved using Equation 17 below:

$$n_{PUCCH,i}^{(p=p_j)} = \left\lfloor \frac{k + N_k(u, n_{type})}{L_0} \right\rfloor + \quad \text{Equation 17}$$
$$(\text{map}(\bar{n}'_{PUCCH}) + \delta_{i,j} + k') \cdot G + N_{ePUCCH}^{(1)}(u, n_{type})$$

In Equation 17, the variables as defined for Equation 16 are the same, and Equation 17 also includes the following parameters:

$\bar{n}'_{PUCCH} \equiv \text{mod}(k+N_k(u,n_{type}),L_0)$ is an index of a shifted PUCCH resource allocation group. It is an extension of $\bar{n}_{PUCCH}$ that aligns a UE specifically defined k with ePDCCH or PDSCH physical resources;

$N_k(u,n_{type})$ is an integer resource offset that shifts between resource allocation groups, and may be in the range $0 \leq N_k(u,n_{type}) < L_0$. Note that because $N_{ePUCCH}^{(1)}(u,n_{type})$ may be UE specific, it can be adjusted to align a UE specifically defined k with ePDCCH or PDSCH physical resources by more than $L_0$. Consequently, larger values of $N_k(u,n_{type})$ may not be needed. One way to determine $N_k(u,n_{type})$ is to set $\bar{n}_{PUCCH}$ to correspond to the most probable ePDCCH or PDSCH resource group. $N_k(u,n_{type})$ is used for a UE with index u scheduled on an ePDCCH transmission type indexed by $n_{type}$. In some examples, $N_k(u,n_{type})$ may be common to all UEs on a cell. In such examples, a single value of $N_k(u,n_{type})$ is used for all UEs, that is, $N_k(u,n_{type})=N_k(u, n_{type})$ for all UE indices u. If $N_k(u,n_{type})$ may be different for each UE, it can signaled to UEs with, for example, UE specific RRC signaling. Also, in some example, $N_k(u,n_{type})$ may not be a function of $n_{type}$, which is equivalent to $N_k(u,n_{type})=N_k(u,0)$.

In some examples of PUCCH resource remapping, a PUCCH resource is determined using the resource position and the DMRS configuration of the ePDCCH transmitted to the UE. In such examples, $k=n_{eCCE}$, where $n_{eCCE}$ is the location of the ePDCCH in ePDCCH resources. For example, $n_{eCCE}$ may be an index of one of the eCCEs (such as the first or last eCCE) of the ePDCCH transmitted to the UE.

Some examples of solution #4 may support enhanced resource allocation for LTE Rel-10 PDCCH, in which case $k=n_{eCCE}$, where $n_{eCCE}$ is the location of the PDCCH in PDCCH resources, and may be the first CCE of the PDCCH. Because MU-MIMO or DM-RS are not used for PDCCH reception, in this case, k' is not used, and is equivalently set to k'=0 in Equation 16.

In some examples, $k'=n_{DMRS}$. The variable $n_{DMRS}$ may be an index of a DMRS configuration used in a successful decode of a ePDCCH located at $n_{eCCE}$. For example, the DMRS configuration can be a combination of scrambling index and antenna port. It is possible that the combinations of scrambling index or antenna port could be fixed in future specifications or signaled with RRC signaling, and that either or both of the scrambling index or antenna port would be fixed to a single value for a UE.

In some examples, it may be desirable to index the values of k' in order of increasing likelihood of use. If the most frequent values of k' are small, then low PUCCH resources are used, thereby allowing less PUCCH resources to be allocated. This indexing may require extra care when an antenna port may be associated with an eCCE. Because eCCE groups can have different occupancy probabilities, then the corresponding antenna ports may have different occupancy probabilities. If an ePDCCH is frequently received with an antenna port tied to a lightly occupied ePDCCH group, it may be frequently mapped to high PUCCH resources. It may therefore be desirable to allow each UE to use a different mapping of k' to antenna port and/or ePDCCH MIMO layer, such that each UE's values of k' can be indexed in order of increasing likelihood of use for that UE.

Figure 20:
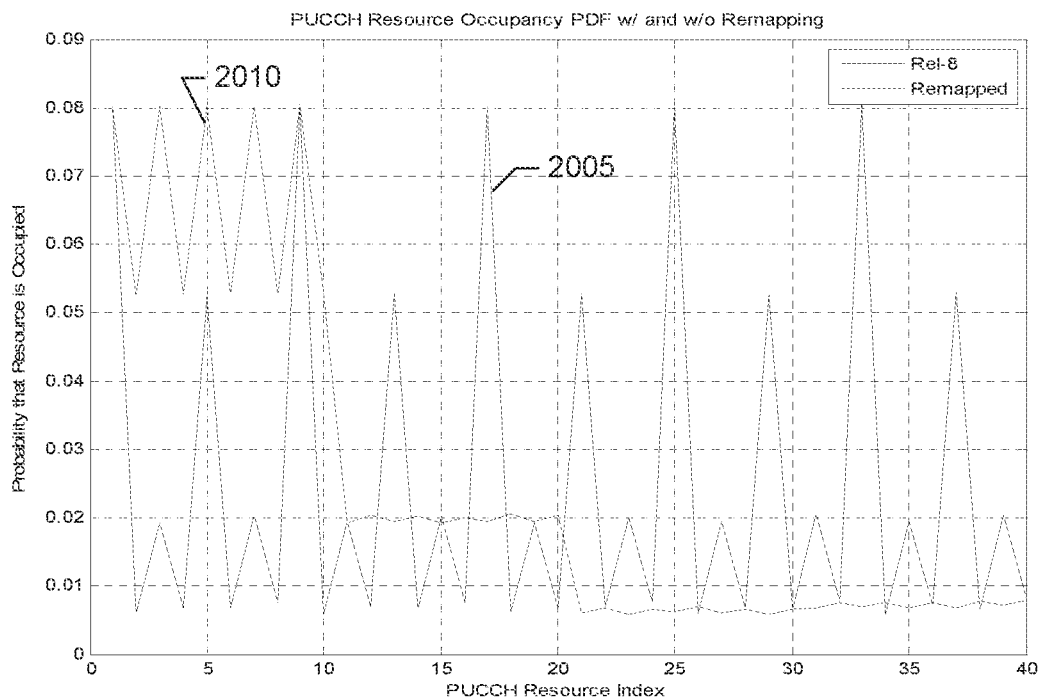
FIGS. 20-22 illustrate example performance results for the example processes of FIGS. 17-18.

FIG. 20 illustrates how remapping can concentrate the used PUCCH resources. In FIG. 20, the 'Re1-8' curve 2005 depicts the probability that a PUCCH resource is occupied using LTE Rel-8 PUCCH mechanisms, while the 'Remapped' curve 2010 depicts the results when the PUCCH resources are reordered according to solution #4 disclosed herein. In the illustrated example of FIG. 20, the heavily occupied Rel-8 PUCCH resources are distributed evenly across the available PUCCH resource. After remapping (e.g., corresponding to curve 2010), it can be seen that the heavily occupied PUCCH resources are concentrated in the first 10 resources, the next 10 resources are significantly occupied, and the last 20 are infrequently used.

In some examples, PUCCH resource allocation according to solution #4 can further modified for TDD operation to concentrate eCCEs in a smaller number of eCCE groups. Implicit PUCCH resource mapping is determined in LTE Rel-10 using Equation 18 and Equation 19 below, where the equations and their variables are defined in 3GPP TS 36.213, V10.1.0.

$$n_{PUCCH}^{(1,\tilde{p}_1)} = (M-m-1)\cdot N_c + m\cdot N_{c+1} + n_{CCE} + N_{PUCCH}^{(1)} \quad \text{Equation 18}$$

$$N_c = \max\{0, \lfloor [N_{RB}^{DL}\cdot(N_{sc}^{RB}\cdot c - 4)]/36 \rfloor\} \quad \text{Equation 19}$$

When multiple TDD DL subframes must be Ack/Nack'd, the values of $N_c$ tend not to be multiples of an aggregation level, and so are spread among eCCE groups more than for FDD. Note that Equation 18 uses the variable m as defined in 3GPP TS 36.213, V10.1.0, rather than as in the other example solutions disclosed herein.

An example approach for improving eCCE group concentration over the CCE group concentration in LTE Rel-8 is to force $N_c$ to be a multiple of $L_0$. This can be accomplished by modifying the definition of $N_c$ from Equation 19 to be:

$$N_c = \max\{0, L_0\cdot \lceil (\lfloor[N_{RB}^{DL}\cdot(N_{sc}^{RB}\cdot c - 4)]/36\rfloor/L_0)\rceil\} \quad \text{Equation 20}$$

In Equation 20, $\lceil x \rceil$ is the smallest integer larger than or equal to the real number x.

Figure 21:
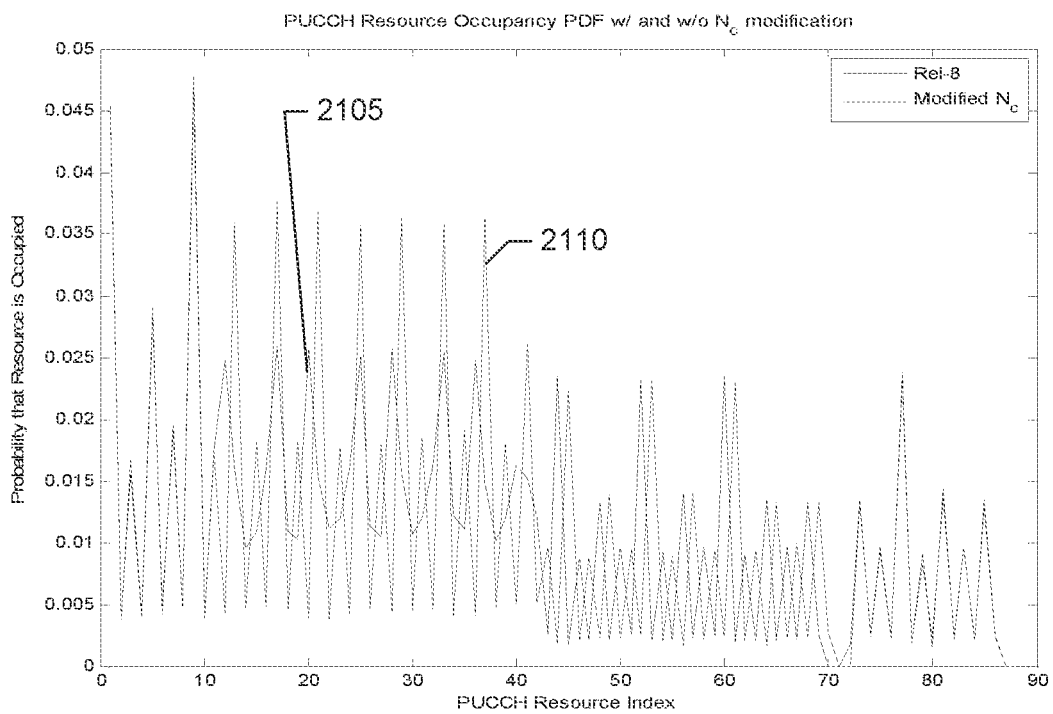

An example PUCCH resource occupancy for LTE TDD configuration 1 is shown in the FIG. 21 with and without the modified $N_c$. As can be seen from the figure, the modified version (e.g., corresponding to example curve 2110) produces a 'spikier' PDF, and has better CCE group concentration, than LTE Rel-8 (e.g., corresponding to example curve 2105).

The amount of required PUCCH resources for TDD can vary with the number of downlink subframes being Ack/Nack'd in an uplink subframe. Consequently, it may not be desirable to reorder PUCCH resources according to the maximum number of PUCCH resources that could be required in a subframe. Instead, in some examples, a block-based reordering approach may be used. Such a PUCCH remapping procedure customized for TDD can be described using the following equation:

$$n_{PUCCH,i}^{(1,p=p_j)} = \left\lfloor \frac{\tilde{n}_{PUCCH}}{L_0} \right\rfloor + (\text{map}(\tilde{n}_{PUCCH}) + \delta_{i,j} + k')\cdot G + N_{eCCE}^{max}\cdot \left\lfloor \frac{\tilde{n}_{PUCCH}}{N_{eCCE}^{max}} \right\rfloor + N_{ePUCCH}^{(1)}(u, n_{type}) \quad \text{Equation 21}$$

In Equation 21, the variables as defined for Equation 16 are the same, and Equation 21:

$\bar{n}_{PUCCH} = \text{mod}(\tilde{n}_{PUCCH}, L_0)$ is an index of a PUCCH resource allocation group implicitly derived from a resource index, such as an eCCE index;

$\tilde{n}_{PUCCH}$ is an intermediate PUCCH resource allocation value. It can represent the PUCCH resource that is allocated by Rel-10 LTE, but without PUCCH resource shifts such as $N_{PUCCH}^{(1)}$. In some examples, $\tilde{n}_{PUCCH} = (M-m-1)\cdot N_c + m\cdot N_{c+1} + n_{CCE}$;

$N_{eCCE}^{max}$ is a maximum number of eCCEs in any subframe.

In some examples, a desirable value for G may be $$G = \left\lfloor \frac{N_{eCCE}^{max}}{L_0} \right\rfloor.$$

Figure 22:
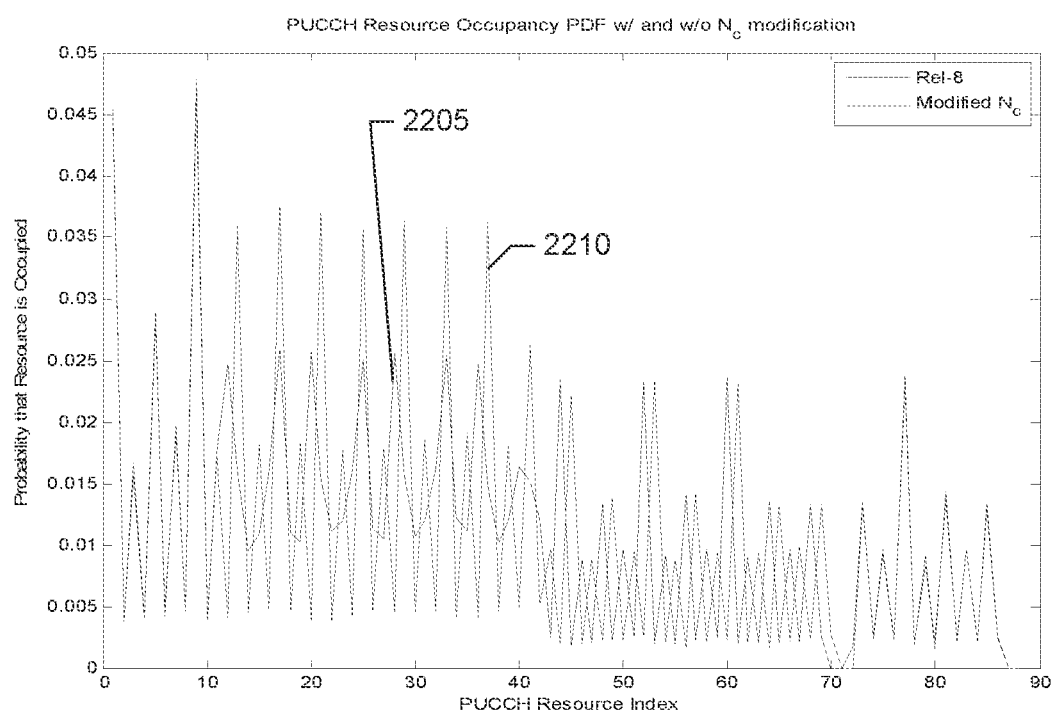

An example PUCCH resource occupancy for LTE TDD configuration 1 is shown in FIG. 22 with the modified remapping (e.g., corresponding to example curve 2210) and without the modified remapping (e.g., corresponding to the example curve 2205). The block-based remapping produces two regions where PUCCH resource occupancy is heavily concentrated, rather than one as in FIG. 20. This corresponds to the need to Ack/Nack up to two DL subframes in configuration 1. While there are now two regions of low occupancy (e.g. PUCCH resources 22-44 and 66-88), the total amount of low occupancy is still approximately the same: about half the PUCCH resources. PUCCH resources 66-88 could be unscheduled, and potentially used for PUSCH fairly easily, as they could border the PUSCH region. The PUCCH resources 22-44 could potentially be reused for about 1 PRB of PUSCH (since 18 PUCCH resources are typically mapped to one PRB), although this may be less beneficial as it is surrounded by PUCCH PRBs. Therefore, using example solution #4, it may be possible to improve PUCCH resource efficiency by about 25%, and up to possibly a 50% efficiency gain.

Figure 23:
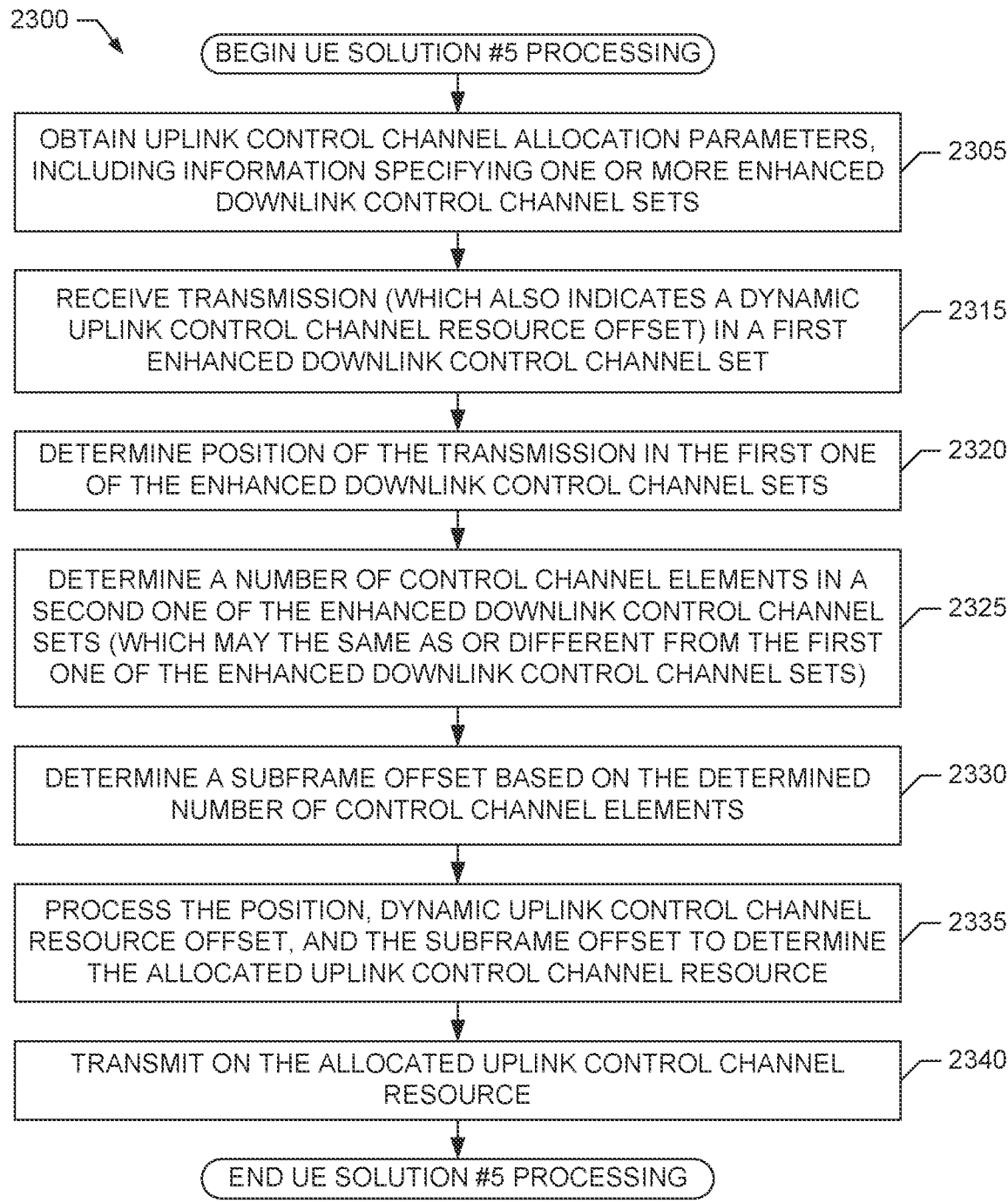
FIG. 23 is a flowchart representative of a fifth example UE process for performing uplink control channel resource allocation for an enhanced downlink control channel in the example system of FIG. 1.
Figure 24:
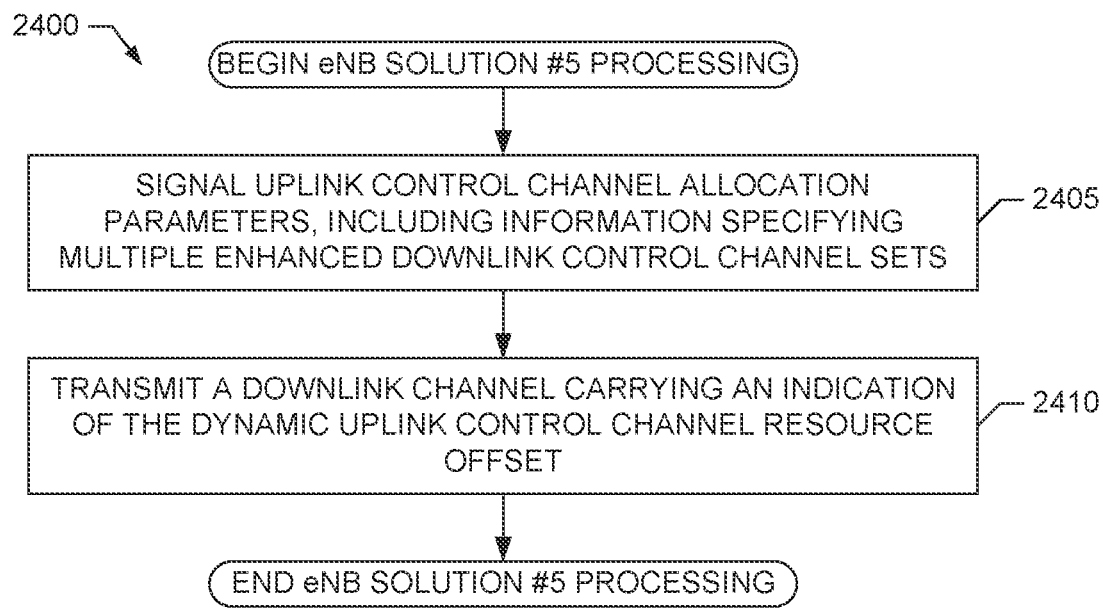
FIG. 24 is a flowchart representative of a fifth example eNB process for performing uplink control channel resource allocation for an enhanced downlink control channel in the example system of FIG. 1.

A fifth example UE process 2300 that may be executed to implement the example UE UCC resource allocator 125 of FIG. 1 is illustrated in FIG. 23. A corresponding fifth example eNB process 2400 that may be executed to implement the example eNB UCC resource allocator 130 of FIG. 1 is illustrated in FIG. 24. The fifth example processes 1700 and 1800 implement a fifth example solution (also referred to herein as example solution #5) disclosed herein for performing PUCCH resource allocation for an ePDCCH. Example solution #5 corresponds to PUCCH resource allocation using a dynamic PUCCH offset indication, which may be signaled to the UE 105 in DCI.

In example solution #5, a UE (e.g., the UE 105) scheduled through ePDCCH can use a dynamic PUCCH offset indication provided in DCI to determine PUCCH resources for TDD when, for example, the number of eCCEs in an ePDCCH set varies by subframe and/or between ePDCCH sets, and/or the number of monitored eCCEs is zero and PDCCH is instead monitored.

In LTE Rel-11, a UE may be configured to monitor multiple ePDCCH resource regions (also referred to as ePDCCH sets) that are configured (e.g., semi-statically) for that UE. When a UE receives an ePDCCH in an ePDCCH set, the UE determines an eCCE index from the position of the ePDCCH in the ePDCCH set. The position of the ePDCCH is defined by the first eCCE that the ePDCCH occupies. The eCCE index is a non-negative integer, where an index of 0 for an ePDCCH set corresponds to the first eCCE in the ePDCCH set.

A Rel-11 FDD UE may determine the PUCCH resources from the eCCE index derived from the ePDCCH set in which it receives ePDCCH according to the following equation:

$$n_{PUCCH}^{(1)} = \Delta_{ARO} + f(n_{eCCE,p}) + N_{PUCCH,j}^{(1)}$$

Equation 22 includes the following parameters:
$\Delta_{ARO}=\{-2,-1,0,2\}$ and is a dynamic PUCCH Ack/Nack resource offset (ARO) indicated to the UE in, for example, DCI carried by ePDCCH;
$n_{PUCCH,j}^{(1)}$ is a PUCCH resource offset associated with ePDCCH set with index 'j';
and $f(n_{eCCE,p})$ is determined for localized and distributed ePDCCH, respectively, using the following equation:

$$f(n_{eCCE,p}) \begin{cases} \text{Localized:} & \lfloor n_{eCCE,j}/N \rfloor \cdot N + k_p \\ \text{Distributed:} & n_{eCCE,j} \end{cases} \quad \text{Equation 23}$$

Equation 23 includes the following parameters:
$n_{eCCE,j}$ is the index of the first eCCE of an ePDCCH transmission in the ePDCCH set with index j;
N is the number of eCCEs per PRB;
$k_p$ is determined from DMRS port used to demodulate ePDCCH.
In some examples, $k_p=\{0,1,2,3\}$ if N=4, and $k_p=\{0,1\}$ if N=2.

Furthermore, it was agreed that in LTE Rel-11 for TDD, the PUCCH resource is to also depend on the following quantity:

$$\sum_{i=0}^{m-1} N_{eCCE,i,j} \quad \text{Equation 24}$$

Equation 24 includes the following parameters:
$N_{eCCE,i,j}$ is equal to the number of eCCEs in subframe i in the ePDCCH set j configured for that UE; and
m=(0 . . . M−1) is the relative index of the DL subframe of the PDSCH scheduled by ePDCCH.

The number of eCCEs in subframe i in ePDCCH set j can be determined using any appropriate known or future technique. In some examples, the number of eCCEs in an ePDCCH set is equivalently identified as $N_{ECCE,m,i}$ for an ePDCCH set with ePDCCH set index m in subframe i, and can be calculated using ePDCCH format information such as is provided in 3GPP TS 36.211 section 6.8A.1. 3GPP Technical Specification (TS) 36.211, Version 11.1.0 (Dec. 20, 2012) is hereby incorporated by reference in its entirety.

The value of the parameter $k_p$ can be determined using any appropriate known or future technique. In some examples, this parameter can be equivalently defined as n' as it is used in section 6.8A.5 of 3GPP TS 36.211, Version 11.1.0.

The agreement reflected in Equation 24 does not fully specify how PUCCH resource should be calculated for TDD UEs receiving ePDCCH. If Equation 22 is used as the basis for resource allocation, it has not been previously decided how Equation 24 is used in that context. Therefore, example solution #5 provides example techniques to calculate PUCCH resources for TDD UEs receiving ePDCCH and using a PUCCH resource offset dynamically signaled through DCI.

In one such example of solution #5, Equation 25 and Equation 26 are used to perform PUCCH resource allocation for TDD UEs receiving ePDCCH and using a PUCCH resource offset dynamically signaled through DCI. Equation 25 can be used by a UE (e.g., the UE 105) and an eNB (e.g., the eNB 110) to respectively calculate a sum of offsets given by:

$$n_{PUCCH,l}^{(1)} = \quad \text{Equation 25}$$
$$\Delta_{ARO}(n-k_i) + f(n_{eCCE,m,j}, n') + N_{PUCCH,j}^{(1)} + N_T(n, j_0)$$

Equation 25 includes the following parameters:
$n_{PUCCH,l}^{(1)}$ is the $l^{th}$ PUCCH resource index that is to be allocated to the UE (e.g., the UE 105) in subframe n. It corresponds to a DL grant received at subframe n-$k_i$. In some examples, if an ePDCCH or PDCCH is not received in subframe n-$k_i$, and the UE (e.g., the UE 105) does not determine (e.g. from higher layer signaling) that a PDSCH is scheduled for it in subframe n-$k_i$, the corresponding $n_{PUCCH,l}^{(1)}$ is not defined;
$\Delta_{ARO}(n-k_i)$ is a dynamic PUCCH Ack/Nack resource offset (ARO) indicated in the downlink grant in subframe n-$k_i$. An example set of offset values to use is $\Delta_{ARO}=\{-2,-1,0,2\}$;
$f(n_{eCCE,m,j},n')$ is an implicit component of the PUCCH resource indication. It may be calculated using $n_{eCCE,m,j}$ and/or n' discussed above. For example, $f(n_{eCCE,m,j},n')$ may be calculated using Equation 23;
$n_{eCCE,m,j}$ is the index of the first eCCE of an ePDCCH received by the UE in the ePDCCH set with index j in the subframe that corresponds to the relative index m;

$N_{PUCCH,j}^{(1)}$ is the PUCCH resource offset associated with an ePDCCH received by the UE, where the ePDCCH is in an ePDCCH set having index 'j';

$N_T(n, j_0)$ is a subframe offset that offsets the PUCCH resource corresponding to different DL subframes.

Equation 26 is given by:

$$N_T(n, j_0) = \sum_{i=0}^{m-1} g(N_{eCCE,n-k_i,j_0}) \quad \text{Equation 26}$$

Equation 26 includes the following parameters:

n is the subframe index in which the PUCCH resource is to be computed (e.g., allocated);

m=(0 ... M−1) is the relative index of the DL subframe of the PDSCH scheduled by ePDCCH in subframe n;

$j_0$ is an index of the ePDCCH set used to compute a number of eCCEs, $N_{eCCE,n-k_i,j_0}$, defined below. Example techniques to determine $j_0$ are described below. Note that, in some examples, $j_0$ can be different from j;

$N_{eCCE,n-k_i,j_0}$ is equal to the number of eCCEs in an ePDCCH set with index jo in a subframe with index $n-k_i$ in which a downlink grant for the UE may be detected. In some examples, $N_{eCCE,n-k_i,j_0}$ is calculated by the UE according to parameters provided by RRC signaling;

$k_i$ is an integer constant that is an element of {$k_0$, $k_1$, ... $k_{M-1}$};

M is the number of elements in a downlink association set index K.

For example, the variables m, M, n, K, and {$k_0$, $k_1$, ... $k_{M-1}$} can be determined as they are for LTE TDD HARQ-ACK feedback procedures, such as described in section 10.1.3 of 3GPP TS 36.213, V10.1.0.

In Equation 26, g( ) is a function that produces a PUCCH resource offset value for subframe n, as further described herein. In some examples, a value for g( ) may be calculated for every subframe that the UE monitors ePDCCH or PDCCH, independently of if the UE is scheduled in that subframe.

Equation 25 and Equation 26 depend on determining the ePDCCH set $j_0$. One example way to determine this subset would be to use the ePDCCH set in which the UE receives an ePDCCH, in other words, set $j=j_0$ in Equation 25 and Equation 26. However, if the UE misses the ePDCCH, it may not know which ePDCCH set index jo to use to determine $N_{eCCE,n-k_i,j_0}$. Furthermore, for TDD, $N_{eCCE,n-k_i,j_0}$ can be different in normal subframes and in special subframes, and so determining the ePDCCH set to use may be insufficient to determine $N_{eCCE,n-k_i,j_0}$ all subframes. Similar problems do not exist in LTE Rel-10, since, as described in section 10.1.3 of 3GPP TS 36.213, Rel-10 TDD implicit PUCCH resource allocation is calculated using the PDCCH CCE index, on the relative subframe index m, and on a PUCCH resource offset $N_{PUCCH}^{(1)}$ that does not vary as a function of the subframe. Given these issues, other examples discussed hereinbelow do not determine the ePDCCH set jo as the set in which ePDCCH is received.

Because $N_{eCCE,n-k_i,j_0}$ can vary with the subframe index n and between ePDCCH sets with different indices j, example techniques for solution #5 yielding a function g( ) to map $N_{eCCE,n-k_i,j_0}$ to a single value for different values of n and j are disclosed. Multiple example alternatives exist for determining the index $j_0$ and for how g( ) should behave as a function of the subframe n, as described below.

The following are two such example techniques to determine the ePDCCH set index jo for example solution #5. The techniques differ on whether the numbers of eCCEs in the ePDCCH sets are used to determine the set or whether such numbers are not used.

Example Technique 1 for Solution #5: fixed $j_0$. In this first example technique, $j_0$ does not depend on the number of eCCEs in the ePDCCH sets, so a predetermined value for $j_0$ may be used, and then $$N_T(n) = \sum_{i=0}^{m-1} N_{eCCE,n-k_i,j_0}.$$

In some examples, this predetermined value may be a single index fixed in a physical layer specification, such as $j_0=0$, which may correspond to the first configured ePDCCH set when the UE is sent a message with ePDCCH set configuration information. When the message is an RRC message, such as is defined in 3GPP TS 36.331 V11.2.0 (December 2012), which is incorporated herein by reference in its entirety, jo may correspond to an epdcch-SetIdentity in an EPDCCH-SetConfig information element, and the predetermined value of $j_0=0$ may correspond to an epdcch-SetIdentity=0. In other examples, the predetermined value may be the minimum value of epdcch-SetIdentity of the ePDCCH sets configured for the UE. In such examples, each epdcch-SetIdentity may be contained in an EPDCCH-SetConfig that configures the corresponding ePDCCH set, and the configured sets for a UE may be added or modified using an EPDCCH-SetConfigAddModList. In still other examples, the predetermined value may be the minimum value of an ePDCCH set index for which an ePDCCH set has been configured. For example, when the ePDCCH sets are indexed using an index q, as in 3GPP TS 36.213, V11.1.0 (Dec. 20, 2012), which is incorporated herein by reference in its entirety, section 10.1, and two ePDCCH sets have been configured that are indexed by q=0 and q=1, the predetermined value could be $j_0=\min(\{0,1\})=0$. However, if only one ePDCCH set is defined with index q=0 or q=1, the predetermined value could be $j_0=\min(\{0\})=0$ or $j_0=\min(\{1\})=1$, respectively.

Example Technique 2 for Solution #5: $j_0$ is derived from ePDCCH set size. In this second example technique, the ePDCCH set index $j_0$ could be determined as the index j corresponding to the ePDCCH set with the largest $N_{eCCE,n-k_i,j}$ that could occur in subframe $n-k_i$. For example, the equation $$j_0 = \underset{j}{\mathrm{argmax}}(N_{eCCE}, n-k_i, j)$$

may be used for this purpose, and so $$N_T(n, j_0) = \sum_{i=0}^{m-1} \max(N_{eCCE,n-k_i,j_0}).$$

The values of $N_{eCCE,n-k_i,j}$ used to compute the largest $N_{eCCE,n-k_i,j}$ can be determined, for example, using the number of enhanced resource element groups (EREGs) in an eCCE in the subframe, such as is defined in 3GPP TS 36.211, V11.1.0, section 6.8A.1.

Comparing the preceding two example techniques for determining the ePDCCH set index $j_0$, the predetermined value may have the benefit of simplifying the $N_{eCCE,n-k_i,j}$ calculation in the UE 105 and the eNB 110. When the predetermined value is determined as a first configured ePDCCH set, a second benefit can be to allow more or less PUCCH resources to be used. Because the amount of resource used by a UE is larger if $N_T(n, j_0)$ is larger, and using a set with the largest or the smallest value of $N_{eCCE,n-k_i,j}$ will make $N_T(n, j_0)$ larger or smaller, respectively, more or less PUCCH resources can be used depending on if the first configured ePDCCH set is the one with the largest or smallest value of $N_{eCCE,n-k_i,j}$. On the other hand, a benefit of using a value depending on the number of eCCEs in the ePDCCH sets, such as the largest $N_{eCCE,n-k_i,j}$, could be to allow the amount of allocated PUCCH resource to better track the need according to the downlink control overhead on ePDCCH. Furthermore, using the largest $N_{eCCE,n-k_i,j}$ instead of a smaller value may help limit how often the same PUCCH resource is associated with different ePDCCHs, thereby allowing more efficient scheduling of ePDCCH.

Example Technique 3 for Solution #5: using constant g( ). In a third example technique for solution #5, the function g( ) is constant over all subframes n. In this example, the UE may determine a maximum value of $N_{eCCE,n-k_i,j}$ for ePDCCH set j for any subframe i according to its configured ePDCCH set(s), and use the maximum value of $N_{eCCE,n-k_i,j}$ to calculate $$N_T(n, j_0) = \sum_{i=0}^{m-1} g(N_{eCCE,n-k_i,j_0}),$$

which may be expressed with $N_T(n, j_0) = m \cdot N_{eCCE,j_0}^{max}$; where $$N_T(n, j_0) = m \cdot N_{eCCE,j_0}^{max}; \text{ where } g(N_{eCCE,i,j}) = N_{eCCE,j}^{max}, = \max_i(N_{eCCE,i,j}),$$

and where $j_0$ is an index of an ePDCCH set configured for the UE. The UE may determine $N_{eCCE,i,j}$ using the number of EREGs in an eCCE in a subframe i, such as is defined in 3GPP TS 36.211, V11.1.0, section 6.8A.1. In some examples, a fixed value may be used for $j_0$ such as that described in example technique 1 above. In other examples, the ePDCCH set index $j_0$ can correspond to an ePDCCH set configured for the UE with the largest $N_{eCCE,j}^{max}$, and so in such an example, $$N_T(n, j_0) = N_T(n) = m \cdot \max_j(N_{eCCE,j}^{max}).$$

If a UE (e.g., the UE 105) monitors PDCCH in subframe $n-k_i$ (and therefore may not monitor ePDCCH), Equation 25 and Equation 26 may still be used to compute $n_{PUCCH,l}^{(1)}$ for other subframes where the UE monitors ePDCCH, except that $N_T(n, j_0)$ may be calculated differently when the UE only receives ePDCCH. In one such example, if the UE does not receive ePDCCH in subframe $n-k_i$, the number of eCCEs the UE receives is 0, and so $g(N_{eCCE,n-k_i,j_0})$ is set as $g(N_{eCCE,n-k_i,j_0})=0$ when calculating $N_T(n, j_0)$. In another example for calculating $N_T(n, j_0)$ corresponding to when PDCCH is monitored in subframe $n-k_i$, the index $j_0$ could be determined (similarly to when it only receives ePDCCH) as the index j corresponding to the ePDCCH set with the largest $N_{eCCE,n-k_i,j}$ that could occur in subframe $n-k_i$, and the equations $$j_0 = \arg\max_j (N_{eCCE,n-k_i,j})$$

and $$N_T(n, j_0) = N_T(n) = \sum_{i=0}^{m-1} \max_{j_0}(N_{eCCE,n-k_i,j_0})$$

may be used. In an alternative example corresponding to when PDCCH is monitored in subframe $n-k_i$, the UE may determine a maximum value of $N_{eCCE,n-k_i,j_0}$, for example using $N_T(n, j_0) m \cdot N_{eCCE,j_0}^{max}$ with $$N_{eCCE,j0}^{max} = \max_i(N_{eCCE,n-k_i,j_0})$$

In such an example, a predetermined value for $j_0$ may be used, and so be used, and so $N_T(n, j_0) = m \cdot \max_i(N_{eCCE,i,j_0})$.

This predetermined value may be a single index fixed in a future physical layer specification, such as $j_0=0$, which may correspond to the first configured ePDCCH set when the UE is sent a message with ePDCCH set configuration information.

If a UE monitors PDCCH in subframe PDCCH may not carry an indicator of a dynamic PUCCH Ack/Nack resource offset (ARO). Furthermore, there may be no DMRS port used to receive PDCCH, and so different treatment with respect to the variable n' may be involved. However, in such examples, LTE Rel-10 PUCCH resource allocation techniques may still be suitable. Therefore, in some examples, when a UE monitors PDCCH in subframe $n-k_i$, the UE determines the corresponding PUCCH resource for that subframe as is defined in LTE Rel-10 in section 10.1.3 of TS 36.213, V10.1.0 for TDD, and as provided by Equation 18 and Equation 19 above. In such examples, $n_{PUCCH,l}^{(1)}$ can be determined differently according to 1. Furthermore, for l corresponding to subframe $n-k_i$, in which ePDCCH is monitored, in such examples Equation 25 and the modified calculation of $N_T(n, j_0)$ discussed in the preceding paragraph can be used to) compute $n_{PUCCH,l}^{(1)}$. For l corresponding to subframe $n-k_i$, in which PDCCH is monitored, the LTE Rel-10 methods are used to compute $n_{PUCCH,l}^{(1)}$.

In some examples, it may be desirable for the UE (e.g., the UE 105) to transmit PUCCH only on resources associated with ePDCCH even though it monitors PDCCH. In such examples, Equation 25 can be modified to determine $n_{PUCCH,l}^{(1)}$ for l corresponding to subframe $n-k_i$, in which the UE monitors PDCCH, as shown in the following equation:

$$n_{PUCCH,l}^{(1)} = f(nCCE, m) + N_{PUCCH,j_0}^{(1)} + N_T(n, j_0) \qquad \text{Equation 27}$$

Equation 27 includes the following parameters:

$n_{PUCCH,l}^{(1)}$ is the $l^{th}$ PUCCH resource index. In some examples, if ePDCCH or PDCCH is not received in subframe n-$k_i$, and the UE does not determine (e.g. from higher layer signaling) that a PDSCH is scheduled for it in subframe n-$k_i$, the corresponding $n_{PUCCH,l}^{(1)}$ is not defined;

$f(n_{CCE,m})$ is an implicit component of the PUCCH resource indication. It may be calculated using $n_{eCCE,m}$. One example way to compute $f(n_{CCE})$ is $f(n_{CCE,m})$= $n_{CCE,m}$;

$n_{CCE,m}$ is the index of the first CCE of a PDCCH received by the UE in the subframe that corresponds to the relative index m;

$n_{PUCCH,j_0}^{(1)}$ is the PUCCH resource offset associated with a ePDCCH set having index '$j_0$'. In some examples, this set index may be predetermined as a single index fixed in a future physical layer specification, such as $j_0=0$, which may correspond to the first configured ePDCCH set when the UE is sent a message with ePDCCH set configuration information. In other examples, $j_0$ could be determined as the j corresponding to the ePDCCH set with the largest $N_{eCCE,n-k_i,j}$ that could occur in subframe n-$k_i$, and the equation $$n_{PUCCH,l}^{(1)} = f(n_{CCE,m}) + N_{PUCCH,j_0}^{(1)} + N_T(n, j_0) \qquad \text{Equation 27}$$

is used. In yet other examples, a largest $N_{eCCE,i,j}$ that could occur in any ePDCCH set configured for the UE in any subframe i is used, which may be described as $$N_{PUCCH,j_0}^{(1)} = N_{eCCE}^{max} = \max_{i,j}(N_{eCCE,i,j});$$

$N_T(n, j_0)$ may be calculated as described above for when a UE monitors PDCCH in subframe n-$k_i$.

With the foregoing in mind, and with reference to the preceding figures and associated descriptions, the example process 2300 of FIG. 23 begins execution at block 2305 at which the UE UCC resource allocator 125 of the UE 105 obtains (e.g., via signaling from the eNB 110 and/or any other manner) any uplink control channel allocation parameters to be used for performing PUCCH resource allocation. At block 2305, the UE UCC resource allocator 125 also obtains (e.g., via signaling from the eNB 110 and/or any other manner) information specifying one or more ePDCCH sets configured for the UE 105, as described above. At block 2315, the UE 105 receives an ePDCCH transmission, for which one or more PUCCH resources are to be allocated, in one of the ePDCCH sets (e.g., j), as described above. The ePDCCH transmission received by the UE 105 at block 2315 indicates a dynamic PUCCH Ack/Nack resource offset (ARO), as described above. At block 2320, the UE UCC resource allocator 125 determines a position (e.g., the eCCE index, $n_{eCCE,j}$) of the received ePDCCH transmission in the ePDCCH set (e.g., j), as described above.

As described in greater detail above, at block 2325, the UE UCC resource allocator 125 determines a number of control channel elements (e.g., $N_{eCCE,n-k_i,j_0}$) in a second one of the ePDCCH sets (e.g., $j_0$). As noted above, the ePDCCH set used at block 2325 may be the same as, or different from, the ePDCCH set in which the ePDCCH was received at block 2315. At block 2330, the UE UCC resource allocator 125 determines a subframe offset (e.g., $N_T(n, j_0)$) based on the number of control channel elements (e.g., $N_{eCCE,n-k_i,j_0}$), as described above (e.g., using Equation 26). At block 2335, the UE UCC resource allocator 125 processes the position determined at block 2320, the dynamic PUCCH Ack/Nack resource offset (ARO) indicated in block 2315 and the subframe offset determined at block 2330, as described above (e.g., using Equation 25), to determine an allocated PUCCH resource. At block 2340, the UE 105 transmits on the allocated PUCCH resource.

Correspondingly, the example process 2400 of FIG. 24 begins execution at block 2405 at which the eNB UCC resource allocator 130 of the eNB 110 provides (e.g., via signaling and/or any other appropriate manner) to the UE 105 any uplink control channel allocation parameters to be used for performing PUCCH resource allocation. At block 2405, the eNB UCC resource allocator 130 also provides (e.g., via signaling and/or any other appropriate manner) the information specifying the one or more ePDCCH sets configured for the UE 105. At block 2410, the eNB transmits an ePDCCH carrying an indication of the dynamic PUCCH Ack/Nack resource offset (ARO to be used by the UE 105 when performing PUCCH resource allocation according to example solution #5. For example, the eNB 110 determines the position (e.g. an eCCE index) at which it will transmit the ePDCCH. The eNB 110 then transmits the ePDCCH at the determined position and carrying the indication of the ARO.

Figure 25:
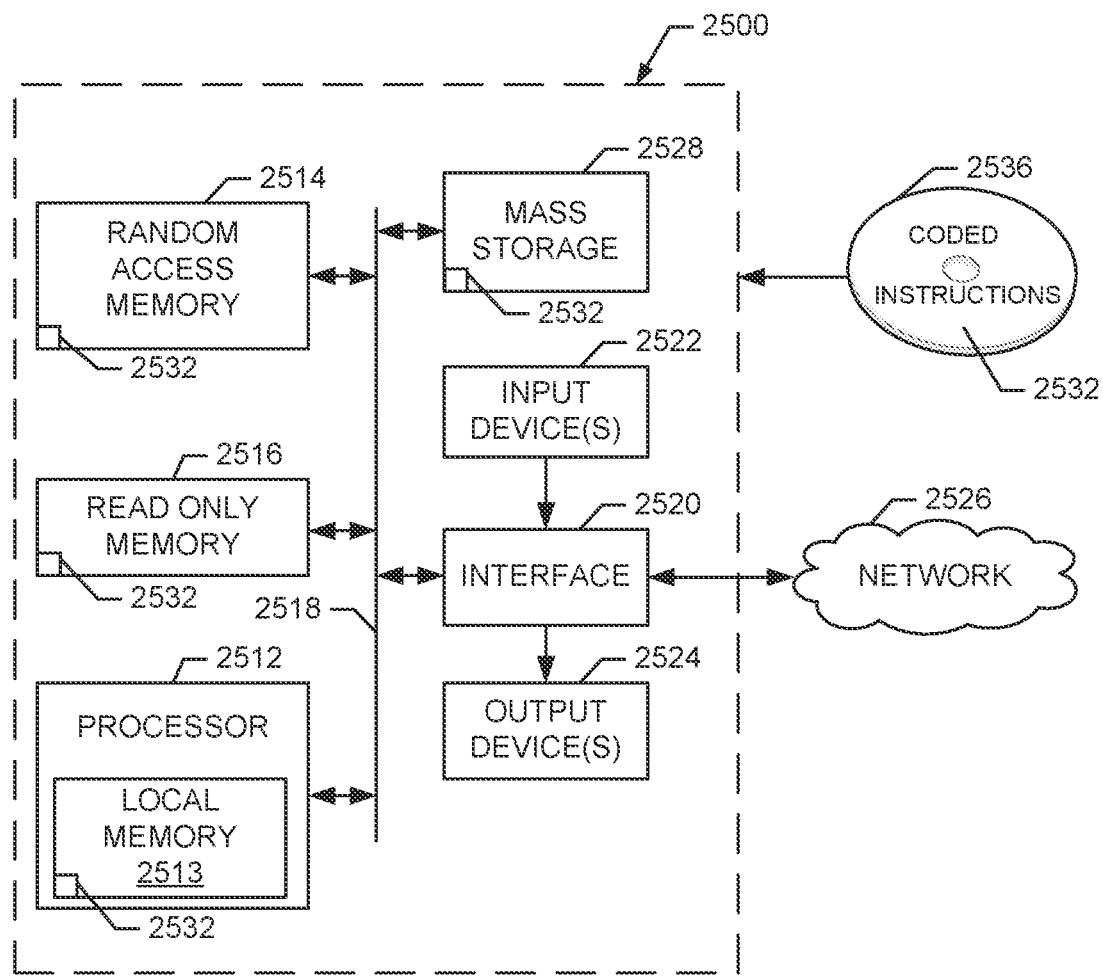
FIG. 25 is a block diagram of an example processing system that may execute example machine readable instructions used to implement some or all of the processes of FIGS. 5, 6, 9, 10, 14, 15, 17, 18, 23 and/or 24 to implement uplink control channel resource allocation for an enhanced downlink control channel in the example system of FIG. 1.

FIG. 25 is a block diagram of an example processing system 2500 capable of executing the processes of FIGS. 5, 6, 9, 10, 14, 15, 17, 18, 23 and/or 24 to implement the mobile communication system 100, the UE device 105, the eNB 110, the UE UCC resource allocator 125 and/or the eNB UCC resource allocator 130 of FIG. 1. The processing system 2500 can be, for example, a mobile device (e.g., a smartphone, a cell phone, etc.), a personal digital assistant (PDA), a server, a personal computer, an Internet appliance, a DVD player, a CD player, a digital video recorder, a Blu-ray player, a gaming console, a personal video recorder, a set top box, a digital camera, or any other type of computing device.

The system 2500 of the instant example includes a processor 2512. For example, the processor 2512 can be implemented by one or more microprocessors and/or controllers from any desired family or manufacturer.

The processor 2512 includes a local memory 2513 (e.g., a cache) and is in communication with a main memory including a volatile memory 2514 and a non-volatile memory 2516 via a link 2518. The link 1518 may be implemented by a bus, one or more point-to-point connections, etc., or a combination thereof. The volatile memory 2514 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2516 may be implemented by flash memory and/or any other desired type of memory device. Access to the main memory 2514, 2516 is controlled by a memory controller.

The processing system 2500 also includes an interface circuit 2520. The interface circuit 2520 may be implemented by any type of interface standard, such as an Ethernet interface, a universal serial bus (USB), and/or a PCI express interface.

One or more input devices 2522 are connected to the interface circuit 2520. The input device(s) 2522 permit a user to enter data and commands into the processor 2512.

The input device(s) can be implemented by, for example, a keyboard, a mouse, a touchscreen, a track-pad, a trackball, a trackbar (such as an isopoint), a voice recognition system and/or any other human-machine interface.

One or more output devices 2524 are also connected to the interface circuit 2520. The output devices 2524 can be implemented, for example, by display devices (e.g., a liquid crystal display, a cathode ray tube display (CRT)), a printer and/or speakers. The interface circuit 2520, thus, can include a graphics driver card.

The interface circuit 2520 can also include a communication device, such as a modem or network interface card, to facilitate exchange of data with external computers via a network 2526 (e.g., an Ethernet connection, a digital subscriber line (DSL), a telephone line, coaxial cable, a cellular telephone system, etc.).

The processing system 2500 can also include one or more mass storage devices 2528 for storing machine readable instructions and data. Examples of such mass storage devices 2528 include floppy disk drives, hard drive disks, compact disk drives and digital versatile disk (DVD) drives.

Coded instructions 2532 corresponding to the instructions of FIGS. 5, 6, 9, 10, 14, 15, 17, 18, 23 and/or 24 may be stored in the mass storage device 2528, in the volatile memory 2514, in the non-volatile memory 2516, in the local memory 2513 and/or on a removable storage medium, such as a CD or DVD 2536.

As an alternative to implementing the methods and/or apparatus described herein in a system such as the processing system of FIG. 25, the methods and or apparatus described herein may be embedded in a structure such as a processor and/or an ASIC (application specific integrated circuit).

Also, as used herein, the term "node" broadly refers to any connection point, such as a redistribution point or a communication endpoint, of a communication environment, such as a network. Accordingly, such nodes can refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, digital subscriber line (DSL) modems, wireless LAN (WLAN) access points, etc. Examples of Internet or Intranet nodes include host computers identified by an Internet Protocol (IP) address, bridges, WLAN access points, etc. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), Packet Data Network Gateways (PDN-GW), etc.

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, sensors, etc. A server node, as used herein, may refer to an information processing device (e.g., a host computer), or series of information processing devices, that perform information processing requests submitted by other nodes. As used herein, a peer node may sometimes serve as a client node, and at other times, a server node. In a peer-to-peer or overlay network, a node that actively routes data for other networked devices as well as itself may be referred to as a supernode. An access node, as used herein, may refer to a node that provides a client node access to a communication environment. Examples of access nodes include, but are not limited to, cellular network base stations such as evolved Node Bs (eNBs), wireless broadband (e.g., WiFi, WiMAX, etc) access points, etc., which provide corresponding cell and/or WLAN coverage areas, etc.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
    transmitting, to a user equipment (UE), a downlink control channel carrying a physical uplink control channel (PUCCH) resource indicator, wherein the downlink control channel is associated with a demodulation reference signal (DMRS) antenna port;
    mapping the PUCCH resource indicator to a first offset;
    determining a second offset based on a position of the transmitted downlink control channel normalized by a value;
    determining an index of the DMRS antenna port associated with the downlink control channel;
    determining a third offset based on the determined index of the DMRS antenna port;
    determining, based on the first, second, and third offsets, a first index identifying a first allocated PUCCH resource;
    determining a second index identifying a second allocated PUCCH resource, the second index having a value that is equal to the first index plus a constant; and
    receiving a PUCCH on the first allocated PUCCH resource and on the second allocated PUCCH resource.

2. The method of claim 1, wherein the first index is a linear combination of the first, second, and third offsets.

3. The method of claim 1, further comprising:
    transmitting a plurality of physical downlink shared channels (PDSCHs) to the UE, wherein each of the plurality of the PDSCHs is transmitted in a different subframe, and wherein the determining the first index comprises adding a first subframe offset corresponding to a first subframe in which a first one of the PDSCHs was transmitted.

4. The method of claim 1, wherein the PUCCH is transmitted by the UE simultaneously on the first allocated PUCCH resource using a first antenna port and on the second allocated PUCCH resource using a second antenna port.

5. The method of claim 1, wherein the downlink control channel is in a downlink control information (DCI) format.

6. The method of claim 1, further comprising:
    determining a fourth offset based on a transmission mode of the downlink control channel, wherein the transmission mode is one of localized transmission or distributed transmission; and determining, based on the first, second, third, and fourth offsets, the first index identifying the first allocated PUCCH resource.

7. An apparatus, comprising:
at least one processor;
one or more non-transitory computer-readable storage medium coupled to the at least one processor and storing programming instructions for execution by the at least one processor, wherein the programming instructions, when executed, cause the apparatus to perform operations comprising:
transmitting, to a user equipment (UE), a downlink control channel carrying a physical uplink control channel (PUCCH) resource indicator, wherein the downlink control channel is associated with a demodulation reference signal (DMRS) antenna port;
mapping the PUCCH resource indicator to a first offset;
determining a second offset based on a position of the transmitted downlink control channel normalized by a value;
determining an index of the DMRS antenna port associated with the downlink control channel;
determining a third offset based on the determined index of the DMRS antenna port;
determining, based on the first, second, and third offsets, a first index identifying a first allocated PUCCH resource;
determining a second index identifying a second allocated PUCCH resource, the second index having a value that is equal to the first index plus a constant; and
receiving a PUCCH on the first allocated PUCCH resource and on the second allocated PUCCH resource.

8. The apparatus of claim 7, wherein the first index is a linear combination of the first, second, and third offsets.

9. The apparatus of claim 7, the operations further comprising:
transmitting a plurality of physical downlink shared channels (PDSCHs) to the UE, wherein each of the plurality of the PDSCHs is transmitted in a different subframe, and wherein the determining the first index comprises adding a first subframe offset corresponding to a first subframe in which a first one of the PDSCHs was transmitted.

10. The apparatus of claim 7, wherein the PUCCH is transmitted by the UE simultaneously on the first allocated PUCCH resource using a first antenna port and on the second allocated PUCCH resource using a second antenna port.

11. The apparatus of claim 7, wherein the downlink control channel is in a downlink control information (DCI) format.

12. The apparatus of claim 7, the operations further comprising:
determining a fourth offset based on a transmission mode of the downlink control channel, wherein the transmission mode is one of localized transmission or distributed transmission; and
determining, based on the first, second, third, and fourth offsets, the first index identifying the first allocated PUCCH resource.

13. One or more non-transitory computer-readable media storing computer instructions, that when executed by one or more processors, cause a computing device to perform operations comprising:
transmitting, to a user equipment (UE), a downlink control channel carrying a physical uplink control channel (PUCCH) resource indicator, wherein the downlink control channel is associated with a demodulation reference signal (DMRS) antenna port;
mapping the PUCCH resource indicator to a first offset;
determining a second offset based on a position of the transmitted downlink control channel normalized by a value;
determining an index of the DMRS antenna port associated with the downlink control channel;
determining a third offset based on the determined index of the DMRS antenna port;
determining, based on the first, second, and third offsets, a first index identifying a first allocated PUCCH resource;
determining a second index identifying a second allocated PUCCH resource, the second index having a value that is equal to the first index plus a constant; and
receiving a PUCCH on the first allocated PUCCH resource and on the second allocated PUCCH resource.

14. The one or more non-transitory computer-readable media of claim 13, wherein the first index is a linear combination of the first, second, and third offsets.

15. The one or more non-transitory computer-readable media of claim 13, the operations further comprising:
transmitting a plurality of physical downlink shared channels (PDSCHs) to the UE, wherein each of the plurality of the PDSCHs is transmitted in a different subframe, and wherein the determining the first index comprises adding a first subframe offset corresponding to a first subframe in which a first one of the PDSCHs was transmitted.

16. The one or more non-transitory computer-readable media of claim 13, wherein the PUCCH is transmitted by the UE simultaneously on the first allocated PUCCH resource using a first antenna port and on the second allocated PUCCH resource using a second antenna port.

17. The one or more non-transitory computer-readable media of claim 13, wherein the downlink control channel is in a downlink control information (DCI) format.

18. The one or more non-transitory computer-readable media of claim 13, the operations further comprising:
determining a fourth offset based on a transmission mode of the downlink control channel, wherein the transmission mode is one of localized transmission or distributed transmission; and
determining, based on the first, second, third, and fourth offsets, the first index identifying the first allocated PUCCH resource.

* * * * *

UNITED STATES PATENT AND TRADEMARK OFFICE
CERTIFICATE OF CORRECTION

| | |
|---|---|
| PATENT NO. | : 12,016,025 B2 |
| APPLICATION NO. | : 18/320500 |
| DATED | : June 18, 2024 |
| INVENTOR(S) | : Robert Mark Harrison, Shiwei Gao and Yufei Wu Blankenship |

Page 1 of 1

It is certified that error appears in the above-identified patent and that said Letters Patent is hereby corrected as shown below:

In the Specification

In Column 1, Line 23, delete "2016" and Insert -- 2013 --, therefor.

Signed and Sealed this
Twenty-fifth Day of November, 2025

John A. Squires
*Director of the United States Patent and Trademark Office*